United States Patent
Li et al.

(10) Patent No.: US 12,406,059 B2
(45) Date of Patent: Sep. 2, 2025

(54) COMMUNICATION METHOD, APPARATUS, AND SYSTEM

(71) Applicant: HUAWEI TECHNOLOGIES CO., LTD., GuangDong (CN)

(72) Inventors: He Li, Shanghai (CN); Rong Wu, Shenzhen (CN); Yizhuang Wu, Beijing (CN); Ao Lei, Beijing (CN)

(73) Assignee: HUAWEI TECHNOLOGIES CO., LTD., Shenzen (CN)

( * ) Notice: Subject to any disclaimer, the term of this patent is extended or adjusted under 35 U.S.C. 154(b) by 73 days.

(21) Appl. No.: 18/168,228

(22) Filed: Feb. 13, 2023

(65) Prior Publication Data
US 2023/0185910 A1   Jun. 15, 2023

Related U.S. Application Data

(63) Continuation of application No. PCT/CN2020/109382, filed on Aug. 14, 2020.

(51) Int. Cl.
*G06F 21/55* (2013.01)
*H04L 9/40* (2022.01)
*H04W 28/08* (2023.01)

(52) U.S. Cl.
CPC ........... *G06F 21/554* (2013.01); *H04L 9/40* (2022.05); *H04L 63/20* (2013.01); *G06F 2221/034* (2013.01); *H04W 28/0875* (2020.05)

(58) Field of Classification Search
None
See application file for complete search history.

(56) References Cited

U.S. PATENT DOCUMENTS 9,706,340 B2 *   7/2017   Kim .................. H04W 4/029
9,813,842 B2 *   11/2017  Ahmad ............... H04W 4/70
(Continued)

FOREIGN PATENT DOCUMENTS

| CN | 110830993 A | 2/2020 |
|---|---|---|
| CN | 111247820 A | 6/2020 |
| CN | 111373782 A | 7/2020 |
| EP | 3863314 A1 | 8/2021 |
| WO | 2017028901 A1 | 2/2017 |
| WO | 2019095128 A1 | 5/2019 |

OTHER PUBLICATIONS

3GPP, "3rd Generation Partnership Project; Technical Specification Group Services and System Aspects; Security aspects of 3GPP support for advanced Vehicle-to-Everything (V2X) services (Release 16)", 3GPP TS 33.536 V16.0.0, Jul. 2020; 23 total pages.

(Continued)

*Primary Examiner* — Lashonda Jacobs-Burton
(74) *Attorney, Agent, or Firm* — Rimon PC

(57) ABSTRACT

Embodiments of this application provide a communication method, apparatus, and system, to improve security of a vehicle-to-everything (V2X) PC5 establishment procedure. In the method, a first terminal device obtains a first security protection method, where the first security protection method is a security protection method determined in a discovery procedure between the first terminal device and a second terminal device. Also in the method, the first terminal device determines a second security protection method according to the first security protection method, where the second security protection method is a security protection method for a PC5 connection between the first terminal device and the second terminal device. For example, a security level of the second security protection method is higher than a security level of the first security protection method. The communication method is applicable to the V2X communication field.

20 Claims, 10 Drawing Sheets

(56) References Cited

U.S. PATENT DOCUMENTS

| | | | |
|---|---|---|---|
| 10,667,119 B2 | 5/2020 | Loehr et al. | |
| 2014/0344578 A1* | 11/2014 | Kim | H04W 12/037 |
| | | | 713/168 |
| 2016/0295347 A1* | 10/2016 | Ahmad | H04W 4/70 |
| 2018/0007497 A1* | 1/2018 | Ahmad | H04W 8/005 |
| 2019/0394631 A1 | 12/2019 | Stojanovski et al. | |
| 2019/0394816 A1 | 12/2019 | Kim | |
| 2020/0205209 A1* | 6/2020 | Pan | H04W 4/40 |
| 2020/0221298 A1 | 7/2020 | Pan et al. | |

OTHER PUBLICATIONS

3GPP TS 33.303 V16.0.0, "3rd Generation Partnership Project; Technical Specification Group Services and System Aspects; Proximity-based Services (ProSe); Security aspects (Release 16)", Jul. 2020; 90 total pages.

3GPP, "3rd Generation Partnership Project; Technical Specification Group Services and System Aspects; Study on system enhancement for Proximity based Services (ProSe) in the 5G System (5GS) (Release 17)", 3GPP TR 23.752, V0.4.0, Jun. 2020; 121 total pages.

OPPO et al., "Solution for direct discovery", SA WG2 Meeting #136, S2-1912459, Nov. 18-22, 2019, Reno USA (Merge of S2-1911151 and S2-1911800); 4 total pages.

3GPP TS 23.501 V15.10.0, "3rd Generation Partnership Project; Technical Specification Group Services and System Aspects; System architecture for the 5G System (5GS); Stage 2 (Release 15)", Jul. 2020; 249 total pages.

3GPP TSG RAN WG1 Meeting #80bis, R1-151234, Belgrade, Serbia, "PRACH for LC-MTC," Alcatel-Lucent, Alcatel-Lucent Shanghai Bell, Apr. 20-24, 2015; 4 total pages.

Qualcomm Incorporated: "Security establishment procedures for ProSe one-to-one communication." 3GPP TSG-CT WG1 Meeting #96 C1-161418 Jeju (Korea), Feb. 15-19, 2016 (was C1-161255); 37 total pages.

* cited by examiner

US 12,406,059 B2

COMMUNICATION METHOD, APPARATUS, AND SYSTEM

CROSS-REFERENCE TO RELATED APPLICATIONS

This application is a continuation of International Application No. PCT/CN2020/109382, filed on Aug. 14, 2020, the disclosure of which is hereby incorporated by reference in its entirety.

TECHNICAL FIELD

This application generally relates to the field of communication technologies, and in particular, to a communication method, apparatus, and system.

BACKGROUND

In a conventional mobile network, signaling communication and data communication paths between user equipment (UEs) need to pass through a network side device (for example, a base station/serving gateway (SGW)/packet data network gateway (PGW)). Different UEs cannot directly communicate with each other. During data transferring between two UEs that are close to each other, for example, a UE 1 and a UE 2, the UE 1 needs to first send data to a connected base station 1, and then the data reaches, through transmission on a network side, a base station 2 connected to the UE 2 (where in this case, the base station 1 and the base station 2 may be a same base station, or may be different base stations). Finally, the base station 2 sends the data to the UE 2. In this way, a large network transmission bandwidth is required, and transmission efficiency is low.

A proximity-based service (ProSe) topic is proposed under the requirement that device-to-device (D2D) communication requires short-range direct communication. A ProSe requires that data is directly exchanged between the UEs, or data is exchanged only by using a base station without passing through a core network device (for example, the SGW/PGW). Therefore, communication efficiency between the UEs that are close to each other can be improved. In a $5^{th}$ generation (5G) communication technology, a short-distance direct communication service is used in the vehicle-to-everything (V2X).

Currently, in a ProSe technology, before establishing data exchange between two UEs, a ProSe discovery procedure and a PC5 establishment procedure need to be performed in sequence. The ProSe discovery procedure is used to implement mutual discovery between the two UEs, and the PC5 establishment procedure is used to establish a signaling connection and a data connection for direct communication between the two UEs through a PC5 interface. However, a security protection mechanism in an existing V2X PC5 establishment procedure (where for details, refer to the $3^{rd}$ generation partnership project (3GPP) technical standard (TS) 23.303) is incomplete. Control plane signaling in the V2X PC5 establishment procedure is easily attacked by an intermediate attacker, and this may cause a security level degradation. Therefore, how to improve security of the V2X PC5 establishment procedure is an urgent problem to be resolved currently.

SUMMARY

Embodiments of this application provide a communication method, apparatus, and system, to improve security of a vehicle-to-everything (V2X) PC5 establishment procedure.

To achieve the foregoing objective, the following technical solutions are used in embodiments of this application.

According to a first aspect, a communication method is provided, where the method includes: a first terminal device obtains a first security protection method, where the first security protection method is a security protection method determined in a discovery procedure between the first terminal device and a second terminal device; and the first terminal device determines a second security protection method according to the first security protection method, where the second security protection method is a security protection method for a PC5 connection between the first terminal device and the second terminal device. In some embodiments, when determining the second security protection method, reference may be made to the first security protection method determined in the discovery procedure. Therefore, a security level of the determined second security protection method may be not lower (e.g., higher) than a security level of the first security protection method. In other words, the security level of the first security protection method is the lowest security level of the PC5 connection in a PC5 establishment procedure, so that security is not degraded.

In a possible implementation, the communication method further includes: the first terminal device receives a first message from the second terminal device, where the first message is the $1^{st}$ message in a PC5 establishment procedure between the first terminal device and the second terminal device; and the first terminal device performs security deprotection on the first message according to the first security protection method. In other words, in some embodiments, security protection is performed on the first message by using the first security protection method. In this way, when the first security protection method includes enabling integrity protection, because the first terminal device may perform security protection on the first message by using the first security protection method, a problem that a security level is degraded because the first message in the PC5 establishment procedure is attacked or tampered with by an attacker can be avoided, and a security level of the PC5 establishment procedure can be improved.

According to a second aspect, a communication method is provided, where the method includes: a first terminal device obtains a first security protection method, where the first security protection method is a security protection method determined in a discovery procedure between the first terminal device and a second terminal device; and after performing security protection on at least one message in a PC5 establishment procedure between the first terminal device and the second terminal device by using the first security protection method, the first terminal device sends the at least one security-protected message to the second terminal device. According to the communication method provided in some embodiments, in one aspect, when the first security protection method includes enabling integrity protection, because the first terminal device may perform security protection on the at least one message in the PC5 establishment procedure between the first terminal device and the second terminal device by using the first security protection method, a problem that a security level is degraded because the message in the PC5 establishment procedure is attacked or tampered with by an attacker can be avoided, and a security level of the PC5 establishment procedure can be improved. In another aspect, when a security level of the first security protection method is higher than or equal to a security level of a security protection method used on a control plane of a PC5 connection between the first terminal device and the second terminal device, because the first terminal device may perform security protection on the at least one message in the PC5 establishment procedure between the first terminal device and the second terminal device by using the first security protection method, a problem that the security level is degraded because the security level of the security protection method used on the control plane of the PC5 connection is lower than the security level of the first security protection method can be avoided, and a security level of the PC5 establishment procedure can be improved.

In a possible implementation, the at least one message includes a first message, and the first message is the $1^{st}$ message in the PC5 establishment procedure. In other words, in some embodiments, security protection is performed on the first message by using the first security protection method. In this way, when the first security protection method includes enabling integrity protection, because the first terminal device may perform security protection on the first message by using the first security protection method, a problem that a security level is degraded because the first message in the PC5 establishment procedure is attacked or tampered with by an attacker can be avoided, and a security level of the PC5 establishment procedure can be improved.

In a possible implementation, the at least one message further includes a third message, the third message is a message that is sent by the first terminal device in the PC5 establishment procedure and that is used to negotiate a security protection method used on a user plane of a PC5 connection between the first terminal device and the second terminal device, and that the first terminal device performs security protection on at least one message in a PC5 establishment procedure by using the first security protection method includes: the first terminal device performs security protection on the first message by using the first security protection method; and when a security level of a security protection method used on a control plane of the PC5 connection is lower than a security level of the first security protection method, the first terminal device performs security protection on the third message by using the first security protection method. In one aspect, when the first security protection method includes enabling integrity protection, because the first terminal device may perform security protection on the first message in the PC5 establishment procedure between the first terminal device and the second terminal device by using the first security protection method, a problem that a security level is degraded because the first message in the PC5 establishment procedure is attacked or tampered with by an attacker can be avoided, and a security level of the PC5 establishment procedure can be improved. In another aspect, when the security level of the security protection method used on the control plane of the PC5 connection is lower than the security level of the first security protection method, because the first terminal device may perform security protection on the third message in the PC5 establishment procedure between the first terminal device and the second terminal device by using the first security protection method, a problem that the security level is degraded because the security level of the security protection method used on the control plane of the PC5 connection is lower than the security level of the first security protection method can be avoided, and a security level of the PC5 establishment procedure can be improved.

In a possible implementation, the communication method may further include: the first terminal device receives a second message from the second terminal device, where the second message includes a security algorithm that is selected by the second terminal device and that is on the control plane of the PC5 connection; and the first terminal device determines, based on the security algorithm on the control plane of the PC5 connection, that the security level of the security protection method used on the control plane of the PC5 connection is lower than the security level of the first security protection method. Based on this solution, the first terminal device may learn that the security level of the security protection method used on the control plane of the PC5 connection is lower than the security level of the first security protection method.

In a possible implementation, the at least one message includes a fourth message, the fourth message is a message that is sent by the first terminal device in the PC5 establishment procedure and that is used to negotiate a security protection method used on a user plane of a PC5 connection between the first terminal device and the second terminal device, and that the first terminal device performs security protection on at least one message in a PC5 establishment procedure by using the first security protection method includes: the first terminal device determines that a security level of a security protection method used on a control plane of the PC5 connection is lower than a security level of the first security protection method; and the first terminal device performs security protection on the fourth message by using the first security protection method. In this solution, when the security level of the security protection method used on the control plane of the PC5 connection is lower than the security level of the first security protection method, because the first terminal device may perform security protection on the fourth message in the PC5 establishment procedure between the first terminal device and the second terminal device by using the first security protection method, a problem that the security level is degraded because the security level of the security protection method used on the control plane of the PC5 connection is lower than the security level of the first security protection method can be avoided, and a security level of the PC5 establishment procedure can be improved.

In a possible implementation, the communication method provided in some embodiments further includes: the first terminal device determines a second security protection method according to the first security protection method, where the second security protection method is a security protection method for a PC5 connection between the first terminal device and the second terminal device. In some embodiments, when determining the second security protection method, reference may be made to the first security protection method determined in the discovery procedure. Therefore, a security level of the determined second security protection method may be not lower than (e.g., higher than) the security level of the first security protection method. In other words, the security level of the first security protection method is the lowest security level of the PC5 connection in the PC5 establishment procedure, so that security is not degraded.

With reference to the first aspect or the second aspect, in a possible implementation, that the first terminal device determines a second security protection method according to the first security protection method includes: the first terminal device determines the first security protection method as the second security protection method. In other words, in some embodiments, the first terminal device may directly activate security of the PC5 connection between the first terminal device and the second terminal device according to the first security protection method. In this solution, the first terminal device does not need to negotiate the second security protection method with the second terminal device, but directly determines the first security protection method as the second security protection method. Therefore, processing logic of the first terminal device is simplified, and signaling overheads of the PC5 establishment procedure can be reduced.

With reference to the first aspect or the second aspect, in a possible implementation, that the first terminal device determines a second security protection method according to the first security protection method includes: the first terminal device receives a second security policy from the second terminal device, where the second security policy is a security policy of the second terminal device in the PC5 connection; and the first terminal device determines the second security protection method according to the second security policy and the first security protection method. In this solution, when determining the second security protection method, the first terminal device further refers to the second security policy of the second terminal device. Therefore, the second security protection method determined by the first terminal device can also be used by the second terminal device to a maximum extent.

With reference to the first aspect or the second aspect, in a possible implementation, that the first terminal device determines the second security protection method according to the second security policy and the first security protection method includes: when the first security protection method meets the second security policy, determining the first security protection method as the second security protection method. In some solutions, when the first security protection method meets the second security policy, the first security protection method is determined as the second security protection method. Therefore, the second security protection method determined by the first terminal device can also be used by the second terminal device. In addition, it is ensured that the security level of the first security protection method is the lowest security level of the PC5 connection in the PC5 establishment procedure, so that security is not degraded.

With reference to the first aspect or the second aspect, in a possible implementation, that the first terminal device determines the second security protection method according to the second security policy and the first security protection method includes: when the first security protection method meets the second security policy, selecting, according to the second security policy, a security protection method whose security level is not lower than (e.g., higher) that of the first security protection method as the first security protection method. In some solutions, when the first security protection method meets the second security policy, the security protection method whose security level is not lower than that of the first security protection method is selected as the first security protection method according to the second security policy. Therefore, the second security protection method determined by the first terminal device can also be used by the second terminal device. In addition, it is ensured that the security level of the first security protection method is the lowest security level of the PC5 connection in the PC5 establishment procedure, so that security is not degraded.

With reference to the first aspect or the second aspect, in a possible implementation, that the first terminal device determines the second security protection method according to the second security policy and the first security protection method includes: when the first security protection method does not meet the second security policy, selecting, according to the second security policy, a security protection method that meets the second security policy as the second security protection method. In this solution, when the first security protection method does not meet the second security policy, the security protection method that meets the second security policy is selected as the second security protection method according to the second security policy. Therefore, the second security protection method determined by the first terminal device can also be used by the second terminal device. In addition, it is ensured that the security level of the first security protection method is the lowest security level of the PC5 connection in the PC5 establishment procedure, so that security is not degraded.

With reference to the first aspect or the second aspect, in a possible implementation, the second security policy includes a second control plane security policy and/or a second user plane security policy, the second control plane security policy is a control plane security policy of the second terminal device in the PC5 connection, and the second user plane security policy is a user plane security policy of the second terminal device in the PC5 connection. In some embodiments, the second control plane security policy may be used to determine the security protection method used on the control plane of the PC5 connection, and the second user plane security policy may be used to determine the security protection method used on the user plane of the PC5 connection.

With reference to the first aspect or the second aspect, in a possible implementation, the second security protection method is used to perform security protection on a part or all of parameters transferred in control plane signaling of the PC5 connection; and/or the second security protection method is used to perform security protection on a part or all of user plane data of the PC5 connection. In other words, the second security protection method in some embodiments includes the security protection method used on the control plane of the PC5 connection and/or the security protection method used on the user plane of the PC5 connection. The security protection method used on the control plane of the PC5 connection is used to perform security protection on the part or all of parameters transferred in the control plane signaling of the PC5 connection. The security protection method used on the user plane of the PC5 connection is used to perform security protection on the part or all of user plane data of the PC5 connection.

With reference to the first aspect or the second aspect, in a possible implementation, that a first terminal device obtains a first security protection method includes: the first terminal device sends first information and $3^{rd}$ generation partnership project (3GPP) identity information of the first terminal device to a first direct communication discovery name management function network element, where the first information includes identity information used for a proximity-based service (ProSe) service or information used to determine the identity information used for the ProSe service; and the first terminal device receives the first security protection method from the first direct communication discovery name management function network element. Based on some solutions, the first terminal device may obtain the first security protection method in a discovery procedure between the first terminal device and the second terminal device.

According to a third aspect, a communication method is provided, where the method includes: a first direct communication discovery name management function network element receives first information and 3GPP identity information of a first terminal device from the first terminal device, where the first information includes identity information used for a ProSe service or information used to determine the identity information used for the ProSe service; the first direct communication discovery name management function network element determines, based on the first information and the 3GPP identity information of the first terminal device, a security protection method required for using the ProSe service by the first terminal device; and the first direct communication discovery name management function network element sends, to the first terminal device, the security protection method required for using the ProSe service by the first terminal device. According to the communication method provided in some embodiments, the first terminal device may obtain, in a discovery procedure between the first terminal device and a second terminal device, the security protection method required for using the ProSe service by the first terminal device.

In a possible implementation, that the first direct communication discovery name management function network element determines, based on the first information and the 3GPP identity information of the first terminal device, a security protection method required for using the ProSe service by the first terminal device includes: the first direct communication discovery name management function network element determines, based on the first information and the 3GPP identity information of the first terminal device, a plurality of corresponding optional security protection methods for using the ProSe service by the first terminal device; and the first direct communication discovery name management function network element determines, according to the plurality of optional security protection methods, the security protection method required for using the ProSe service by the first terminal device. In other words, in some embodiments, the security protection method required for using the ProSe service by the first terminal device is determined from the plurality of corresponding optional security protection methods required for using the ProSe service by the first terminal device.

In a possible implementation, the communication method provided in some embodiments further includes: the first direct communication discovery name management function network element obtains, from a second direct communication discovery name management function network element, a security protection method required for using the ProSe service by a second terminal device; and that the first direct communication discovery name management function network element determines, according to the plurality of optional security protection methods, the security protection method required for using the ProSe service by the first terminal device includes: the first direct communication discovery name management function network element determines whether the plurality of optional security protection methods include the security protection method required for using the ProSe service by the second terminal device; and when the plurality of optional security protection methods include the security protection method required for using the ProSe service by the second terminal device, the first direct communication discovery name management function network element determines the security protection method required for using the ProSe service by the second terminal device as the security protection method required for using the ProSe service by the first terminal device. Based on some solutions, the first terminal device and the second terminal device may obtain a same security protection method in the discovery procedure between the first terminal device and the second terminal device.

In a possible implementation, the communication method provided in some embodiments further includes: the first direct communication discovery name management function network element obtains, from a second direct communication discovery name management function network element, a security protection method required for using the ProSe service by a second terminal device; and that the first direct communication discovery name management function network element determines, according to the plurality of optional security protection methods, the security protection method required for using the ProSe service by the first terminal device includes: the first direct communication discovery name management function network element determines whether the plurality of optional security protection methods include the security protection method required for using the ProSe service by the second terminal device; and when the plurality of optional security protection methods do not include the security protection method required for using the ProSe service by the second terminal device, the first direct communication discovery name management function network element determines, from the plurality of optional security protection methods, the security protection method required for using the ProSe service by the first terminal device. Based on this solution, the first terminal device may obtain, in the discovery procedure between the first terminal device and the second terminal device, the security protection method required for using the ProSe service by the first terminal device.

In a possible implementation, the security protection method required for using the ProSe service is used to perform security protection on a fifth message, and the fifth message is the $1^{st}$ PC5 broadcast message in a discovery procedure between the first terminal device and the second terminal device. Based on some solutions, security protection on the fifth message can be implemented, to prevent the fifth message from being attacked or tampered with by an attacker.

In a possible implementation, the security protection method required for using the ProSe service is used to determine a security protection method for a PC5 connection between the first terminal device and the second terminal device. In some embodiments, when determining the security protection method for the PC5 connection between the first terminal device and the second terminal device, reference may be made to the security protection method determined in the discovery procedure. Therefore, a security level of the determined security protection method for the PC5 connection between the first terminal device and the second terminal device may be not lower than (e.g., higher than) a security level of the security protection method determined in the discovery procedure. In other words, the security level of the security protection method determined in the discovery procedure is the lowest security level of the PC5 connection in a PC5 establishment procedure, so that security is not degraded.

In a possible implementation, the security protection method for the PC5 connection is used to perform security protection on a part or all of parameters transferred in control plane signaling of the PC5 connection; and/or the security protection method for the PC5 connection is used to perform security protection on a part or all of user plane data of the PC5 connection. In other words, in some embodiments, the security protection method for the PC5 connection includes a security protection method used on a control plane of the PC5 connection and/or a security protection method used on a user plane of the PC5 connection. The security protection method used on the control plane of the PC5 connection is used to perform security protection on the part or all of parameters transferred in the control plane signaling of the PC5 connection. The security protection method used on the user plane of the PC5 connection is used to perform security protection on the part or all of user plane data of the PC5 connection.

In a possible implementation, the security protection method required for using the ProSe service is used to perform security protection on at least one message in a PC5 establishment procedure between the first terminal device and the second terminal device. In one aspect, when the security protection method required for using the ProSe service includes enabling integrity protection, because the security protection method required for using the ProSe service is used to perform security protection on the at least one message in the PC5 establishment procedure between the first terminal device and the second terminal device, a problem that a security level is degraded because the message in the PC5 establishment procedure is attacked or tampered with by an attacker can be avoided, and a security level of the PC5 establishment procedure can be improved. In another aspect, when a security level of the security protection method required for using the ProSe service is higher than or equal to a security level of the security protection method used on the control plane of the PC5 connection between the first terminal device and the second terminal device, because the security protection method required for using the ProSe service is used to perform security protection on the at least one message in the PC5 establishment procedure between the first terminal device and the second terminal device, a problem that the security level is degraded because the security level of the security protection method used on the control plane of the PC5 connection is lower than the security level of the security protection method that is required for using the ProSe service and that is determined in the discovery procedure can be avoided, and a security level of the PC5 establishment procedure can be improved.

In a possible implementation, the at least one message includes a first message, and the first message is the $1^{st}$ message in the PC5 establishment procedure. In other words, in some embodiments, security protection is performed on the first message by using the first security protection method. In this way, when the first security protection method includes enabling integrity protection, because the first terminal device may perform security protection on the first message by using the first security protection method, a problem that a security level is degraded because the first message in the PC5 establishment procedure is attacked or tampered with by an attacker can be avoided, and a security level of the PC5 establishment procedure can be improved.

According to a fourth aspect, a communication apparatus is provided, to implement the foregoing methods. The communication apparatus may be the first terminal device in the first aspect or the second aspect, or an apparatus including the first terminal device. Alternatively, the communication apparatus may be the first direct communication discovery name management function network element in the third aspect, or an apparatus including the first direct communication discovery name management function network element. The communication apparatus includes a corresponding module, unit, circuits, or means for implementing the foregoing method. The module, the unit, or the means may be implemented by hardware or software, or implemented by hardware by executing corresponding software. The hardware or the software includes one or more modules or units corresponding to the foregoing functions.

According to a fifth aspect, a communication apparatus is provided, and includes a processor and a memory. The memory is configured to store computer instructions, and when the processor executes the instructions, the communication apparatus is enabled to perform the method according to any one of the foregoing aspects. The communication apparatus may be the first terminal device in the first aspect or the second aspect, or an apparatus including the first terminal device. Alternatively, the communication apparatus may be the first direct communication discovery name management function network element in the third aspect, or an apparatus including the first direct communication discovery name management function network element.

According to a sixth aspect, a communication apparatus is provided, and includes a processor. The processor is configured to: be coupled to a memory; and after reading instructions in the memory, perform the method according to any one of the foregoing aspects according to the instructions. The communication apparatus may be the first terminal device in the first aspect or the second aspect, or an apparatus including the first terminal device. Alternatively, the communication apparatus may be the first direct communication discovery name management function network element in the third aspect, or an apparatus including the first direct communication discovery name management function network element.

According to a seventh aspect, a communication apparatus is provided, and includes a processor and an interface circuit. The interface circuit is configured to: receive a computer program or instructions, and transmit the computer program or the instructions to the processor. The processor is configured to execute the computer program or instructions, to enable the communication apparatus to perform the method according to any one of the foregoing aspects. The communication apparatus may be the first terminal device in the first aspect or the second aspect, or an apparatus including the first terminal device. Alternatively, the communication apparatus may be the first direct communication discovery name management function network element in the third aspect, or an apparatus including the first direct communication discovery name management function network element.

According to an eighth aspect, a computer-readable storage medium is provided. The computer-readable storage medium stores instructions. When the instructions are run on a computer, the computer is enabled to perform the method according to any one of the foregoing aspects.

According to a ninth aspect, a computer program product including instructions is provided. When the computer program product runs on a computer, the computer is enabled to perform the method according to any one of the foregoing aspects.

According to a tenth aspect, a communication apparatus (for example, the communication apparatus may be a chip or a chip system) is provided. The communication apparatus includes a processor, configured to implement the function in any one of the foregoing aspects. In a possible implementation, the communication apparatus further includes a memory. The memory is configured to store program instructions and data that are necessary. When the communication apparatus is the chip system, the communication apparatus may include a chip, or may include a chip and another discrete component.

For technical effects brought by any one of the possible implementations of the fourth aspect to the tenth aspect, refer to technical effects brought by different designs of the first aspect, the second aspect, or the third aspect. Details are not described herein again.

According to an eleventh aspect, a communication system is provided. The communication system includes a first terminal device and a second terminal device. The first terminal device is configured to obtain a first security protection method, where the first security protection method is a security protection method determined in a discovery procedure between the first terminal device and the second terminal device. The first terminal device is further configured to: after performing security protection on at least one message in a PC5 establishment procedure between the first terminal device and the second terminal device by using the first security protection method, send the at least one security-protected message to the second terminal device. The second terminal device is configured to: receive the at least one security-protected message, and perform security deprotection on the at least one message by using the first security protection method. For a technical effect of the eleventh aspect, refer to the second aspect. Details are not described herein again.

In a possible implementation, the first terminal device or the second terminal device is further configured to determine a second security protection method according to the first security protection method, where the second security protection method is a security protection method for a PC5 connection between the first terminal device and the second terminal device. For a technical effect of this solution, refer to the first aspect. Details are not described herein again.

In a possible implementation, the communication system further includes a first direct communication discovery name management function network element and a second direct communication discovery name management function network element. That the first terminal device is configured to obtain a first security protection method includes: the first terminal device is configured to receive, from the first direct communication discovery name management function network element, a security protection method required for using a ProSe service by the first terminal device. Similarly, the second terminal device is further configured to receive, from the second direct communication discovery name management function network element, a security protection method required for using the ProSe service by the second terminal device. Each of the security protection method required for using the ProSe service by the first terminal device and the security protection method required for using the ProSe service by the second terminal device is the foregoing first security protection method. Based on this solution, the first terminal device or the second terminal device may obtain, in the discovery procedure between the first terminal device and the second terminal device, the security protection method required for using the ProSe service.

According to a twelfth aspect, a communication system is provided. The communication system includes a first direct communication discovery name management function network element and a second direct communication discovery name management function network element. The first direct communication discovery name management function network element is configured to obtain, from the second direct communication discovery name management function network element, a security protection method required for using a ProSe service by a second terminal device. The first direct communication discovery name management function network element is further configured to: determine a plurality of corresponding optional security protection methods for using the ProSe service by a first terminal device; and after determining, according to the plurality of optional security protection methods and the security protection method required for using the ProSe service by the second terminal device, a security protection method required for using the ProSe service by the first terminal device, send, to the first terminal device, the security protection method required for using the ProSe service by the first terminal device. For a technical effect of the twelfth aspect, refer to the third aspect. Details are not described herein again.

DESCRIPTION OF EMBODIMENTS

Figure 1A:
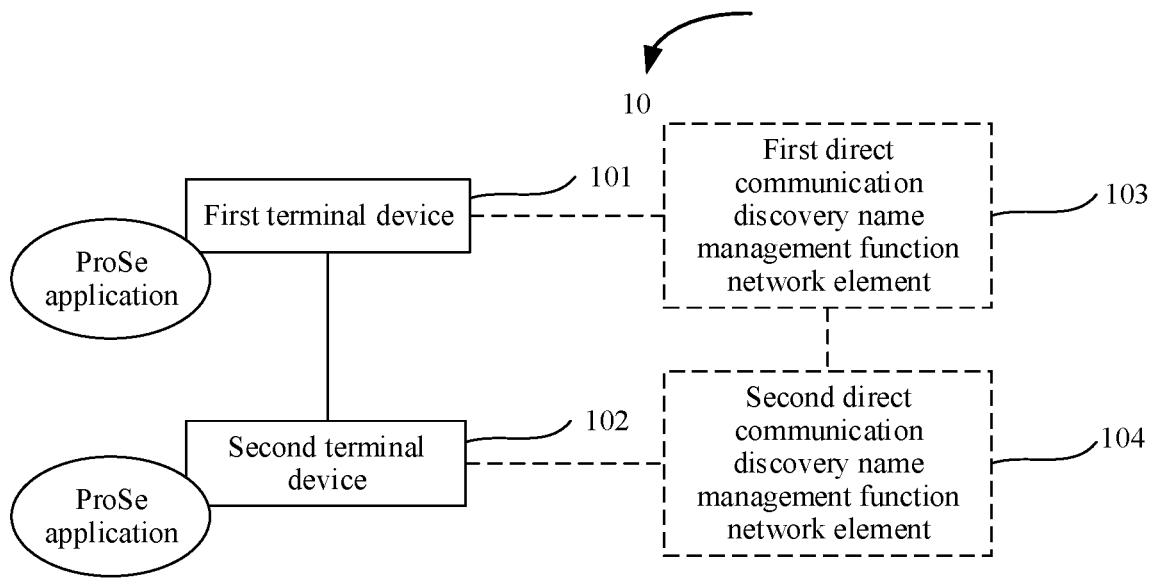
FIG. 1a is a schematic diagram of a structure of a communication system according to an embodiment of this application.

For ease of understanding of the technical solutions in embodiments of this application, the technologies related to this application are first briefly described as follows.

First, Discovery Type:

In embodiments of this application, the discovery type includes open discovery or restricted discovery. For related descriptions of the open discovery and the restricted discovery, refer to the existing $3^{rd}$ generation partnership project (3GPP) technical standard (TS) 23.303, v15.1.0. Details are not described herein. For example, if a terminal device plays a game without a clear game partner, the terminal device can initiate open discovery and "randomly" find a game partner. If the terminal device has a clear partner to play the game, the terminal device may "designate" a partner by restricting discovery. Only the partner designated by the terminal device can access the game, and another partner cannot. Therefore, the open discovery is like a shake app, which can be randomly shaken to another user who has opened the shake app. The restricted discovery is, for example, joining a private group. Only users who know the group number can access the group.

Second, Discovery Mode:

In the existing 4G ProSe standard (3GPP TS 23.303, v15.1.0), a model A or a model B is defined. A difference between the model A and the model B lies in a discovery initiation manner. The model A means: "I am here". In a model A discovery procedure, terminal devices at both ends are an announcing user equipment (UE) and a monitoring UE. The announcing UE broadcasts: "I am here". After receiving a message broadcast by the announcing UE, the monitoring UE determines, based on whether a service requirement of the monitoring UE is met, whether to establish a proximity-based service connection to the announcing UE. The model B means: "who is there?/where are you?". In a model B discovery procedure, terminal devices at both ends are a discoveree UE and a discoverer UE. The discoverer UE initiates a specific service request, where the request includes specific information, to be specific, "who is there?/where are you?". After receiving the service request initiated by the discoverer UE, the discoveree UE determines, based on whether the discoveree UE can provide a service, whether to reply to the request message. If the discoveree UE replies with a response message, it indicates that "I am here". In embodiments of this application, descriptions are provided by using an example in which an open discovery scenario is applicable to the model A discovery model, and a restricted discovery scenario is applicable to two discovery models: the model A and the model B. This is uniformly described herein, and details are not described below.

Third, Discovery Command:

In embodiments of this application, the discovery command is used to notify a network side of whether two terminal devices that communicate with each other are an announcing UE and a monitoring UE, or are a response terminal device (e.g., response UE) or a query terminal device (e.g., query UE). The announcing UE and the monitoring UE are terminal devices at both ends in the foregoing model A discovery procedure, and the response UE and the query UE respectively correspond to the discoveree UE and the discoverer UE in the foregoing model B discovery procedure. This is uniformly described herein, and details are not described below.

Fourth, Identity Information (e.g., User Identity) Used for a ProSe Service:

The identity information used for the ProSe service may be, for example, an application level user identity. For example, the identity information used for the ProSe service may be a proximity-based service application identity (ProSe application ID), a restricted proximity-based service application user identity (RPAUID), or a proximity-based discovery UE identity (PDUID). In embodiments of this application, descriptions are provided by using an example in which the ProSe application ID is used in the open discovery scenario, and the PDUID or the RPAUID is used in the restricted discovery scenario. This is uniformly described herein, and details are not described below.

Fifth, PC5 Connection and PC5 Connection Establishment Procedure:

The PC5 connection in embodiments of this application is a communication connection between terminal devices based on a PC5 interface.

The PC5 connection establishment procedure in embodiments of this application is used to establish a communication connection between at least two terminal devices that support the PC5 interface. After the PC5 connection is established, the at least two terminal devices may perform control plane signaling negotiation and/or user plane data transferring by using the PC5 connection. The PC5 connection establishment procedure in embodiments of this application may include a PC5 one-to-one communication procedure and a PC5 one-to-many communication procedure. The PC5 one-to-one communication procedure is used to establish a communication connection between two terminal devices that support the PC5 interface, and the PC5 one-to-many communication procedure is used to establish a communication connection between more than two terminal devices that support the PC5 interface. In the following embodiments of this application, an example in which a communication connection is established between two terminal devices is used for description. In other words, in the following embodiments of this application, the PC5 one-to-one communication procedure is used as an example for description. For a manner of establishing a communication connection between any two terminal devices in the PC5 one-to-many communication procedure, refer to a procedure of establishing a communication connection between two terminal devices in the PC5 one-to-one communication procedure. This is uniformly described herein, and details are not described below.

Sixth, Security Policy:

The security policy is a policy used to describe whether to enable security protection and may be used to determine a security protection method. In embodiments of this application, security policies used in different scenarios include at least one of the following:

- a control plane confidentiality protection policy in the PC5 connection;
- a control plane integrity protection policy in the PC5 connection;
- a user plane confidentiality protection policy in the PC5 connection; or
- a user plane integrity protection policy in the PC5 connection.

Control plane confidentiality protection is to protect signaling confidentiality during transmission. Control plane integrity protection is to protect signaling integrity during transmission. User plane confidentiality protection is to protect confidentiality of user plane data during transmission. User plane integrity protection is to protect integrity of user plane data during transmission. In embodiments of this application, integrity means that obtained signaling or data is consistent with original signaling or data and is not modified. Therefore, integrity protection is used to prevent an attacker from attacking the signaling or data. Confidentiality means that real content cannot be directly seen. Therefore, confidentiality protection is used to make the attacker "unreadable". In addition, confidentiality protection in embodiments of this application may also be referred to as encryption protection. This is uniformly described herein, and details are not described below.

In embodiments of this application, the control plane confidentiality protection policy in the PC5 connection and the control plane integrity protection policy in the PC5 connection belong to a control plane security policy in the PC5 connection. The user plane confidentiality protection policy in the PC5 connection and the user plane integrity protection policy in the PC5 connection belong to a user plane security policy in the PC5 connection. This is uniformly described herein, and details are not described below.

In embodiments of this application, there are three protection policies: enabling (REQUIRED), disabling (NOT NEEDED), and optional (PREFERRED). REQUIRED indicates that security needs to be enabled, NOT NEEDED indicates that security does not need to be enabled, and PREFERRED prefers to be enabled or referred to as optional enabled, that is, security may be enabled or may be disabled. This is uniformly described herein, and details are not described below.

For example, the control plane confidentiality protection policy in the PC5 connection is used as an example. In this case, the control plane confidentiality protection policy in the PC5 connection includes: The control plane confidentiality protection in the PC5 connection is enabled (REQUIRED), the control plane confidentiality protection in the PC5 connection is disabled (NOT NEEDED), or the control plane confidentiality protection in the PC5 connection is optional (PREFERRED). For an example of the control plane confidentiality protection policy in the PC5 connection, the user plane confidentiality protection policy in the PC5 connection, or the user plane integrity protection policy in the PC5 connection, refer to the example of the control plane confidentiality protection policy in the PC5 connection. Details are not described herein again.

It should be noted that, in embodiments of this application, when the security policy is sent, generally, only one of the three types (REQUIRED, NOT NEEDED, and PREFERRED) is selected for sending. In some special scenarios, at least two types may be selected for sending, and one of types is PREFERRED. For example, when NOT NEEDED and PREFERRED are sent, it represents that security protection prefers to be disabled. When REQUIRED and PREFERRED are sent, it represents that security protection prefers to be enabled.

It should be noted that in embodiments of this application, the control plane confidentiality protection policy in the PC5 connection, the control plane integrity protection policy in the PC5 connection, the user plane confidentiality protection policy in the PC5 connection, and the user plane integrity protection policy of the PC5 connection may be the same. This is not limited to some embodiments of this application.

Seventh, Security Capability:

In embodiments of this application, the security capability includes at least one of the following:
one or more control plane confidentiality protection algorithms supported in the PC5 connection;
one or more control plane integrity protection algorithms supported in the PC5 connection;
one or more user plane confidentiality protection algorithms supported in the PC5 connection; or
one or more user plane integrity protection algorithms supported in the PC5 connection.

The control plane confidentiality protection algorithm is a confidentiality protection algorithm used to protect a control plane. The control plane integrity protection algorithm is an integrity protection algorithm used to protect the control plane. The user plane confidentiality protection algorithm is a confidentiality protection algorithm used to protect a user plane. The user plane integrity protection algorithm is an integrity protection algorithm used to protect the user plane. The one or more control plane confidentiality protection algorithms supported in the PC5 connection and the one or more control plane integrity protection algorithms supported in the PC5 connection belong to a control plane security capability in the PC5 connection. The one or more user plane confidentiality protection algorithms supported in the PC5 connection and the one or more user plane integrity protection algorithms supported in the PC5 connection belong to a user plane security capability in the PC5 connection. This is uniformly described herein, and details are not described below.

It should be noted that in embodiments of this application, the one or more control plane confidentiality protection algorithms supported in the PC5 connection, the one or more control plane integrity protection algorithms supported in the PC5 connection, the one or more user plane confidentiality protection algorithms supported in the PC5 connection, and the one or more user plane integrity protection algorithms supported in the PC5 connection may be the same or have a common entry. This is not limited to some embodiments of this application.

Eighth, Security Protection and Security Deprotection:

Security protection in embodiments of this application refers to protecting user plane data/control plane signaling by using a security protection method. Security deprotection in embodiments of this application refers to restoring the user plane data/control plane signaling according to the security protection method. The security protection method herein includes whether to enable confidentiality protection and/or integrity protection. This is uniformly described herein, and details are not described below.

When confidentiality protection is enabled, encryption protection may be performed on the user plane data/control plane signaling by using an encryption key and an encryption algorithm. When integrity protection is enabled, integrity protection may be performed on the user plane data/control plane signaling by using an integrity protection key and an integrity protection algorithm. In addition, it should be noted that, when encryption protection and integrity protection need to be performed on the user plane data/control plane signaling, encryption protection may be first performed on the user plane data/control plane signaling, and then integrity protection is performed. Alternatively, integrity protection may be first performed on the user plane data/control plane signaling, and then encryption protection is performed. An execution sequence of encryption protection and integrity protection is not limited in embodiments of this application. This is uniformly described herein, and details are not described below.

When confidentiality protection is enabled, the user plane data/control plane signaling may be decrypted by using the encryption key and the encryption algorithm. When integrity protection is enabled, integrity protection verification may be performed on the user plane data/control plane signaling by using the integrity protection key and the integrity protection algorithm. In addition, it may be understood that, when encryption protection and integrity protection are simultaneously performed on the user plane data/control plane signaling, if encryption protection is first performed on the user plane data/control plane signaling, and then integrity protection is performed, a security deprotection sequence is performing integrity protection verification first, and then decrypting the encrypted user plane data/control plane signaling; or if integrity protection is first performed on the user plane data/control plane signaling, and then encryption is performed, a security deprotection sequence is decrypting the encrypted user plane data/control plane signaling first, and then performing integrity protection verification. This is uniformly described herein, and details are not described below.

For example, the security protection methods in embodiments of this application are classified into the following three types.

1. A security protection method used for the $1^{st}$ PC5 broadcast message in a ProSe discovery procedure is used to protect a part or all of parameters transferred in the 1$^{st}$ PC5 broadcast message in the ProSe discovery procedure. The security protection method used for the 1$^{st}$ PC5 broadcast message may include, for example, whether to enable confidentiality protection and/or integrity protection of the 1$^{st}$ PC5 broadcast message. For example, "00" may indicate disabling confidentiality protection and disabling integrity protection; "01" may indicate disabling confidentiality protection and enabling integrity protection; "10" may indicate enabling confidentiality protection and disabling integrity protection; "11" may indicate enabling confidentiality protection and enabling integrity protection. It should be noted that an example in which a high bit represents confidentiality protection and a low bit represents integrity protection is used for description. Certainly, the low bit may alternatively represent confidentiality protection and the high bit may represent integrity protection. This is not limited to some embodiments of this application. In addition, an example in which "0" indicates disabling and "1" indicates enabling is used for description. Certainly, "1" may alternatively indicate disabling and "0" may indicate enabling. This is not limited to some embodiments of this application.

In embodiments of this application, different discovery modes correspond to different 1$^{st}$ PC5 broadcast messages. For example, in the model A discovery mode, the 1$^{st}$ PC5 broadcast message is sent by the announcing UE, and the 1$^{st}$ PC5 broadcast message may be an announcing message. In the model B discovery mode, the 1$^{st}$ PC5 broadcast message is sent by the discoverer UE, and the 1$^{st}$ PC5 broadcast message may be a query code message. This is uniformly described herein, and details are not described below.

2. A security protection method used on the control plane of the PC5 connection is used to protect a part or all of parameters transferred in the control plane signaling of the PC5 connection. The security protection method used on the control plane of the PC5 connection may include, for example, whether to enable confidentiality protection and/or integrity protection of the control plane of the PC5 connection. For a related example, refer to the example in the security protection method used for the 1$^{st}$ PC5 broadcast message. Details are not described herein again.

3. A security protection method used on the user plane of the PC5 connection is used to protect a part or all of user plane data of the PC5 connection. The security protection method used on the user plane of the PC5 connection may include, for example, whether to enable confidentiality protection and/or integrity protection of the user plane of the PC5 connection. For a related example, refer to the example in the security protection method used for the 1$^{st}$ PC5 broadcast message. Details are not described herein again.

It should be noted that, in embodiments of this application, the security protection method used on the control plane of the PC5 connection may also be referred to as a security protection method used for the control plane signaling of the PC5 connection. The security protection method used on the user plane of the PC5 connection may also be referred to as a security protection method used for the user plane data of the PC5 connection. This is uniformly described herein, and details are not described below.

Ninth, MIC and Expected MIC:

For example, a terminal device 1 sends a message 1 to a terminal device 2.

The MIC in embodiments of this application is a parameter generated after integrity protection is performed by using an integrity protection key of the terminal device 1 on a part or all of parameters transferred in the message 1 sent by the terminal device 1, and is included in the message 1.

The expected MIC in embodiments of this application is a parameter generated after integrity verification is performed by using an integrity protection key (which is the same as an integrity protection key of the terminal device 1) of the terminal device 2 on a part or all of parameters transferred in the message 1 received by the terminal device 2, and is used to compare with the MIC in the message 1 received by the terminal device 2, to further verify whether the message 1 received by the terminal device 2 is tampered with. Examples related to the MIC and the expected MIC are described in detail with reference to a subsequent method embodiment. Details are not described herein.

It should be noted that, in embodiments of this application, the integrity protection key of the terminal device 1 may be understood as a key used to perform integrity protection on the message 1 sent by the terminal device 1, and may be used by a device for generating the MIC. The device for generating the MIC may include, for example, the terminal device 1 or another device (for example, a direct communication discovery name management function network element corresponding to the terminal device 1). This is not limited to some embodiments of this application. Certainly, when the terminal device 1 is used as a message receiving device, that the terminal device 1 receives a message 2 from the terminal device 2 is used as an example, and the integrity protection key of the terminal device 1 may be understood as a key used to perform integrity verification on the message 2 received by the terminal device 1, and may be used by a device for generating the expected MIC. The device for generating the expected MIC may include, for example, the terminal device 1 or another device (for example, a direct communication discovery name management function network element corresponding to the terminal device 1). This is not limited to some embodiments of this application.

It should be noted that, in embodiments of this application, the integrity protection key of the terminal device 2 may be understood as a key used to perform integrity verification on the message 1 received by the terminal device 2, and may be used by the device for generating the expected MIC. The device for generating the expected MIC may include, for example, the terminal device 2 or another device (for example, a direct communication discovery name management function network element corresponding to the terminal device 2). This is not limited to some embodiments of this application. Certainly, when the terminal device 2 is used as a message sending device, that the terminal device 2 sends a message 2 to the terminal device 1 is used as an example, and the integrity protection key of the terminal device 2 may be understood as a key used to perform integrity protection on the message 2 sent by the terminal device 2, and may be used by the device for generating the MIC. The device for generating the MIC may include, for example, the terminal device 2 or another device (for example, a direct communication discovery name management function network element corresponding to the terminal device 2). This is not limited to some embodiments of this application.

The following describes technical solutions in embodiments of this application with reference to the accompanying drawings in embodiments of this application. In the descriptions of this application, unless otherwise specified, "/" indicates an "or" relationship between correlated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, unless otherwise specified, "a plurality of" in the descriptions of this application means two or more than two. "At least one item (piece) of the following" or a similar expression thereof means any combination of the items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, for convenience of clear description of the technical solutions in embodiments of this application, in embodiments of this application, terms such as "first" and "second" are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments in this application should not be explained as being more preferable or having more advantages than another embodiment or design scheme. Exactly, use of the word such as "example" or "for example" is intended to present a relative concept in a specific manner for ease of understanding.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

A V2X PC5 establishment procedure between a UE 1 and a UE 2 is used as an example. In an existing V2X PC5 establishment procedure (where for details, refer to 3GPP TS 23.303), the 1$^{st}$ message: a direct communication request needs to carry a control plane security policy (signaling security policy) of the UE 1 in a PC5 connection, to assist the UE 2 in negotiating the control plane security policy of the PC5 connection. Security protection is not performed on the message. In this way, when security policies configured for both the UE 1 and the UE 2 are optional (PREFERRED), after receiving the direct communication request sent by the UE 1, an intermediate attacker may tamper with the signaling security policy in the direct communication request to disabling (NOT NEEDED). Then, the UE 2 discovers that a requirement of the UE 1 is disabling security protection on a control plane of the PC5 connection, determines that a security protection method for the control plane of the PC5 connection is disabling security protection on the control plane, and sends a direct security mode command to the UE 1. Because security protection is disabled on the control plane, the attacker may tamper with the signaling security policy in the direct security mode command back to content sent by the UE 1 in the direct communication request. For subsequent control plane security of the PC5 connection, control plane security protection is forcibly disabled under the interference of the intermediate attacker. However, in the PC5 establishment procedure, when control plane security policies for both the UE 1 and the UE 2 are optional (PREFERRED) and are not tampered with by the intermediate attacker, control plane security protection can be enabled. The attacker forcibly disables control plane security protection between the UE 1 and the UE 2 in the foregoing manner, which causes a security level to be degraded, and subsequent negotiation of a user plane security policy in the PC5 connection is further attacked by the attacker because there is no control plane security protection.

To resolve this problem, an embodiment of this application provides a communication system 10. As shown in FIG. 1a, the communication system 10 includes a first terminal device 101 having a ProSe application function and a second terminal device 102 having a ProSe application function. The first terminal device 101 obtains a first security protection method, where the first security protection method is a security protection method determined in a discovery procedure between the first terminal device 101 and the second terminal device 102. Further, after performing security protection on at least one message in a PC5 establishment procedure between the first terminal device 101 and the second terminal device 102 by using the first security protection method, the first terminal device 101 sends the at least one security-protected message to the second terminal device 102. An implementation of this solution is described in detail in a subsequent method embodiment. Details are not described herein. According to the communication system provided in some embodiments, in one aspect, when the first security protection method includes enabling integrity protection, because the first terminal device may perform security protection on the at least one message in the PC5 establishment procedure between the first terminal device and the second terminal device by using the first security protection method, a problem that a security level is degraded because the message in the PC5 establishment procedure is attacked or tampered with by an attacker can be avoided, and a security level of the PC5 establishment procedure can be improved. In another aspect, when a security level of the first security protection method is higher than or equal to a security level of a security protection method used on a control plane of a PC5 connection between the first terminal device and the second terminal device, because the first terminal device may perform security protection on the at least one message in the PC5 establishment procedure between the first terminal device and the second terminal device by using the first security protection method, a problem that the security level is degraded because the security level of the security protection method used on the control plane of the PC5 connection is lower than the security level of the first security protection method can be avoided, and a security level of the PC5 establishment procedure can be improved.

Optionally, in some embodiments, the first terminal device 101 or the second terminal device 102 may further determine a second security protection method according to the first security protection method, where the second security protection method is a security protection method for the PC5 connection between the first terminal device 101 and the second terminal device 102. In some embodiments, when determining the second security protection method, reference may be made to the first security protection method determined in the discovery procedure. Therefore, a security level of the determined second security protection method may be not lower than the security level of the first security protection method. In other words, the security level of the first security protection method is the lowest security level of the PC5 connection in the PC5 establishment procedure, so that security is not degraded.

Optionally, as shown in FIG. 1a, the communication system 10 may further include a first direct communication discovery name management function network element 103 and a second direct communication discovery name management function network element 104. That the first terminal device 101 obtains a first security protection method includes: the first terminal device 101 receives, from the first direct communication discovery name management function network element 103, a security protection method required for using a ProSe service by the first terminal device 101. Similarly, the second terminal device 102 may receive, from the second direct communication discovery name management function network element 104, a security protection method required for using the ProSe service by the second terminal device 102. Each of the security protection method required for using the ProSe service by the first terminal device 101 and the security protection method required for using the ProSe service by the second terminal device 102 is the foregoing first security protection method. Based on this solution, the first terminal device or the second terminal device may obtain, in the discovery procedure between the first terminal device and the second terminal device, the security protection method required for using the ProSe service.

Figure 1B:
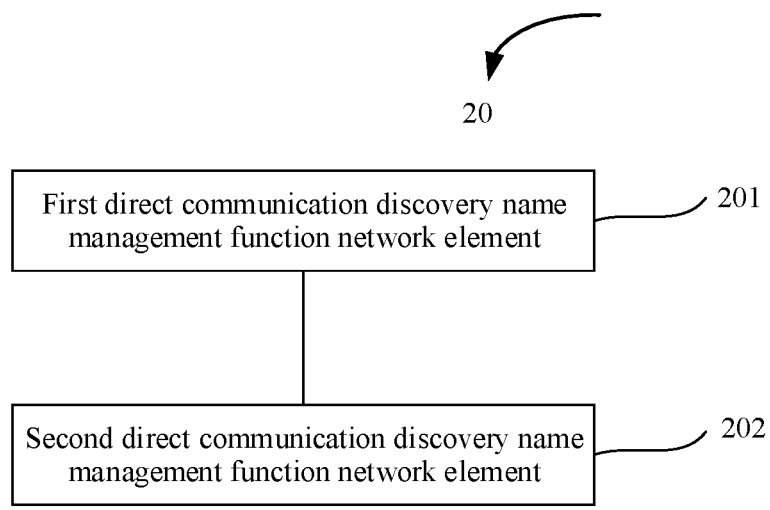
FIG. 1b is a schematic diagram of a structure of a communication system according to an embodiment of this application.

FIG. 1b shows another communication system 20 according to an embodiment of this application. The communication system 20 includes a first direct communication discovery name management function network element 201 and a second direct communication discovery name management function network element 202. The first direct communication discovery name management function network element 201 and the second direct communication discovery name management function network element 202 may directly communicate with each other, or may communicate with each other through forwarding of another device. This is not limited to some embodiments.

The first direct communication discovery name management function network element 201 obtains, from the second direct communication discovery name management function network element 202, a security protection method required for using a ProSe service by a second terminal device. The first direct communication discovery name management function network element 201 determines a plurality of corresponding optional security protection methods required for using the ProSe service by a first terminal device. Further, after determining, according to the plurality of optional security protection methods and the security protection method required for using the ProSe service by the second terminal device, the security protection method required for using the ProSe service by the first terminal device, the first direct communication discovery name management function network element 201 sends, to the first terminal device, the security protection method required for using the ProSe service by the first terminal device. An implementation of this solution is described in detail in a subsequent method embodiment. Details are not described herein. According to the communication system provided in some embodiments, the first terminal device may obtain, in a discovery procedure between the first terminal device and the second terminal device, the security protection method required for using the ProSe service by the first terminal device.

Optionally, the communication system 10 shown in FIG. 1a or the communication system 20 shown in FIG. 1b is applicable to a currently discussed 5G network, or is applicable to another future network, or the like. This is not limited to some embodiments of this application.

For example, that the communication system 10 shown in FIG. 1a or the communication system 20 shown in FIG. 1b is applicable to the currently discussed 5G network is used as an example. In this case, a network element or an entity corresponding to the direct communication discovery name management function network element (including the first direct communication discovery name management function network element 201 and the second direct communication discovery name management function network element 202 in FIG. 1b) in embodiments of this application may be a direct communication discovery name management function (DDNMF) network element in the 5G network. A network element or an entity corresponding to the terminal device (including the first terminal device 101 and the second terminal device 102 in FIG. 1a) in embodiments of this application may be a terminal device that has a ProSe application function in the 5G network.

Figure 2:
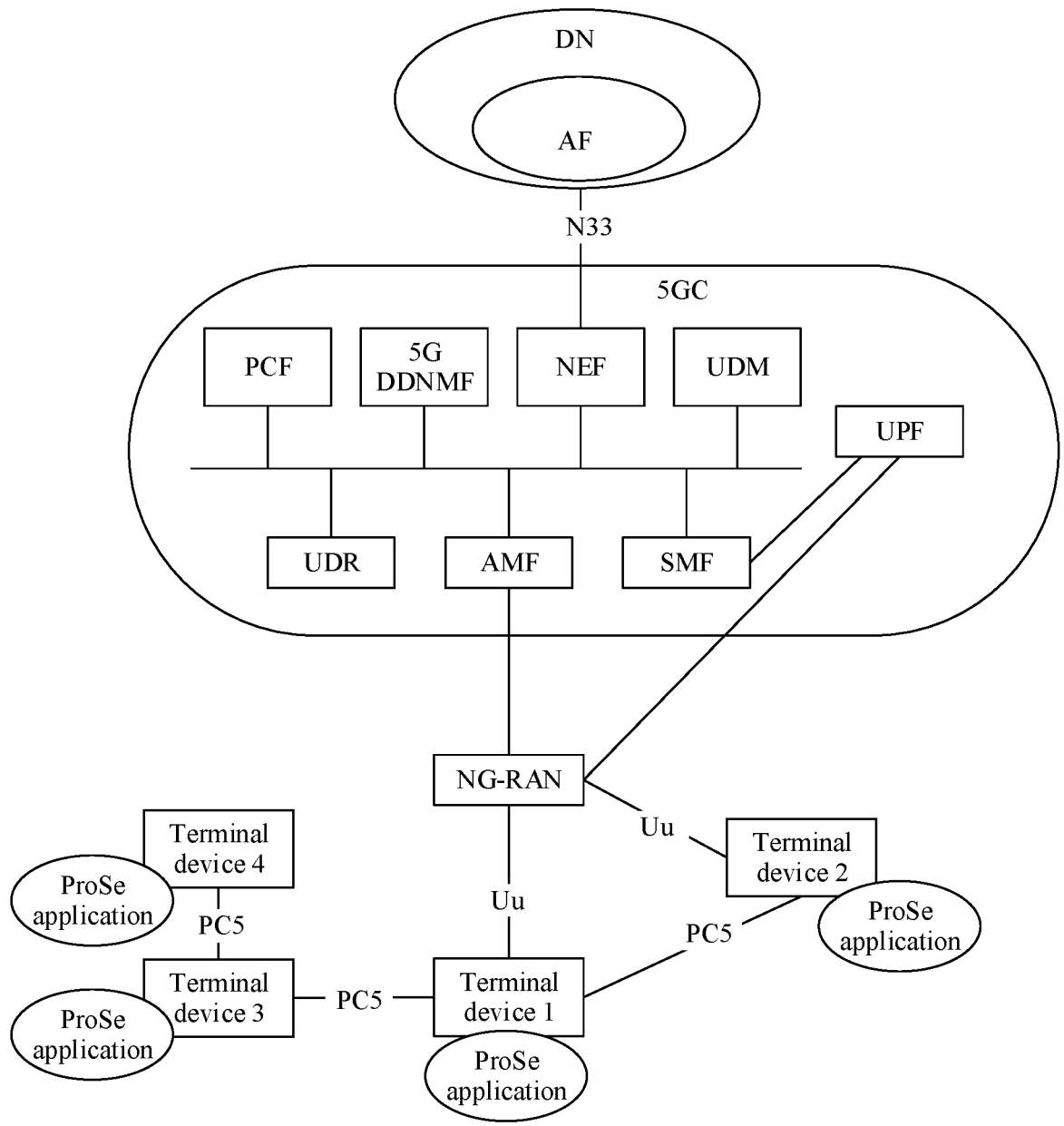
FIG. 2 is a schematic architectural diagram of a proximity-based service (ProSe) control plane in a fifth generation (5G) network according to an embodiment of this application.

FIG. 2 is a schematic architectural diagram of a ProSe control plane in a 5G network according to an embodiment of this application. The architecture includes one or more terminal devices (where in FIG. 2, an example in which the architecture includes a terminal device 1, a terminal device 2, a terminal device 3, and a terminal device 4 is used for illustration), a next generation-radio access network (NG-RAN) device, a unified data repository (UDR) network element, a unified data management (UDM) network element, a session management function (SMF) network element, an access and mobility management function (AMF) network element, a network exposure function (NEF) network element, a policy control function (PCF) network element, a user plane function (UPF) network element, a 5G DDNMF network element, and a data network (DN).

Compared with conventional cellular network communication, a terminal device that can be used for Prose communication needs to have a proximity-based service application (ProSe application) function, and terminal devices that have the ProSe application function communicate with each other through a PC5 interface. A ProSe application server corresponds to the ProSe application. The ProSe application server may be an application function (AF) network element in the DN. An AF that has a ProSe application server function has all functions of the AF defined in Release 23.501 R-15, as well as a related function used for a Prose service. In other words, in the ProSe control plane architecture in the 5G network, the ProSe application server and the terminal device perform user plane communication by using a path: terminal device-NG-RAN device-UPF network element-AF network element. In addition, the ProSe application server may alternatively communicate with another network function (NF) in a 5G core network (5GC) by using the NEF, for example, communicate with the PCF network element by using the NEF network element.

In some embodiments, the DDNMF network element has functions of allocating and processing, for open ProSe direct discovery, a mapping relationship between a ProSe application ID and code used for ProSe discovery. In restricted ProSe direct discovery, the DDNMF network element communicates with the ProSe application server through a PC2 interface, to process authorization of a discovery request.

In addition, for related descriptions of the AMF network element, the UDR network element, the SMF network element, the UPF network element, the UDM network element, the NEF network element, or the PCF network element, refer to the existing 3GPP 5G standard. Details are not described herein again.

Optionally, the terminal device in embodiments of this application may be a device configured to implement a wireless communication function, for example, a terminal or a chip that may be used in the terminal. The terminal device may be deployed on land, where the deployment includes indoor or outdoor, or handheld or vehicle-mounted deployment, may be deployed on water (for example, on a ship), or may be deployed in air (for example, on aircraft, a balloon, and a satellite). The terminal may be UE, an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, an unmanned aerial vehicle (UAV), an unmanned aerial vehicle controller (UAVC), a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

Optionally, the RAN device in embodiments of this application is a device that provides a wireless communication function for the terminal device. For example, the access network device includes but is not limited to a next-generation gNodeB (gNB) in 5G, an evolved NodeB (eNB), a radio network controller (RNC), a NodeB (NB), a base station controller (BSC), a base transceiver station (BTS), a home base station (for example, a home evolved NodeB, or home NodeB, HNB), a baseband unit (BBU), a transmission reception point (TRP), a transmission point (TP), a mobile switching center, and the like.

Optionally, each of the first terminal device, the second terminal device, the first direct communication discovery name management function network element, and the second direct communication discovery name management function network element in embodiments of this application may also be referred to as a communication apparatus, and may be a general-purpose device or a dedicated device. This is not limited to some embodiments of this application.

Optionally, related functions of the first terminal device, the second terminal device, the first direct communication discovery name management function network element, and the second direct communication discovery name management function network element in embodiments of this application may be implemented by one device, may be jointly implemented by a plurality of devices, or may be implemented by one or more functional modules in one device. This is not limited to some embodiments of this application. It may be understood that the foregoing function may be a network element in a hardware device, may be a software function running on dedicated hardware, a combination of hardware and software, or a virtualization function instantiated on a platform (for example, a cloud platform).

Figure 3:
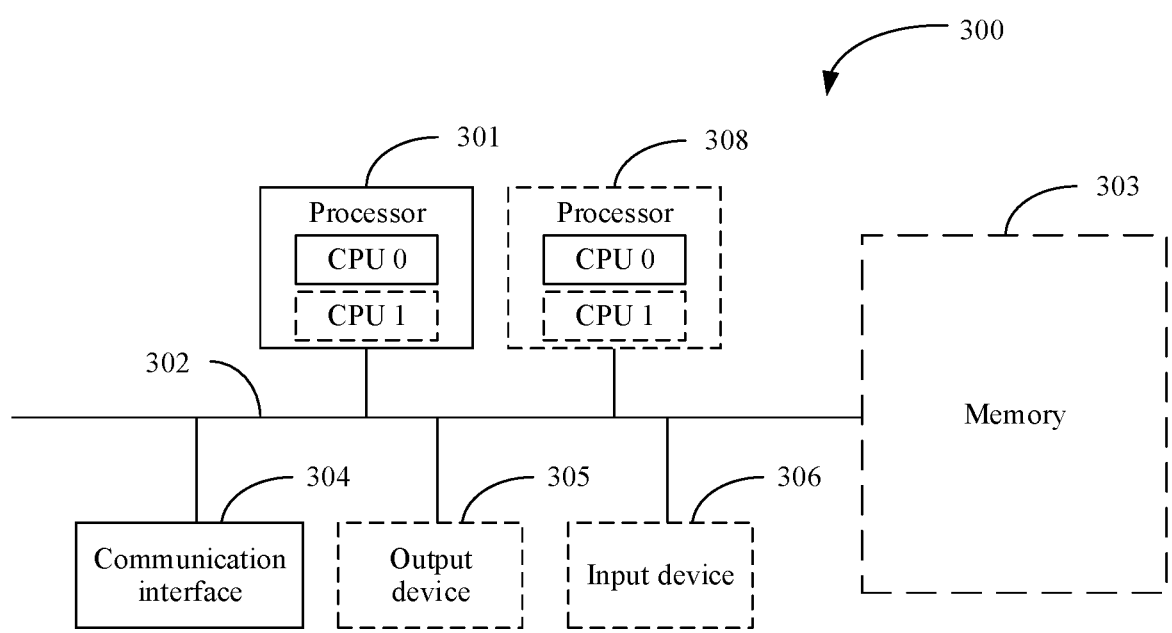
FIG. 3 is a schematic diagram of a structure of a communication device according to an embodiment of this application.

For example, related functions of the first terminal device, the second terminal device, the first direct communication discovery name management function network element, and the second direct communication discovery name management function network element in embodiments of this application may be implemented by a communication device 300 in FIG. 3. FIG. 3 is a schematic diagram of a structure of a communication device 300 according to an embodiment of this application. The communication device 300 includes one or more processors 301, a communication line 302, and at least one communication interface (where in FIG. 3, only an example in which a communication interface 304 and one processor 301 are included is used for description). Optionally, the communication device 300 may further include a memory 303.

The processor 301 may be a general-purpose central processing unit (CPU), a microprocessor, an application-specific integrated circuit (ASIC), or one or more integrated circuits configured to control program execution of the solutions of this application.

The communication line 302 may include a path used to connect different components.

The communication interface 304 may be a transceiver module configured to communicate with another device or a communication network, for example, the Ethernet, a RAN, or a wireless local area network (WLAN). For example, the transceiver module may be an apparatus such as a transceiver or a transceiver machine. Optionally, the communication interface 304 may alternatively be a transceiver circuit located inside the processor 301, and is configured to implement signal input and signal output of the processor.

The memory 303 may be an apparatus having a storage function. For example, the memory 303 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in a form of an instruction or a data structure and that can be accessed by a computer. However, this is not limited herein. The memory may exist independently, and is connected to the processor through the communication line 302. The memory may alternatively be integrated with the processor.

The memory 303 is configured to store computer-executable instructions for performing the solutions in this application, and the processor 301 controls execution. The processor 301 is configured to execute the computer-executable instructions stored in the memory 303, to implement the communication method provided in embodiments of this application.

Alternatively, optionally, in embodiments of this application, the processor 301 may perform processing related functions in a communication method provided in the following embodiment in this application, and the communication interface 304 is responsible for communication with another device or a communication network. This is not limited to some embodiments of this application.

Optionally, the computer-executable instructions in embodiments of this application may also be referred to as application program code. This is not limited to some embodiments of this application.

During some implementations, in an embodiment, the processor 301 may include one or more CPUs such as a CPU 0 and a CPU 1 in FIG. 3.

During some implementations, in an embodiment, the communication device 300 may include a plurality of processors, for example, the processor 301 and a processor 308 in FIG. 3. Each of the processors may be a single-core processor or a multi-core processor. The processor herein may include but is not limited to at least one of the following various computing devices that run software: a central processing unit (CPU), a microprocessor, a digital signal processor (DSP), a microcontroller unit (MCU), an artificial intelligence (AI) processor, or the like. Each computing device may include one or more cores configured to perform an operation or processing by executing software instructions.

During some implementations, in an embodiment, the communication device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector, or the like. The input device 306 communicates with the processor 301, and may receive an input of a user in a plurality of manners. For example, the input device 306 may be a mouse, a keyboard, a touchscreen device, or a sensing device.

The communication device 300 sometimes may also be referred to as a communication apparatus, and may be a general-purpose device or a dedicated device. For example, the communication device 300 may be a desktop computer, a portable computer, a network server, a palmtop computer (PDA), a mobile phone, a tablet computer, a wireless terminal device, an embedded device, the foregoing terminal device, the foregoing network device, or a device having a structure similar to the structure shown in FIG. 3. A type of the communication device 300 is not limited in embodiments of this application.

The following describes the communication method provided in embodiments of this application by way of example with reference to the accompanying drawings.

It should be noted that in the following embodiments of this application, names of messages between network elements, names of parameters in messages, or the like are merely examples, and may be other names during specific implementation. This is not limited to some embodiments of this application.

It should be noted that in embodiments of this application, "performing security protection on a message" may be understood as performing security protection on a part or all of parameters transferred in the message. This is uniformly described herein, and details are not described below.

An embodiment of this application provides a communication method. In the communication method, one or more messages in a PC5 establishment procedure are protected by using a security protection method determined in a ProSe discovery procedure, so that a security level of the PC5 establishment procedure can be improved. Optionally, in some embodiments, a security protection method used on a control plane of a PC5 connection and/or a security protection method used on a user plane of the PC5 connection may be determined according to the security protection method determined in the ProSe discovery procedure. A security level of the security protection method used on the control plane of the PC5 connection and/or a security level of the security protection method used on the user plane of the PC5 connection are/is not lower than that of the security protection method determined in the ProSe discovery procedure. In other words, the security protection method determined in the ProSe discovery procedure has a minimum security requirement for the PC5 connection in the PC5 establishment procedure. In this way, the security is not degraded.

The following describes the communication method in detail with reference to several examples.

Figure 4:
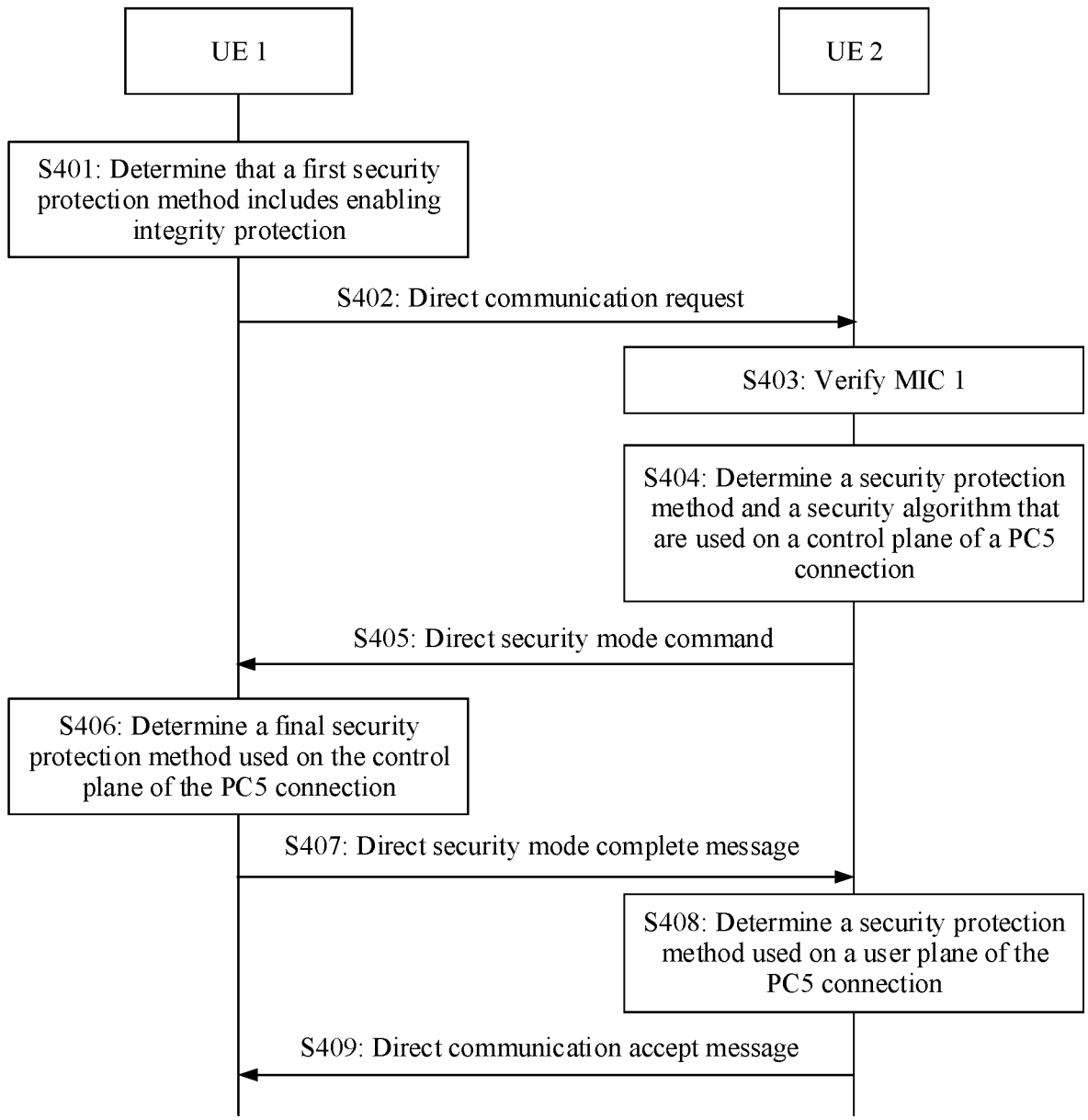
FIG. 4 is a schematic interaction diagram of a communication method according to an embodiment of this application.

In a possible implementation, interaction between a UE 1 and a UE 2 is used as an example. An embodiment of this application provides a communication method. In the communication method, integrity protection is performed on one or more messages in a PC5 establishment procedure between the UE 1 and the UE 2 by using a security protection method determined in a ProSe discovery procedure. In addition, a security protection method used on a control plane of a PC5 connection between the UE 1 and the UE 2 (where for convenience, the PC5 connection between the UE 1 and the UE 2 is referred to as a PC5 connection for short subsequently) and a security protection method used on a user plane of the PC5 connection are negotiated in the PC5 establishment procedure. For example, as shown in FIG. 4, the communication method provided in this embodiment this application includes the following steps.

S401: The UE 1 determines that a first security protection method includes enabling integrity protection. The first security protection method is a security protection method obtained in the ProSe discovery procedure between the UE 1 and the UE 2. A manner of determining the security protection method in the ProSe discovery procedure is not limited in some embodiments. In a possible implementation, for the manner of determining the security protection method in the ProSe discovery procedure, refer to the subsequent embodiment shown in FIG. 7A and FIG. 7B.

For example, the UE 1 in some embodiments may be an announcing UE in a model A discovery mode, or the UE 1 may be a discoverer UE in a model B discovery mode.

Optionally, the first security protection method in some embodiments may be used to perform security protection on the $1^{st}$ PC5 broadcast message in the ProSe discovery procedure between the UE 1 and the UE 2. For related descriptions of the $1^{st}$ PC5 broadcast message and the security protection method, refer to the preamble of the implementations. Details are not described herein again.

Optionally, the first security protection method in some embodiments may further include enabling confidentiality protection. This is not limited to some embodiments.

S402: The UE 1 sends a direct communication request to the UE 2. Correspondingly, the UE 2 receives the direct communication request from the UE 1. The direct communication request includes a control plane security policy of the UE 1 in the PC5 connection, a control plane security capability of the UE 1 in the PC5 connection, and MIC 1. For related descriptions of the control plane security policy and the control plane security capability in the PC5 connection, refer to the preamble of the implementations. Details are not described herein again.

Certainly, in some embodiments, the direct communication request may further include a part or all of discovery parameters of the UE 1. For related descriptions of the discovery parameter, refer to Table 1, Table 2, Table 3, or Table 4 in the embodiment shown in FIG. 7A and FIG. 7B. Details are not described herein.

In some embodiments, security protection is performed by using the first security protection method on the part or all of parameters transferred in the direct communication request. For example, the first security protection method may be used to perform security protection on at least one of the control plane security policy of the UE 1 in the PC5 connection or the control plane security capability of the UE 1 in the PC5 connection.

In some embodiments, the MIC 1 is a parameter generated after integrity protection is performed by using an integrity protection key of the UE 1 on the part or all of parameters transferred in the direct communication request. The integrity protection key of the UE 1 may be generated by the UE 1, or may be delivered by a network side. This is not limited to some embodiments.

Optionally, in some embodiments, the control plane security policy of the UE 1 in the PC5 connection and/or the control plane security capability of the UE 1 in the PC5 connection may be used as input parameters/an input parameter for generating the MIC 1. In a possible implementation, MIC 1=KDF (parameter 1, parameter 2, and another parameter). The parameter 1 may be the control plane security policy in the PC5 connection, the parameter 2 may be the control plane security capability in the PC5 connection, and the key derivation function (KDF) is a function for calculating the MIC 1. For example, the KDF may be a hash function. For example, the another parameter may include the integrity protection key of the UE 1.

Optionally, in some embodiments, the MIC 1 may be generated by the UE 1, or may be generated by a DDNMF network element (which may be referred to as a DDNMF1 network element) corresponding to the UE 1. This is not limited to some embodiments. If the MIC 1 is generated by the DDNMF1 network element, before the UE 1 sends the direct communication request to the UE 2, the UE 1 receives the MIC 1 from the DDNMF1 network element. Optionally, if the input parameter for generating the MIC 1 includes the control plane security policy of the UE 1 in the PC5 connection and/or the control plane security capability of the UE 1 in the PC5 connection, in a possible implementation, the control plane security policy of the UE 1 in the PC5 connection and/or the control plane security capability of the UE 1 in the PC5 connection that are/is required for generating the MIC 1 by the DDNMF1 network element are/is sent by the UE 1 to the DDNMF1 network element.

S403: The UE 2 verifies the MIC 1.

In some embodiments, a process of verifying the MIC 1 is a process of comparing the MIC 1 in the received direct communication request with expected MIC of the MIC 1. The expected MIC of the MIC 1 is a parameter generated after integrity verification is performed by using an integrity protection key (which is the same as the integrity protection key of the UE 1) of the UE 2 on the part or all of parameters transferred in the direct communication request received by the UE 2, and is used to compare with the MIC 1 in the direct communication request received by the UE 2, to further verify whether the direct communication request received by the UE 2 is tampered with. When the expected MIC of the MIC 1 is the same as the MIC 1 in the direct communication request received by the UE 2, it may be determined that the verification of the MIC 1 succeeds, in other words, the UE 2 may determine that the received direct communication request is not tampered with. Alternatively, when the expected MIC of the MIC 1 is different from the MIC 1 in the direct communication request received by the UE 2, it may be determined that the verification of the MIC 1 fails, in other words, the UE 2 may determine that the received direct communication request is tampered with. A formula for generating the expected MIC of the MIC 1 is the same as a formula for generating the MIC 1. For details, refer to the formula for generating the MIC 1. Details are not described herein.

Optionally, in some embodiments, the UE 2 may verify the MIC 1, or may need to verify the MIC 1 by using a match report procedure. This is not limited in some embodiments. For a match report, refer to the existing 3GPP TS 33.303 standard. Details are not described in some embodiments.

In a possible implementation, if the UE 2 may verify the MIC 1, the UE 2 generates the expected MIC of the MIC 1 based on the integrity protection key (which is the same as the integrity protection key of the UE 1) of the UE 2. Optionally, the integrity protection key of the UE 2 may be obtained by the UE 2 from the network side, for example, obtained by the UE 2 from the DDNMF network element (which may be referred to as a DDNMF1 network element) corresponding to the UE 1 in a procedure of obtaining the discovery parameter. Alternatively, optionally, the integrity protection key of the UE 2 may be generated by the UE 2 based on a generation material of the integrity protection key delivered by the network side. The generation material of the integrity protection key is not limited to some embodiments. For example, the generation material of the integrity protection key may include a root key, and may further include another key generation parameter, and the like. This is uniformly described herein, and details are not described below.

In another possible implementation, if the UE 2 needs to verify the MIC 1 by using the match report procedure, a DDNMF network element (which may be referred to as a DDNMF2 network element) corresponding to the UE 2 may generate the expected MIC of the MIC 1 based on the integrity protection key (which is the same as the integrity protection key of the UE 1) of the UE 2. Optionally, the integrity protection key of the UE 2 may be obtained by the DDNMF2 network element from the network side, or may be generated by the DDNMF2 network element based on a generation material of the integrity protection key delivered by the network side. This is not specifically limited in some embodiments. Optionally, if the input parameter for generating the expected MIC of the MIC 1 includes the control plane security policy of the UE 1 in the PC5 connection and/or the control plane security capability of the UE 1 in the PC5 connection, in a possible implementation, the control plane security policy of the UE 1 in the PC5 connection and/or the control plane security capability of the UE 1 in the PC5 connection that are/is required for generating the expected MIC of the MIC 1 by the DDNMF2 network element are/is sent by the UE 2 to the DDNMF2 network element. Further, in this solution, the DDNMF2 network element may send the integrity protection key of the UE 2 to the UE 2 in the match report procedure. Alternatively, the DDNMF2 network element may send the generation material of the integrity protection key to the UE 2 in the match report procedure. The UE 2 generates the integrity protection key of the UE 2 based on the generation material of the integrity protection key. After obtaining the integrity protection key of the UE 2, the UE 2 stores the integrity protection key of the UE 2 for subsequent use.

In still another possible implementation, if the UE 2 needs to verify the MIC 1 by using the match report procedure, the DDNMF network element (which may be referred to as a DDNMF1 network element) corresponding to the UE 1 may generate the expected MIC of the MIC 1 based on the integrity protection key (which is the same as the integrity protection key of the UE 1) of the UE 2. Optionally, the integrity protection key of the UE 2 may be obtained by the DDNMF1 network element from the network side, or may be generated by the DDNMF1 network element based on a generation material of the integrity protection key delivered by the network side. This is not limited to some embodiments. Optionally, if the input parameter for generating the expected MIC of the MIC 1 includes the control plane security policy of the UE 1 in the PC5 connection and/or the control plane security capability of the UE 1 in the PC5 connection, in a possible implementation, the control plane security policy of the UE 1 in the PC5 connection and/or the control plane security capability of the UE 1 in the PC5 connection that are/is required for generating the expected MIC of the MIC 1 by the DDNMF1 network element are/is sent by the UE 2 to the DDNMF1 network element by using the DDNMF2 network element. Further, in this solution, the DDNMF1 network element may send the integrity protection key of the UE 2 to the UE 2 in the match report procedure by using the DDNMF2 network element. Alternatively, the DDNMF1 network element may send the generation material of the integrity protection key to the UE 2 in the match report procedure by using the DDNMF2 network element. The UE 2 generates the integrity protection key of the UE 2 based on the generation material of the integrity protection key. After obtaining the integrity protection key of the UE 2, the UE 2 stores the integrity protection key of the UE 1 for subsequent use.

In some embodiments, if the verification of the MIC 1 succeeds, it may indicate that the part or all of parameters transferred in the direct communication request in step S402 are completely protected, and are not attacked by an external attacker. In this case, the following step S404 may continue to be performed.

S404: The UE 2 determines, according to the control plane security policy of the UE 1 in the PC5 connection and a control plane security policy of the UE 2 in the PC5 connection, a security protection method used on the control plane of the PC5 connection between the UE 1 and the UE 2, and the UE 2 determines, based on the control plane security capability of the UE 1 in the PC5 connection and a control plane security capability of the UE 2 in the PC5 connection, a security algorithm used on the control plane of the PC5 connection between the UE 1 and the UE 2. For implementation of step S404, refer to the conventional technology. Details are not described herein. For related descriptions of the security protection method used on the control plane of the PC5 connection, refer to the preamble of the implementations. Details are not described herein again.

In some embodiments, the security algorithm used on the control plane of the PC5 connection includes one or more confidentiality protection algorithms and one or more integrity protection algorithms.

In some embodiments, the security algorithm is selected according to the following principles.

First, when control plane integrity protection is disabled, correspondingly selected integrity and confidentiality protection algorithms are both null algorithms.

Second, when control plane integrity protection is enabled, a correspondingly selected control plane integrity protection algorithm needs to be a non-null algorithm, to indicate that control plane integrity protection is enabled. If control plane confidentiality protection is enabled at this time, a correspondingly selected control plane confidentiality protection algorithm needs to be a non-null algorithm, to indicate that control plane confidentiality protection is enabled. If control plane confidentiality protection is disabled at this time, a correspondingly selected control plane confidentiality protection algorithm needs to be a null algorithm, to indicate that control plane confidentiality protection is disabled.

S405: The UE 2 sends a direct security mode command to the UE 1. Correspondingly, the UE 1 receives the direct security mode command from the UE 2. The direct security mode command includes the security algorithm that is selected by the UE 2 and that is used on the control plane of the PC5 connection.

Optionally, in some embodiments, the direct security mode command may further include the control plane security policy of the UE 1 in the PC5 connection and/or the control plane security capability of the UE 1 in the PC5 connection. Further, after the UE 1 receives the direct security mode command from the UE 2, when the UE 1 determines that the final security protection method used on the control plane of the PC5 connection includes disabling control plane integrity protection, the UE 1 needs to determine whether the control plane security policy in the PC5 connection included in the direct security mode command is the control plane security policy in the PC5 connection sent by the UE 1 and whether the security capability in the PC5 connection is the security capability in the PC5 connection sent by the UE 1. If the verification succeeds, a subsequent procedure may continue to be performed; otherwise, the current procedure is terminated. This prevents a bidding down attack.

In a possible implementation, in some embodiments, if the UE 2 determines that the security protection method used on the control plane of the PC5 connection between the UE 1 and the UE 2 includes enabling integrity protection, in some embodiments, integrity protection may be performed by using the security algorithm that is selected by the UE 2 and that is used on the control plane of the PC5 connection on a part or all of parameters transferred in the direct security mode command. For an integrity protection method, refer to the conventional technology. Details are not described herein.

In another possible implementation, in some embodiments, if the UE 2 determines that a security level of the security protection method used on the control plane of the PC5 connection between the UE 1 and the UE 2 is lower than a security level of the first security protection method (where for example, the security protection method used on the control plane of the PC5 connection between the UE 1 and the UE 2 includes disabling integrity protection, and the first security protection method includes enabling integrity protection), the direct security mode command in some embodiments further includes MIC 2. The MIC 2 is a parameter generated after integrity protection is performed by using the integrity protection key of the UE 2 on the part or all of parameters transferred in the direct security mode command. For example, the part of parameters on which integrity protection is performed by using the integrity protection key of the UE 2 may include, for example, at least one of the security algorithm that is selected by the UE 2 and that is used on the control plane of the PC5 connection, the control plane security policy of the UE 1 in the PC5 connection, or the control plane security capability of the UE 1 in the PC5 connection. When the UE 2 determines that the security level of the security protection method used on the control plane of the PC5 connection between the UE 1 and the UE 2 is lower than the security level of the first security protection method, in this solution, because integrity protection may be performed by using the integrity protection key of the UE 2 on the part or all of parameters transferred in the direct security mode command, it can be ensured that information in the direct security mode command can be trusted by the UE 1. Further, after receiving the direct security mode command from the UE 2, the UE 1 further needs to verify the MIC 2. A manner of verifying the MIC 2 by the UE 1 is similar to the foregoing manner of verifying the MIC 1 by the UE 2. Details are not described herein again. If the verification of the MIC 2 succeeds, it may indicate that the part or all of parameters transferred in the direct security mode command are completely protected, and are not attacked by an external attacker. In this case, the following step S406 may continue to be performed.

Optionally, in some embodiments, the integrity protection key of the UE 2 may be generated by the UE 2, or may be delivered by the network side. This is not limited to some embodiments.

It should be noted that, in some embodiments, integrity protection keys used by generated MICs or expected MICs are the same. For example, an integrity protection key used for generating the MIC 2 is the same as the integrity protection key used for generating the MIC 1 or the expected MIC of the MIC 1. An integrity protection key used for generating MIC 3, expected MIC of the MIC 3, MIC 4, or expected MIC of the MIC 4 is also the same as the integrity protection key used for generating the MIC 1 or the expected MIC of the MIC 1. This is uniformly described herein, and details are not described below.

S406: The UE 1 determines, based on the security algorithm that is selected by the UE 2 and that is used on the control plane of the PC5 connection, a final security protection method used on the control plane of the PC5 connection.

Optionally, in some embodiments, that the UE 1 determines, based on the security algorithm that is selected by the UE 2 and that is used on the control plane of the PC5 connection, a final security protection method used on the control plane of the PC5 connection includes:

If an integrity protection algorithm in the security algorithm used on the control plane of the PC5 connection is a null algorithm, the final security protection method used on the control plane of the PC5 connection is disabling both integrity protection and confidentiality protection of the control plane of the PC5 connection. That is, both integrity protection and confidentiality protection do not need to be performed on subsequent control plane signaling in the PC5 connection.

If an integrity protection algorithm in the security algorithm used on the control plane of the PC5 connection is non-null, and a confidentiality protection algorithm in the security algorithm used on the control plane of the PC5 connection is non-null, the final security protection method used on the control plane of the PC5 connection is enabling control plane integrity protection of the PC5 connection and enabling control plane confidentiality protection. That is, both integrity protection and confidentiality protection need to be performed on subsequent control plane signaling in the PC5 connection.

If an integrity protection algorithm in the security algorithm used on the control plane of the PC5 connection is non-null, and a confidentiality protection algorithm in the security algorithm used on the control plane of the PC5 connection is null, the final security protection method used on the control plane of the PC5 connection is enabling control plane integrity protection of the PC5 connection, and disabling control plane confidentiality protection. That is, integrity protection needs to be performed on subsequent control plane signaling in the PC5 connection, and confidentiality protection does not need to be performed.

It should be noted that, in some embodiments, the security protection method that is determined by the UE 1 and that is used on the control plane of the PC5 connection may be used for protection of a message for subsequently negotiating the security protection method used on the user plane of the PC5 connection between the UE 1 and the UE 2, for example, security protection of a direct security mode complete message in step S407 and security protection of a direct communication accept message in step S409. In addition, the security protection method that is determined by the UE 1 and that is used on the control plane of the PC5 connection may be further used for security protection of control plane signaling after the PC5 establishment procedure shown in FIG. 4. This is uniformly described herein, and details are not described below.

S407: The UE 1 sends a direct security mode complete message to the UE 2. Correspondingly, the UE 2 receives the direct security mode complete message from the UE 1. The direct security mode complete message includes a user plane security policy of the UE 1 in the PC5 connection.

Optionally, in some embodiments, when a user plane security capability of the PC5 connection is different from the control plane security capability of the PC5 connection, the direct security mode complete message may further include the user plane security capability of the UE 1 in the PC5 connection.

It should be noted that, in some embodiments, it is assumed that the standard specifies that the user plane security capability of the UE 1 in the PC5 connection is the same as the control plane security capability of the UE 1 in the PC5 connection, or the security capability does not distinguish between the user plane and the control plane. In this case, the direct security mode complete message does not need to carry the user plane security capability of the UE 1 in the PC5 connection. In this scenario, the following user plane security capability of the UE 1 in the PC5 connection is the control plane security capability (which may also be referred to as the security capability of the UE 1 in the PC5 connection) of the UE 1 in the PC5 connection. This is uniformly described herein, and details are not described below.

For related descriptions of the user plane security policy in the PC5 connection and the user plane security capability in the PC5 connection, refer to the preamble of the specific implementation. Details are not described herein again.

In a possible implementation, in some embodiments, if the UE 1 determines that the final security protection method used on the control plane of the PC5 connection includes enabling integrity protection, in some embodiments, integrity protection may be performed by using the security algorithm that is selected by the UE 2 and that is used on the control plane of the PC5 connection on a part or all of parameters transferred in the direct security mode complete message. For an integrity protection method, refer to the conventional technology. Details are not described herein.

In another possible implementation, in some embodiments, if the UE 1 determines that a security level of the final security protection method used on the control plane of the PC5 connection is lower than a security level of the first security protection method (where for example, the final security protection method used on the control plane of the PC5 connection includes disabling integrity protection, and the first security protection method includes enabling integrity protection), the direct security mode complete message in some embodiments further includes MIC 3. The MIC 3 is a parameter generated after integrity protection is performed by using the integrity protection key of the UE 1 on a part or all of parameters transferred in the direct security mode complete message. For example, the part of parameters on which integrity protection is performed by using the integrity protection key of the UE 1 may include, for example, the user plane security policy of the UE 1 in the PC5 connection, and the user plane security capability (optional) of the UE 1 in the PC5 connection. When the UE 1 determines that the security level of the final security protection method used on the control plane of the PC5 connection is lower than the security level of the first security protection method, in some solutions, because integrity protection may be performed by using the integrity protection key of the UE 1 on the part or all of parameters transferred in the direct security mode complete message, it can be ensured that information in the direct security mode complete message can be trusted by the UE 2. Further, after receiving the direct security mode complete message from the UE 1, the UE 2 needs to verify the MIC 3. A manner of verifying the MIC 3 by the UE 2 is similar to the foregoing manner of verifying the MIC 1 by the UE 2. Details are not described herein again. If the verification of the MIC 3 succeeds, it may indicate that the part or all of parameters transferred in the direct security mode complete message are completely protected, and are not attacked by an external attacker. In this case, the following step S408 may continue to be performed.

Optionally, in some embodiments, the user plane security policy of the UE 1 in the PC5 connection and the user plane security capability (optional) of the UE 1 in the PC5 connection may be used as input parameters for generating the MIC 3. Specifically, for a manner of calculating the MIC 3, refer to the foregoing manner of calculating the MIC 1. Details are not described herein again.

Optionally, in some embodiments, the MIC 3 may be generated by the UE 1, or may be generated by the DDNMF network element (which may be referred to as a DDNMF1 network element) corresponding to the UE 1. This is not limited to some embodiments. If the MIC 3 is generated by the DDNMF1 network element, before the UE 1 sends the direct security mode complete message to the UE 2, the UE 1 receives the MIC 3 from the DDNMF1 network element. Optionally, if the input parameter for generating the MIC 3 includes the user plane security policy of the UE 1 in the PC5 connection and the user plane security capability (optional) of the UE 1 in the PC5 connection, in a possible implementation, the user plane security policy of the UE 1 in the PC5 connection and the user plane security capability (optional) of the UE 1 in the PC5 connection that are required for generating the MIC 3 by the DDNMF1 network element are sent by the UE 1 to the DDNMF1 network element.

Optionally, in some embodiments, if the UE 1 determines that the final security protection method used on the control plane of the PC5 connection includes enabling confidentiality protection, confidentiality protection further needs to be performed on the part or all of parameters transferred in the direct security mode complete message. For a specific protection manner, refer to the conventional technology. Details are not described herein.

S408: The UE 2 determines, according to the user plane security policy of the UE 1 in the PC5 connection and the user plane security policy of the UE 2 in the PC5 connection, the security protection method used on the user plane of the PC5 connection between the UE 1 and the UE 2. For some implementations of step S408, refer to the conventional technology. Details are not described herein. For related descriptions of the security protection method used on the user plane of the PC5 connection, refer to the preamble of the specific implementation. Details are not described herein again.

Optionally, in some embodiments, if the security algorithm used on the control plane of the PC5 connection is different from the security algorithm used on the user plane of the PC5 connection, the UE 2 further needs to determine, based on the user plane security capability of the UE 1 in the PC5 connection and the user plane security capability of the UE 2 in the PC5 connection, a security algorithm used on the user plane of the PC5 connection between the UE 1 and the UE 2. This is not limited to some embodiments. The security algorithm used on the user plane of the PC5 connection includes one or more confidentiality protection algorithms and one or more integrity protection algorithms. For a rule followed by the selection of the security algorithm, refer to step S404, and details are not described herein again.

S409: The UE 2 sends a direct communication accept message to the UE 1. Correspondingly, the UE 1 receives the direct communication accept message from the UE 2. The direct communication accept message includes the security protection method used on the user plane of the PC5 connection.

Optionally, in some embodiments, the direct communication accept message may further include the user plane security policy of the UE 1 in the PC5 connection and the user plane security capability (optional) of the UE 1 in the PC5 connection. Further, after the UE 1 receives the direct communication accept message from the UE 2, when the UE 1 determines that the final security protection method used on the control plane of the PC5 connection includes disabling control plane integrity protection, the UE 1 needs to determine whether the user plane security policy in the PC5 connection included in the direct communication accept message is the user plane security policy in the PC5 connection sent by the UE 1 and whether the security capability in the PC5 connection is the security capability in the PC5 connection sent by the UE 1. If the verification succeeds, a subsequent procedure may continue to be performed; otherwise, the current procedure is terminated. This prevents a bidding down attack.

Optionally, in some embodiments, if the UE 2 determines the security algorithm used on the user plane of the PC5 connection, the direct communication accept message further includes the security algorithm used on the user plane of the PC5 connection.

In a possible implementation, in some embodiments, if in step S404, the UE 2 determines that the security protection method used on the control plane of the PC5 connection includes enabling control plane integrity protection, in some embodiments, integrity protection may be performed by using the security algorithm that is selected by the UE 2 and that is used on the control plane of the PC5 connection on a part or all of parameters transferred in the direct communication accept message. For an integrity protection method, refer to the conventional technology. Details are not described herein.

In another possible implementation, in some embodiments, if the direct security mode complete message in step S407 includes the MIC 3, the direct communication accept message in step S409 further includes MIC 4. The MIC 4 is a parameter generated after integrity protection is performed by using the integrity protection key of the UE 2 on the part or all of parameters transferred in the direct communication accept message. For example, the part of parameters on which integrity protection is performed by using the integrity protection key of the UE 2 may include, for example, the security protection method used on the user plane of the PC5 connection, and the security algorithm (optional) used on the user plane of the PC5 connection. When the security level of the security protection method used on the control plane of the PC5 connection between the UE 1 and the UE 2 is lower than the security level of the first security protection method (where for example, the security protection method used on the control plane of the PC5 connection between the UE 1 and the UE 2 includes disabling integrity protection, and the first security protection method includes enabling integrity protection), in some solutions, because integrity protection may be performed by using the integrity protection key of the UE 2 on the part or all of parameters transferred in the direct communication accept message, it can be ensured that information in the direct communication accept message can be trusted by the UE 1. Further, after receiving the direct communication accept message from the UE 2, the UE 1 further needs to verify the MIC 4. A manner of verifying the MIC 4 by the UE 1 is similar to the foregoing manner of verifying the MIC 1 by the UE 2. Details are not described herein again. If the verification of the MIC 4 succeeds, it may indicate that the part or all of parameters transferred in the direct communication accept message are completely protected, and are not attacked by an external attacker. In this case, the subsequent procedure may continue to be performed.

According to the communication method provided in some embodiments, because after the UE 1 determines that the first security protection method includes enabling integrity protection, in the PC5 establishment procedure between the UE 1 and the UE 2, the UE 1 and the UE 2 may perform integrity protection on a message in the PC5 establishment procedure by using the first security protection method, a problem that a security level is degraded because the message in the PC5 establishment procedure is attacked or tampered with by an attacker can be avoided, and a security level of the PC5 establishment procedure can be improved.

The actions of the UE 1 or the UE 2 in steps S401 to S409 may be performed by the processor 301 in the communication device 300 shown in FIG. 3 by invoking the application program code stored in the memory 303, to instruct the UE 1 or the UE 2 to perform the actions. This is not limited in this embodiment.

Figure 5:
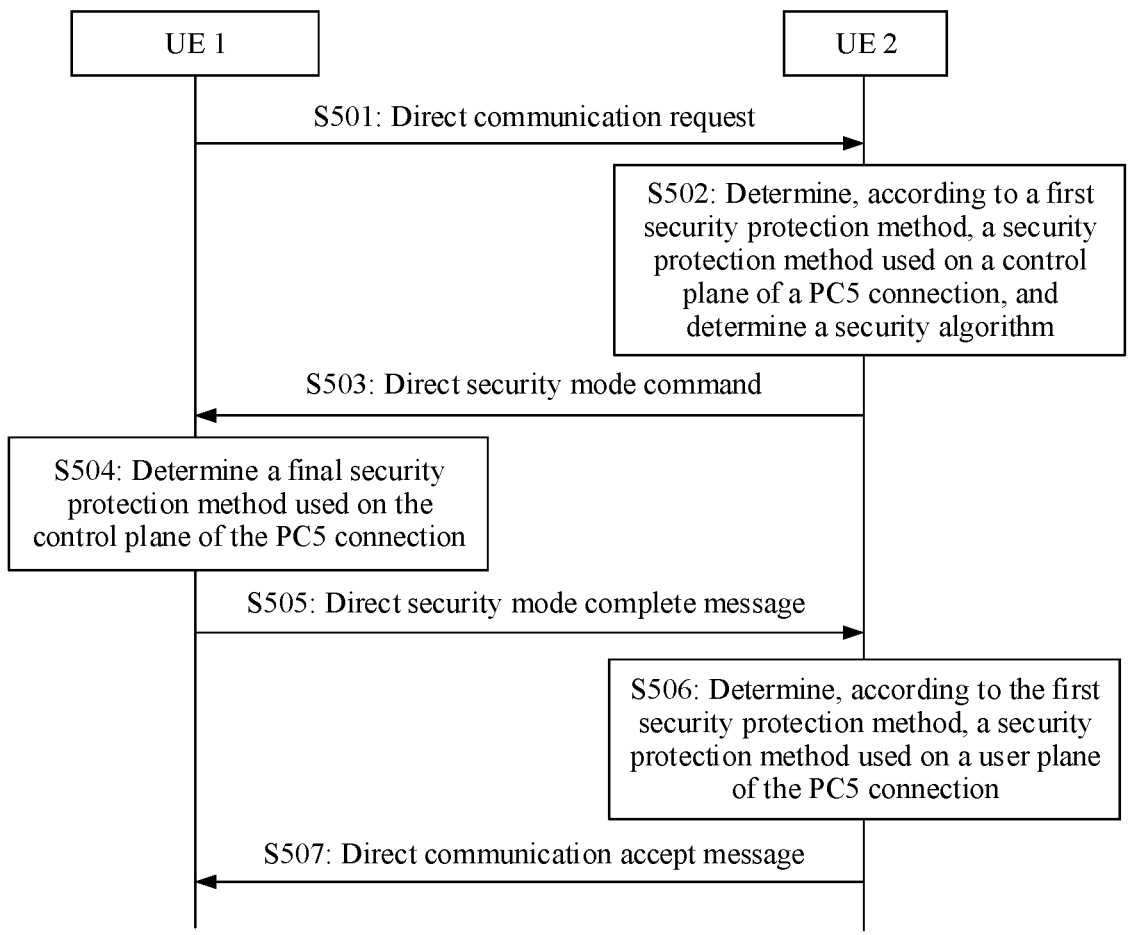
FIG. 5 is a schematic interaction diagram of another communication method according to an embodiment of this application.

In another possible implementation, interaction between a UE 1 and a UE 2 is used as an example. An embodiment of this application provides a communication method. In the communication method, security protection is performed on one or more messages in a PC5 establishment procedure between the UE 1 and the UE 2 by using a security protection method determined in a ProSe discovery procedure. In addition, in the PC5 establishment procedure, a security protection method used on a control plane of a PC5 connection between the UE 1 and the UE 2 (where for convenience, the PC5 connection between the UE 1 and the UE 2 is referred to as a PC5 connection for short subsequently) and a security protection method used on a user plane of the PC5 connection are determined according to the security protection method determined in the ProSe discovery procedure. For example, as shown in FIG. 5, the communication method provided in this embodiment this application includes the following steps.

S501: The UE 1 sends a direct communication request to the UE 2. Correspondingly, the UE 2 receives the direct communication request from the UE 1. The direct communication request includes a control plane security capability of the UE 1 in the PC5 connection. For related descriptions of the control plane security capability in the PC5 connection, refer to the preamble of the implementations. Details are not described herein again.

Certainly, in some embodiments, the direct communication request may further include a part or all of discovery parameters of the UE 1. For details, refer to the existing 3GPP TS 23.303, v15.1.0 standard. Details are not described herein.

Optionally, in some embodiments, security protection is performed by using a first security protection method on the part or all of parameters transferred in the direct communication request. For example, the first security protection method may be used to perform security protection on the control plane security capability of the UE 1 in the PC5 connection. The first security protection method is a security protection method obtained in the ProSe discovery procedure between the UE 1 and the UE 2. A manner of determining the security protection method in the ProSe discovery procedure is not limited in some embodiments. In a possible implementation, for the manner of determining the security protection method in the ProSe discovery procedure, refer to the subsequent embodiment shown in FIG. 7A and FIG. 7B.

Optionally, in some embodiments, the direct communication request may further include a control plane security policy of the UE 1 in the PC5 connection. The control plane security policy of the UE 1 in the PC5 connection may be used to subsequently determine the security protection method used on the control plane of the PC5 connection between the UE 1 and the UE 2. Security protection may be performed by using the first security protection method for the control plane security policy of the UE 1 in the PC5 connection. For related descriptions of the control plane security policy in the PC5 connection, refer to the preamble of the specific implementation. Details are not described herein again.

Optionally, in some embodiments, when the UE 1 determines that the first security protection method includes enabling integrity protection, the direct communication request may further include MIC 1. For related descriptions of the MIC 1, refer to the embodiment shown in FIG. 4. Details are not described again herein. Further, after receiving the direct communication request from the UE 1, the UE 2 may verify the MIC 1. For a manner of verifying the MIC 1, refer to the embodiment shown in FIG. 4. Details are not described herein again. If the verification of the MIC 1 succeeds, it may indicate that the part or all of parameters transferred in the direct communication request in step S501 are completely protected, and are not attacked by an external attacker. In this case, the following step S502 may continue to be performed.

S502: The UE 2 determines, according to the first security protection method, the security protection method used on the control plane of the PC5 connection, and the UE 2 determines, based on the control plane security capability of the UE 1 in the PC5 connection and a control plane security capability of the UE 2 in the PC5 connection, a security algorithm used on the control plane of the PC5 connection between the UE 1 and the UE 2.

The following provides two implementations for the UE 2 to determine the security protection method used on the control plane of the PC5 connection.

In a possible implementation, the UE 2 may directly determine the first security protection method as the security protection method used on the control plane of the PC5 connection, in other words, the UE 2 directly activates control plane security of the PC5 connection according to the first security protection method. For example, if the first security protection method is enabling confidentiality protection, the UE 2 determines to activate control plane confidentiality protection. If the first security protection method is disabling confidentiality protection, the UE 2 determines not to activate control plane confidentiality protection. If the first security protection method is enabling integrity protection, the UE 2 determines to activate control plane integrity protection. If the first security protection method is disabling integrity protection, the UE 2 determines not to activate control plane integrity protection. In this solution, the UE 2 does not need to negotiate with the UE 1 the security protection method used on the control plane of the PC5 connection, but directly determines the first security protection method as the security protection method used on the control plane of the PC5 connection. Therefore, processing logic of the UE 2 is simplified, and signaling overheads of the PC5 establishment procedure can be reduced.

In another possible implementation, when determining the security protection method used on the control plane of the PC5 connection, the UE 2 further refers to the control plane security policy of the UE 1 in the PC5 connection.

When the first security protection method meets the control plane security policy that is sent by the UE 1 in the direct communication request and that is of the UE 1 in the PC5 connection (it may also be understood as that the first security protection method may be supported by the control plane security policy that is sent by the UE 1 in the direct communication request and that is of the UE 1 in the PC5 connection), the UE 2 may determine the first security protection method as the security protection method used on the control plane of the PC5 connection, in other words, the UE 2 activates control plane security of the PC5 connection according to the first security protection method. For example, if the first security protection method is disabling confidentiality protection and enabling integrity protection, and the control plane security policy of the UE 1 in the PC5 connection is that confidentiality protection is optional and integrity protection is optional, the UE 2 may determine that the security protection method used on the control plane of the PC5 connection is disabling confidentiality protection and enabling integrity protection. In this solution, when the first security protection method meets the control plane security policy of the UE 1 in the PC5 connection, the first security protection method is determined as the security protection method used on the control plane of the PC5 connection. Therefore, the security protection method that is determined by the UE 2 and that is used on the control plane of the PC5 connection can be supported by the UE 1. In addition, it is ensured that a security level of the first security protection method is the lowest security level of the PC5 connection in the PC5 establishment procedure, so that security is not degraded.

When the first security protection method does not meet the control plane security policy that is sent by the UE 1 in the direct communication request and that is of the UE 1 in the PC5 connection (it may also be understood as that the first security protection method may not be supported by the control plane security policy that is sent by the UE 1 in the direct communication request and that is of the UE 1 in the PC5 connection), the UE 2 may select a security protection method that meets the control plane security policy that is sent by the UE 1 in the direct communication request and that is of the UE 1 in the PC5 connection as the security protection method used on the control plane of the PC5 connection. Therefore, the UE 2 activates control plane security of the PC5 connection according to the selected security protection method. For example, if the first security protection method is disabling confidentiality protection and enabling integrity protection, and the control plane security policy of the UE 1 in the PC5 connection is enabling confidentiality protection and that integrity protection is optional, the UE 2 may determine that the security protection method used on the control plane of the PC5 connection is enabling confidentiality protection and enabling integrity protection. Certainly, in some embodiments, when the first security protection method does not meet the control plane security policy that is sent by the UE 1 in the direct communication request and that is of the UE 1 in the PC5 connection, the UE 2 may alternatively reject joining of the UE 1. This is not limited to some embodiments. In this solution, when the first security protection method does not meet the control plane security policy of the UE 1 in the PC5 connection, the UE 2 selects, according to the control plane security policy of the UE 1 in the PC5 connection, a security protection method that meets the control plane security policy of the UE 1 in the PC5 connection as the security protection method used on the control plane of the PC5 connection. Therefore, the security protection method that is determined by the UE 2 and that is used on the control plane of the PC5 connection can be supported by the UE 1. In addition, it is ensured that the security level of the first security protection method is the lowest security level of the PC5 connection in the PC5 establishment procedure, so that security is not degraded.

When the first security protection method meets the control plane security policy that is sent by the UE 1 in the direct communication request and that is of the UE 1 in the PC5 connection (it may also be understood as that the first security protection method may be supported by the control plane security policy that is sent by the UE 1 in the direct communication request and that is of the UE 1 in the PC5 connection), the UE 2 may further select, according to the control plane security policy that is sent by the UE 1 in the direct communication request and that is of the UE 1 in the PC5 connection, a security protection method whose security level is not lower than that of the first security protection method as the security protection method used on the control plane of the PC5 connection. Therefore, the UE 2 activates control plane security of the PC5 connection according to the selected security protection method. For example, if the first security protection method is disabling confidentiality protection and disabling integrity protection, and the control plane security policy of the UE 1 in the PC5 connection is that confidentiality protection is optional and integrity protection is optional, the UE 2 may determine that the security protection method used on the control plane of the PC5 connection is enabling confidentiality protection and enabling integrity protection. In this solution, when the first security protection method meets the control plane security policy of the UE 1 in the PC5 connection, the UE 2 selects, according to the control plane security policy of the UE 1 in the PC5 connection, a security protection method whose security level is not lower than that of the first security protection method as the security protection method used on the control plane of the PC5 connection. Therefore, the security protection method that is determined by the UE 2 and that is used on the control plane of the PC5 connection can be used by the UE 1. In addition, it is ensured that the security level of the first security protection method is the lowest security level of the PC5 connection in the PC5 establishment procedure, so that security is not degraded.

In still another possible implementation, when determining the security protection method used on the control plane of the PC5 connection, the UE 2 further refers to the control plane security policy of the UE 1 in the PC5 connection and the control plane security policy of the UE 2 in the PC5 connection.

When the first security protection method simultaneously meets the control plane security policy that is sent by the UE 1 in the direct communication request and that is of the UE 1 in the PC5 connection and the control plane security policy that is locally stored or obtained by the UE 2 from another network element and that is of the UE 2 in the PC5 connection (it may also be understood as that the first security protection method may be simultaneously supported by the control plane security policy that is sent by the UE 1 in the direct communication request and that is of the UE 1 in the PC5 connection and the control plane security policy that is locally stored or obtained by the UE 2 from another network element and that is of the UE 2 in the PC5 connection), the UE 2 may determine the first security protection method as the security protection method used on the control plane of the PC5 connection, in other words, the UE 2 activates control plane security of the PC5 connection according to the first security protection method. For example, if the first security protection method is disabling confidentiality protection and enabling integrity protection, the control plane security policy of the UE 1 in the PC5 connection is that confidentiality protection is optional and integrity protection is optional, and the control plane security policy of the UE 2 in the PC5 connection is disabling confidentiality protection and that integrity protection is optional, the UE 2 may determine that the security protection method used on the control plane of the PC5 connection is disabling confidentiality protection and enabling integrity protection. In this solution, when the first security protection method simultaneously meets the control plane security policy of the UE 1 in the PC5 connection and the control plane security policy of the UE 2 in the PC5 connection, the first security protection method is determined as the security protection method used on the control plane of the PC5 connection. Therefore, the security protection method that is determined by the UE 2 and that is used on the control plane of the PC5 connection can be simultaneously supported by the UE 1 and the UE 2. In addition, it is ensured that the security level of the first security protection method is the lowest security level of the PC5 connection in the PC5 establishment procedure, so that security is not degraded.

When the first security protection method does not meet the control plane security policy that is sent by the UE 1 in the direct communication request and that is of the UE 1 in the PC5 connection or the control plane security policy that is locally stored or obtained by the UE 2 from another network element and that is of the UE 2 in the PC5 connection (it may also be understood as that the first security protection method may not be simultaneously supported by the control plane security policy that is sent by the UE 1 in the direct communication request and that is of the UE 1 in the PC5 connection and the control plane security policy that is locally stored or obtained by the UE 2 from another network element and that is of the UE 2 in the PC5 connection), the UE 2 may select, as the security protection method used on the control plane of the PC5 connection, a security protection method that meets both the control plane security policy that is sent by the UE 1 in the direct communication request and that is of the UE 1 in the PC5 connection and the control plane security policy that is locally stored or obtained by the UE 2 from another network element and that is of the UE 2 in the PC5 connection. Therefore, the UE 2 activates control plane security of the PC5 connection according to the selected security protection method. For example, if the first security protection method is disabling confidentiality protection and enabling integrity protection, the control plane security policy of the UE 1 in the PC5 connection is enabling confidentiality protection and that integrity protection is optional, and the control plane security policy of the UE 2 in the PC5 connection is enabling confidentiality protection and that integrity protection is optional, the UE 2 may determine that the security protection method used on the control plane of the PC5 connection is enabling confidentiality protection and enabling integrity protection. Certainly, in some embodiments, when the first security protection method does not meet the control plane security policy that is sent by the UE 1 in the direct communication request and that is of the UE 1 in the PC5 connection or the control plane security policy that is locally stored or obtained by the UE 2 from another network element and that is of the UE 2 in the PC5 connection, the UE 2 may alternatively reject joining of the UE 1. This is not limited to some embodiments. In this solution, when the first security protection method does not meet the control plane security policy of the UE 1 in the PC5 connection or the control plane security policy of the UE 2 in the PC5 connection, the UE 2 selects, according to the control plane security policy of the UE 1 in the PC5 connection and the control plane security policy of the UE 2 in the PC5 connection, a security protection method that meets both the control plane security policy of the UE 1 in the PC5 connection and the control plane security policy of the UE 2 in the PC5 connection as the security protection method used on the control plane of the PC5 connection. Therefore, the security protection method that is determined by the UE 2 and that is used on the control plane of the PC5 connection can be simultaneously supported by the UE 1 and the UE 2. In addition, it is ensured that the security level of the first security protection method is the lowest security level of the PC5 connection in the PC5 establishment procedure, so that security is not degraded.

When the first security protection method may simultaneously meet the control plane security policy that is sent by the UE 1 in the direct communication request and that is of the UE 1 in the PC5 connection and the control plane security policy that is locally stored or obtained by the UE 2 from another network element and that is of the UE 2 in the PC5 connection (it may also be understood as that the first security protection method may be simultaneously supported by the control plane security policy that is sent by the UE 1 in the direct communication request and that is of the UE 1 in the PC5 connection and the control plane security policy that is locally stored or obtained by the UE 2 from another network element and that is of the UE 2 in the PC5 connection), the UE 2 may further select, according to the control plane security policy that is sent by the UE 1 in the direct communication request and that is of the UE 1 in the PC5 connection and the control plane security policy that is locally stored or obtained by the UE 2 from another network element and that is of the UE 2 in the PC5 connection, a security protection method whose security level is not lower than that of the first security protection method as the security protection method used on the control plane of the PC5 connection. Therefore, the UE 2 activates control plane security of the PC5 connection according to the selected security protection method. For example, if the first security protection method is enabling confidentiality protection and disabling integrity protection, the control plane security policy of the UE 1 in the PC5 connection is that confidentiality protection is optional and integrity protection is optional, and the control plane security policy of the UE 2 in the PC5 connection is disabling confidentiality protection, the UE 2 may determine that the security protection method used on the control plane of the PC5 connection is enabling confidentiality protection and enabling integrity protection. In this solution, when the first security protection method simultaneously meets the control plane security policy of the UE 1 in the PC5 connection and the control plane security policy of the UE 2 in the PC5 connection, the UE 2 selects, according to the control plane security policy of the UE 1 in the PC5 connection and the control plane security policy of the UE 2 in the PC5 connection, a security protection method whose security level is not lower than that of the first security protection method as the security protection method used on the control plane of the PC5 connection. Therefore, the security protection method that is determined by the UE 2 and that is used on the control plane of the PC5 connection can be simultaneously supported by the UE 1 and the UE 2. In addition, it is ensured that the security level of the first security protection method is the lowest security level of the PC5 connection in the PC5 establishment procedure, so that security is not degraded.

In conclusion, in some embodiments, the security level of the security protection method that is determined by the UE 2 and that is used on the control plane of the PC5 connection is not lower than (e.g., higher than) the security level of the first security protection method. In other words, the security level of the first security protection method is a minimum security level requirement of control plane signaling interaction, so that security is not degraded.

Further, in some embodiments, after the UE 2 determines the security protection method used on the control plane of the PC5 connection, the UE 2 may determine, based on the control plane security capability of the UE 1 in the PC5 connection and the control plane security capability of the UE 2 in the PC5 connection, and with reference to the security protection method that is determined by the UE 2 and that is used on the control plane of the PC5 connection, the security algorithm used on the control plane of the PC5 connection between the UE 1 and the UE 2. The security algorithm used on the control plane of the PC5 connection includes one or more confidentiality protection algorithms and one or more integrity protection algorithms. For a rule followed by the selection of the security algorithm, refer to step S404, and details are not described herein again.

S503: The UE 2 sends a direct security mode command to the UE 1. Correspondingly, the UE 1 receives the direct security mode command from the UE 2. The direct security mode command includes the security algorithm that is selected by the UE 2 and that is used on the control plane of the PC5 connection.

Optionally, in some embodiments, the direct security mode command may further include the control plane security policy of the UE 1 in the PC5 connection and/or the control plane security capability of the UE 1 in the PC5 connection. Further, after the UE 1 receives the direct security mode command from the UE 2, when the UE 1 determines that the final security protection method used on the control plane of the PC5 connection includes disabling control plane integrity protection, the UE 1 needs to determine whether the control plane security policy in the PC5 connection included in the direct security mode command is the control plane security policy in the PC5 connection sent by the UE 1 and whether the security capability in the PC5 connection is the security capability in the PC5 connection sent by the UE 1. If the verification succeeds, a subsequent procedure may continue to be performed; otherwise, the current procedure is terminated. This prevents a bidding down attack.

In some embodiments, security protection is performed by using the security protection method that is determined by the UE 2 and that is used on the control plane of the PC5 connection on a part or all of parameters transferred in the direct security mode command. For example, if the UE 2 determines the first security protection method as the security protection method used on the control plane of the PC5 connection, security protection is performed by using the first security protection method on the part or all of parameters transferred in the direct security mode command. For a manner of performing security protection on the part or all of parameters transferred in the direct security mode command, refer to the conventional technology. Details are not described herein. For example, the part of parameters on which security protection is performed in the direct security mode command may include, for example, at least one of the security algorithm that is selected by the UE 2 and that is used on the control plane of the PC5 connection, the control plane security policy of the UE 1 in the PC5 connection, or the control plane security capability of the UE 1 in the PC5 connection.

S504: The UE 1 determines, based on the security algorithm that is selected by the UE 2 and that is used on the control plane of the PC5 connection, a final security protection method used on the control plane of the PC5 connection.

For related descriptions of step S504, refer to step S406 in the embodiment shown in FIG. 4. Details are not described again herein.

It should be noted that, in some embodiments, the security protection method that is determined by the UE 1 and that is used on the control plane of the PC5 connection may be used for protection of a message for subsequently negotiating the security protection method used on the user plane of the PC5 connection between the UE 1 and the UE 2, for example, security protection of a direct security mode complete message in step S505 and security protection of a direct communication accept message in step S507. In addition, the security protection method that is determined by the UE 1 and that is used on the control plane of the PC5 connection may be further used for security protection of control plane signaling after the PC5 establishment procedure shown in FIG. 5. This is uniformly described herein, and details are not described below.

S505: The UE 1 sends a direct security mode complete message to the UE 2. Correspondingly, the UE 2 receives the direct security mode complete message from the UE 1.

Optionally, in some embodiments, the direct security mode complete message may further include a user plane security policy of the UE 1 in the PC5 connection. The user plane security policy of the UE 1 in the PC5 connection may be used to subsequently determine the security protection method used on the user plane of the PC5 connection between the UE 1 and the UE 2. For related descriptions of the user plane security policy in the PC5 connection, refer to the preamble of the implementation. Details are not described herein again.

Optionally, in some embodiments, when a user plane security capability of the PC5 connection is different from the control plane security capability of the PC5 connection, the direct security mode complete message may further include the user plane security capability of the UE 1 in the PC5 connection.

It should be noted that, in some embodiments, it is assumed that the standard specifies that the user plane security capability of the UE 1 in the PC5 connection is the same as the control plane security capability of the UE 1 in the PC5 connection, or the security capability does not distinguish between the user plane and the control plane. In this case, the direct security mode complete message does not need to carry the user plane security capability of the UE 1 in the PC5 connection. In this scenario, the following user plane security capability of the UE 1 in the PC5 connection is the control plane security capability of the UE 1 in the PC5 connection. This is uniformly described herein, and details are not described below.

In some embodiments, security protection is performed by using the security protection method that is determined by the UE 1 and that is used on the control plane of the PC5 connection on a part or all of parameters transferred in the direct security mode complete message. For example, if the UE 2 determines the first security protection method as the security protection method used on the control plane of the PC5 connection, security protection is performed by using the first security protection method on the part or all of parameters transferred in the direct security mode complete message. For a manner of performing security protection on the part or all of parameters transferred in the direct security mode complete message, refer to the conventional technology. Details are not described herein. For example, the part of parameters on which security protection is performed in the direct security mode complete message may be, for example, at least one of the user plane security policy of the UE 1 in the PC5 connection or the user plane security capability of the UE 1 in the PC5 connection.

S506: The UE 2 determines, according to the first security protection method, the security protection method used on the user plane of the PC5 connection.

In some embodiments, an implementation of determining, by the UE 2 according to the first security protection method, the security protection method used on the user plane of the PC5 connection is similar to an implementation of determining, by the UE 2 according to the first security protection method, the security protection method used on the control plane of the PC5 connection in step S502. For example, the difference lies in the following: 1. The control plane in step S502 is replaced with the user plane in step S506. 2. The user plane security policy of the UE 1 in the PC5 connection in step S506 is from the direct security mode complete message sent by the UE 1 to the UE 2. For other related descriptions, refer to the foregoing step S502. Details are not described herein again.

In other words, in some embodiments, a security level of the security protection method that is determined by the UE 2 and that is used on the user plane of the PC5 connection is not lower than the security level of the first security protection method. In other words, the security level of the first security protection method is a minimum security requirement of user plane signaling interaction, so that security is not degraded.

Optionally, in some embodiments, if the security algorithm used on the control plane of the PC5 connection is different from the security algorithm used on the user plane of the PC5 connection, after the UE 2 determines the security protection method used on the user plane of the PC5 connection, the UE 2 further needs to determine, based on the user plane security capability of the UE 1 in the PC5 connection and the user plane security capability of the UE 2 in the PC5 connection, and with reference to the security protection method that is determined by the UE 2 and that is used on the user plane of the PC5 connection, a security algorithm used on the user plane of the PC5 connection between the UE 1 and the UE 2. This is not limited to some embodiments. The security algorithm used on the user plane of the PC5 connection includes one or more confidentiality protection algorithms and one or more integrity protection algorithms. For a rule followed by the selection of the security algorithm, refer to step S404, and details are not described herein again.

S507: The UE 2 sends a direct communication accept message to the UE 1. Correspondingly, the UE 1 receives the direct communication accept message from the UE 2. The direct communication accept message includes the security protection method used on the user plane of the PC5 connection.

Optionally, in some embodiments, the direct communication accept message may further include the user plane security policy of the UE 1 in the PC5 connection and the user plane security capability (optional) of the UE 1 in the PC5 connection. Further, after the UE 1 receives the direct communication accept message from the UE 2, when the UE 1 determines that the final security protection method used on the control plane of the PC5 connection includes disabling control plane integrity protection, the UE 1 needs to determine whether the user plane security policy in the PC5 connection included in the direct communication accept message is the user plane security policy in the PC5 connection sent by the UE 1 and whether the security capability in the PC5 connection is the security capability in the PC5 connection sent by the UE 1. If the verification succeeds, a subsequent procedure may continue to be performed; otherwise, the current procedure is terminated. This prevents a bidding down attack.

Optionally, in some embodiments, if the UE 2 determines the security algorithm used on the user plane of the PC5 connection, the direct communication accept message further includes the security algorithm used on the user plane of the PC5 connection.

In some embodiments, security protection is performed by using the security protection method that is determined by the UE 2 and that is used on the control plane of the PC5 connection on a part or all of parameters transferred in the direct communication accept message. For example, if the UE 2 determines the first security protection method as the security protection method used on the control plane of the PC5 connection, security protection is performed by using the first security protection method on the part or all of parameters transferred in the direct communication accept message. For a manner of performing security protection on the part or all of parameters transferred in the direct communication accept message, refer to the conventional technology. Details are not described herein. For example, the part of parameters on which security protection is performed in the direct communication accept message may include, for example, at least one of the security protection method used on the user plane of the PC5 connection, the user plane security policy of the UE 1 in the PC5 connection and the user plane security capability of the UE 1 in the PC5 connection, or the security algorithm used on the user plane of the PC5 connection.

According to the communication method provided in some embodiments, in one aspect, in some embodiments, in the PC5 establishment procedure, the security protection method used on the control plane of the PC5 connection and the security protection method used on the user plane of the PC5 connection may be determined according to the first security protection method. Each of a security level of the security protection method used on the control plane of the PC5 connection and a security level of the security protection method used on the user plane of the PC5 connection is not lower than the security level of the first security protection method. In other words, the security level of the first security protection method is a minimum security level requirement of the PC5 connection in the PC5 establishment procedure, so that security is not degraded. In another aspect, in some embodiments, the first security protection method may be used to protect the $1^{st}$ message in the PC5 establishment procedure. In this case, when the first security protection method includes enabling integrity protection, the UE 1 and the UE 2 may perform integrity protection on the $1^{st}$ message in the PC5 establishment procedure by using the first security protection method determined in the ProSe discovery procedure. Therefore, a problem that a security level is degraded because the message in the PC5 establishment procedure is attacked or tampered with by an attacker can be avoided, and a security level of the PC5 establishment procedure can be improved.

The actions of the UE 1 or the UE 2 in steps S501 to S507 may be performed by the processor 301 in the communication device 300 shown in FIG. 3 by invoking the application program code stored in the memory 303, to instruct the UE 1 or the UE 2 to perform the actions. This is not limited in this embodiment.

It should be noted that, in the embodiment shown in FIG. 5, an example in which the security protection method used on the control plane of the PC5 connection and the security protection method used on the user plane of the PC5 connection are determined according to the first security protection method is used for description. Optionally, in some embodiments, the security protection method used on the control plane of the PC5 connection may alternatively be determined according to the first security protection method, and the security protection method used on the user plane of the PC5 connection is negotiated in a manner of steps S407 to S409 in the embodiment shown in FIG. 4. Alternatively, in some embodiments, the security protection method used on the user plane of the PC5 connection may alternatively be determined according to the first security protection method, and the security protection method used on the control plane of the PC5 connection is negotiated in a manner similar to steps S402 to S406 in the embodiment shown in FIG. 4. This is not specifically limited in some embodiments.

Figure 6:
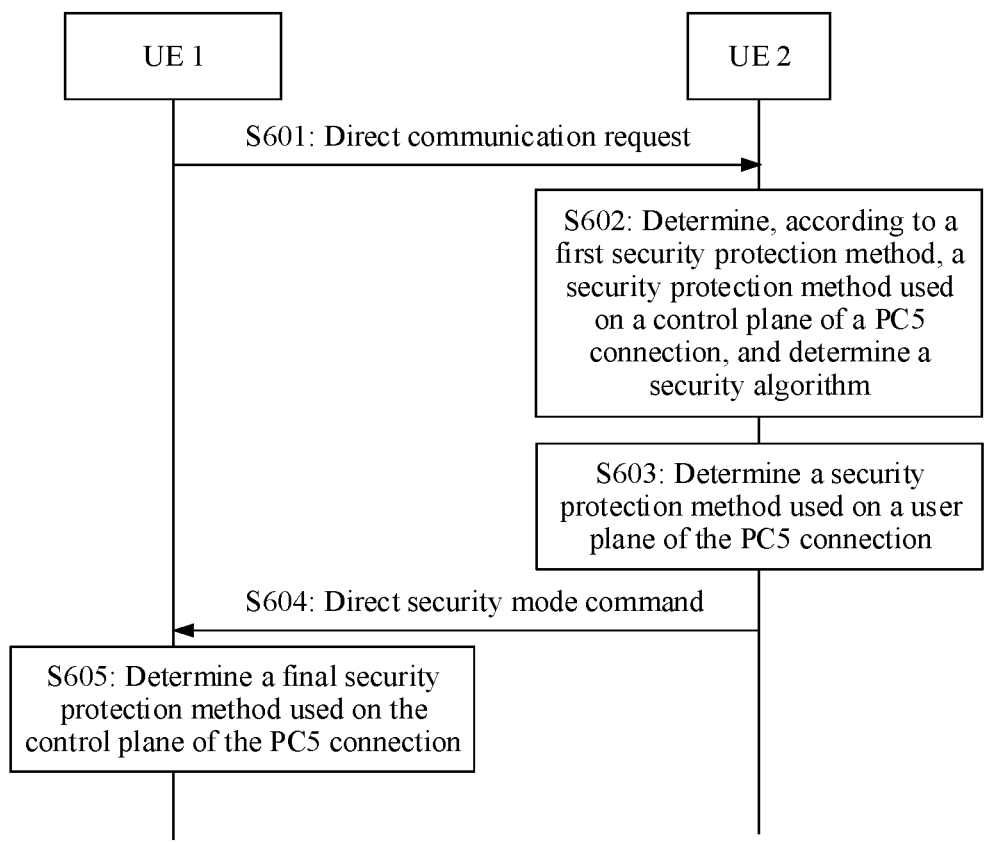
FIG. 6 is a schematic interaction diagram of still another communication method according to an embodiment of this application.

In another possible implementation, interaction between a UE 1 and a UE 2 is used as an example. An embodiment of this application provides a communication method. In the communication method, security protection is performed on one or more messages in a PC5 establishment procedure between the UE 1 and the UE 2 by using a security protection method determined in a ProSe discovery procedure. In addition, in the PC5 establishment procedure, the security protection method determined in the ProSe discovery procedure is used to determine a security protection method used on a control plane of a PC5 connection between the UE 1 and the UE 2 (where for convenience, the PC5 connection between the UE 1 and the UE 2 is referred to as a PC5 connection for short subsequently) and negotiate a security protection method used on a user plane of the PC5 connection. For example, as shown in FIG. 6, the communication method provided in this embodiment this application includes the following steps.

S601: The UE 1 sends a direct communication request to the UE 2. Correspondingly, the UE 2 receives the direct communication request from the UE 1. The direct communication request includes a user plane security policy of the UE 1 in the PC5 connection and a control plane security capability of the UE 1 in the PC5 connection. For related descriptions of the user plane security policy in the PC5 connection and the control plane security capability in the PC5 connection, refer to the preamble of the specific implementation. Details are not described herein again.

Certainly, in some embodiments, the direct communication request may further include a part or all of discovery parameters of the UE 1. For details, refer to the existing 3GPP TS 23.303, v15.1.0 standard. Details are not described herein.

It should be noted that, it is assumed that the standard specifies that the control plane security capability of the UE 1 in the PC5 connection is the same as a user plane security capability of the UE 1 in the PC5 connection, or the security capability does not distinguish between the user plane and the control plane. In this case, in some embodiments, the control plane security capability in the PC5 connection may also be referred to as a security capability in the PC5 connection. This is uniformly described herein, and details are not described below.

Optionally, in some embodiments, security protection is performed by using a first security protection method on the part or all of parameters transferred in the direct communication request. For example, the first security protection method may be used to perform security protection on the user plane security policy of the UE 1 in the PC5 connection and/or the control plane security capability of the UE 1 in the PC5 connection. The first security protection method is a security protection method obtained in the ProSe discovery procedure between the UE 1 and the UE 2. A manner of determining the security protection method in the ProSe discovery procedure is not limited in some embodiments. In a possible implementation, for the manner of determining the security protection method in the ProSe discovery procedure, refer to the subsequent embodiment shown in FIG. 7A and FIG. 7B.

Optionally, in some embodiments, the direct communication request may further include a control plane security policy of the UE 1 in the PC5 connection. The control plane security policy of the UE 1 in the PC5 connection may be used to subsequently determine the security protection method used on the control plane of the PC5 connection between the UE 1 and the UE 2. Security protection may be performed by using the first security protection method for the control plane security policy of the UE 1 in the PC5 connection. For related descriptions of the control plane security policy in the PC5 connection, refer to the preamble of the specific implementation. Details are not described herein again.

Optionally, in some embodiments, when the user plane security capability of the PC5 connection is different from the control plane security capability of the PC5 connection, the direct communication request may further include the user plane security capability of the UE 1 in the PC5 connection.

Optionally, in some embodiments, when the UE 1 determines that the first security protection method includes enabling integrity protection, the direct communication request may further include MIC 3. For related descriptions of the MIC 3, refer to the embodiment shown in FIG. 4. Details are not described again herein. Further, after receiving the direct communication request from the UE 1, the UE 2 may verify the MIC 3. For a manner of verifying the MIC 3, refer to the embodiment shown in FIG. 4. Details are not described herein again. If the verification of the MIC 3 succeeds, it may indicate that the part or all of parameters transferred in the direct communication request in step S601 are completely protected, and are not attacked by an external attacker. In this case, the following step S602 may continue to be performed.

S602: The UE 2 determines, according to the first security protection method, the security protection method used on the control plane of the PC5 connection, and the UE 2 determines, based on the control plane security capability of the UE 1 in the PC5 connection and a control plane security capability of the UE 2 in the PC5 connection, a security algorithm used on the control plane of the PC5 connection between the UE 1 and the UE 2.

For related descriptions of step S602, refer to step S502 in the embodiment shown in FIG. 5. Details are not described again herein.

S603: The UE 2 determines, according to the user plane security policy of the UE 1 in the PC5 connection and a user plane security policy of the UE 2 in the PC5 connection, the security protection method used on the user plane of the PC5 connection between the UE 1 and the UE 2.

For related descriptions of step S603, refer to step S408 in the embodiment shown in FIG. 4. Details are not described again herein.

S604: The UE 2 sends a direct security mode command to the UE 1. Correspondingly, the UE 1 receives the direct security mode command from the UE 2. The direct security mode command includes the security protection method used on the user plane of the PC5 connection and the security algorithm that is selected by the UE 2 and that is used on the control plane of the PC5 connection.

Optionally, in some embodiments, the direct security mode command may further include the user plane security policy of the UE 1 in the PC5 connection, the control plane security capability (optional) of the UE 1 in the PC5 connection, the user plane security capability (optional) of the UE 1 in the PC5 connection, and the control plane security policy (optional) of the UE 1 in the PC5 connection. Further, after the UE 1 receives the direct security mode command from the UE 2, when the UE 1 determines that the final security protection method used on the control plane of the PC5 connection includes disabling control plane integrity protection, the UE 1 needs to determine whether the user plane security policy in the PC5 connection included in the direct security mode command is the user plane security policy in the PC5 connection sent by the UE 1, whether the control plane security capability in the PC5 connection is the control plane security capability in the PC5 connection sent by the UE 1, whether the user plane security capability in the PC5 connection is the user plane security capability in the PC5 connection sent by the UE 1, and whether the control plane security policy in the PC5 connection is the control plane security policy in the PC5 connection sent by the UE 1. If the verification succeeds, the subsequent procedure may continue to be performed; otherwise, the current procedure is terminated. This prevents a bidding down attack.

Optionally, in some embodiments, if the UE 2 determines the security algorithm used on the user plane of the PC5 connection, the direct security mode command further includes the security algorithm used on the user plane of the PC5 connection.

In some embodiments, security protection is performed by using the security protection method that is determined by the UE 2 and that is used on the control plane of the PC5 connection on a part or all of parameters transferred in the direct security mode command. For example, if the UE 2 determines the first security protection method as the security protection method used on the control plane of the PC5 connection, security protection is performed by using the first security protection method determined in the ProSe discovery procedure on the part or all of parameters transferred in the direct security mode command. For a manner of performing security protection on the part or all of parameters transferred in the direct security mode command, refer to the conventional technology. Details are not described herein. For example, the part of parameters on which security protection is performed in the direct security mode command may include, for example, at least one of the security algorithm that is selected by the UE 2 and that is used on the control plane of the PC5 connection, the security protection method used on the user plane of the PC5 connection, the user plane security policy of the UE 1 in the PC5 connection, the user plane security capability of the UE 1 in the PC5 connection, the control plane security capability of the UE 1 in the PC5 connection, the control plane security policy of the UE 1 in the PC5 connection, or the security algorithm used on the user plane of the PC5 connection.

S605: The UE 1 determines, based on the security algorithm that is selected by the UE 2 and that is used on the control plane of the PC5 connection, a final security protection method used on the control plane of the PC5 connection.

For related descriptions of step S605, refer to step S406 in the embodiment shown in FIG. 4. Details are not described again herein.

So far, both the UE 1 and the UE 2 can learn of the security protection method used on the control plane of the PC5 connection and the security protection method used on the user plane of the PC5 connection.

It should be noted that, in some embodiments, the security protection method that is determined by the UE 1 and that is used on the control plane of the PC5 connection may be used for security protection of control plane signaling after the PC5 establishment procedure shown in FIG. 6. This is uniformly described herein, and details are not described below.

Optionally, in some embodiments, the direct communication request in step S601 may alternatively be replaced with the direct security mode complete message, and the direct security mode command in step S604 may alternatively be replaced with the direct communication accept message. In other words, the foregoing security protection method used on the user plane of the PC5 connection is negotiated by using a message in a negotiation procedure of the security protection method used on the user plane of the PC5 connection. This is not limited to some embodiments.

According to the communication method provided in some embodiments, in one aspect, in some embodiments, in the PC5 establishment procedure, the security protection method used on the control plane of the PC5 connection may be determined according to the first security protection method. A security level of the security protection method used on the control plane of the PC5 connection is not lower than a security level of the first security protection method. In other words, the security level of the first security protection method is a minimum security level requirement of control plane signaling interaction, so that security is not degraded. In another aspect, in some embodiments, the first security protection method may be used to protect the $1^{st}$ message in the PC5 establishment procedure. In this case, when the first security protection method includes enabling integrity protection, the UE 1 and the UE 2 may perform integrity protection on the $1^{st}$ message in the PC5 establishment procedure by using the first security protection method. Therefore, a problem that a security level is degraded because the message in the PC5 establishment procedure is attacked or tampered with by an attacker can be avoided, and a security level of the PC5 establishment procedure can be improved.

It should be noted that, in the embodiment shown in FIG. 6, an example in which in the PC5 establishment procedure, the first security protection method is used to determine the security protection method used on the control plane of the PC5 connection and negotiate the security protection method used on the user plane of the PC5 connection is used for description. Optionally, an embodiment of this application may further provide a communication method. In the communication method, security protection is performed on one or more messages in a PC5 establishment procedure by using a first security protection method. In addition, in the PC5 establishment procedure, the first security protection method is used to determine a security protection method used on a user plane of a PC5 connection and negotiate a security protection method used on a control plane of the PC5 connection. For some implementations of the method, refer to the embodiment shown in FIG. 6. Details are not described herein again.

The actions of the UE 1 or the UE 2 in steps S601 to S605 may be performed by the processor 301 in the communication device 300 shown in FIG. 3 by invoking the application program code stored in the memory 303, to instruct the UE 1 or the UE 2 to perform the actions. This is not limited in this embodiment.

It should be noted that, in the embodiment shown in FIG. 5 or FIG. 6, an example in which the security protection method used on the control plane of the PC5 connection and/or the security protection method used on the user plane of the PC5 connection are/is determined according to the first security protection method is used for description. Certainly, in some embodiments, the security protection method used on the control plane of the PC5 connection and/or the security protection method used on the user plane of the PC5 connection may alternatively be obtained in a ProSe discovery procedure. Therefore, the PC5 establishment procedure does not need to negotiate the security protection method used on the control plane of the PC5 connection, and does not need to negotiate the security protection method used on the user plane of the PC5 connection. Therefore, signaling overheads of the PC5 establishment procedure can be reduced. Further, when the security protection method that is used on the control plane of the PC5 connection and that is obtained in the ProSe discovery procedure includes enabling control plane integrity protection, integrity protection may be performed on all messages in the PC5 establishment procedure. Therefore, a problem that a security level is degraded because the message in the PC5 establishment procedure is attacked or tampered with by an attacker can be avoided, and a security level of the PC5 establishment procedure can be improved.

Figure 7A:
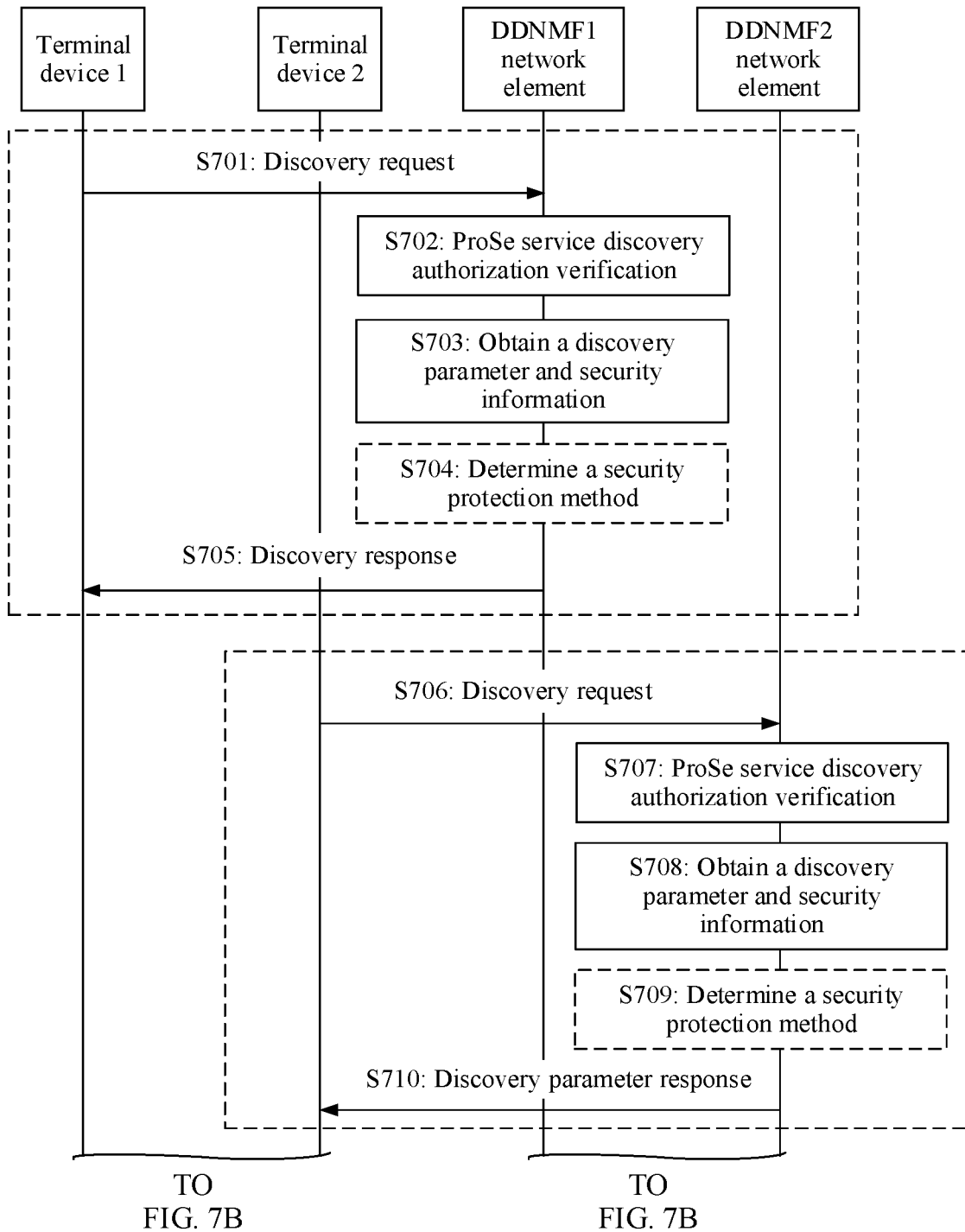
FIG. 7A and FIG. 7B are a schematic interaction diagram of still another communication method according to an embodiment of this application.
Figure 7B:
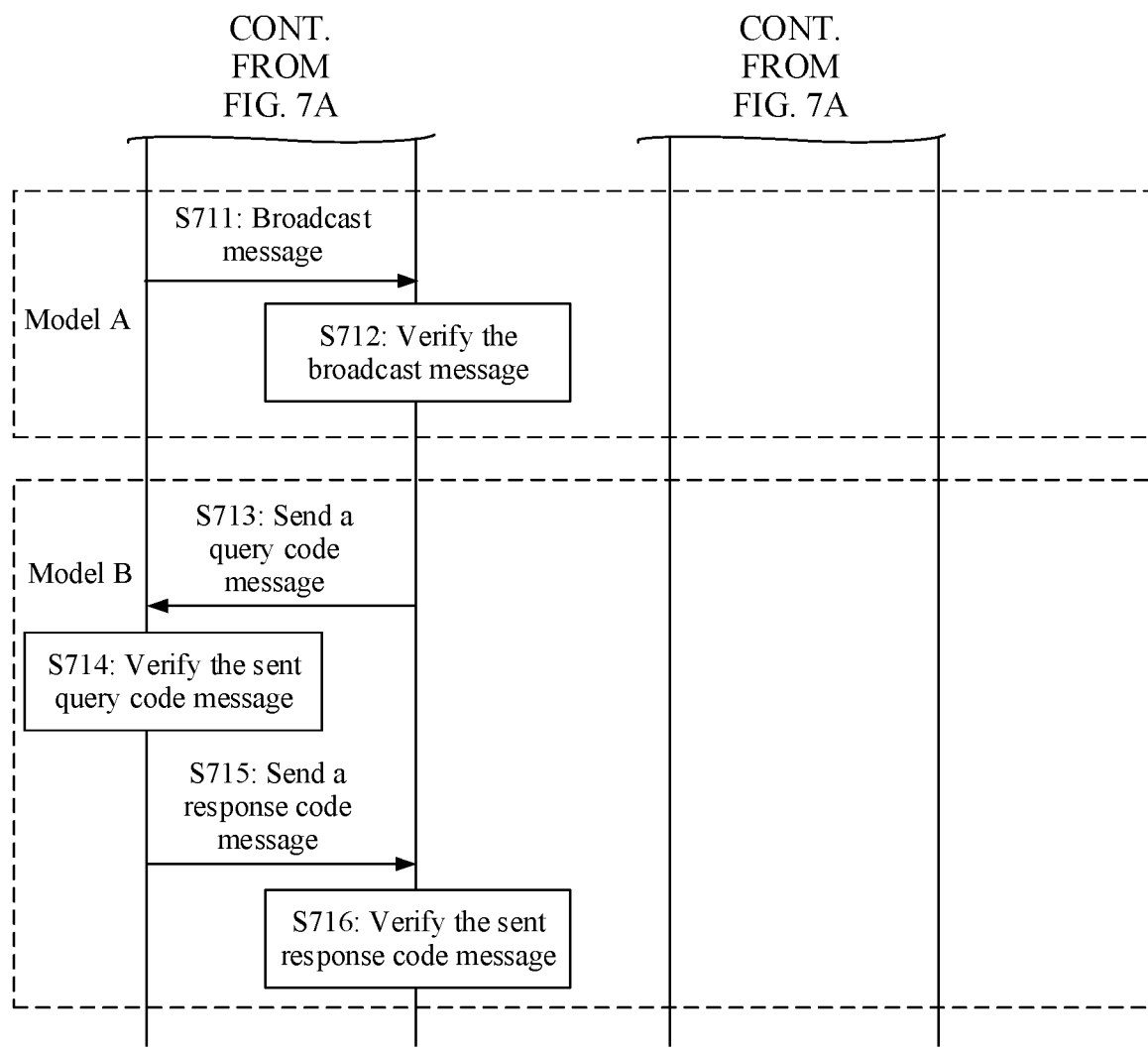

An embodiment of this application further provides a communication method. The communication method is used to obtain the first security protection method in any one of embodiments in FIG. 4 to FIG. 6. Optionally, a security protection method used on a control plane of a PC5 connection and/or a security protection method used on a user plane of the PC5 connection may be further obtained by using the communication method. For example, as shown in FIG. 7A and FIG. 7B, the communication method includes the following steps.

S701: A terminal device 1 sends a discovery request to a DDNMF1 network element. Correspondingly, the DDNMF1 network element receives the discovery request from the terminal device 1.

The discovery request includes one or more of 3GPP identity information of the terminal device 1, identity information used for a ProSe service, a discovery mode, a discovery command, a discovery type, and an application identity (ID). For related descriptions of the discovery type, the discovery mode, the discovery command, or the identity information used for the ProSe service, refer to the preamble of the specific implementation. Details are not described herein again.

For example, the terminal device 1 in some embodiments may be an announcing UE in a model A discovery mode, and the following terminal device 2 may be a monitoring UE in the model A discovery mode. Alternatively, the terminal device 1 in some embodiments may be a discoveree UE in a model B discovery mode, and the following terminal device 2 may be a discoverer UE in the model B discovery mode. This is uniformly described herein, and details are not described below.

In a possible implementation, in some embodiments, the terminal device 1 may send the discovery request to the DDNMF1 network element by using a non-access stratum (NAS) message of the control plane. In other words, in this case, the discovery request is a NAS message, or a parameter that is carried in the NAS message and that is used to implement a function of the discovery request. In another possible implementation, the terminal device 1 may send the discovery request to the DDNMF1 network element through the user plane. In other words, in this case, the discovery request is carried by the internet protocol (IP) or the non-IP. A manner of sending the discovery request is not specifically limited in some embodiments.

Optionally, in some embodiments, the 3GPP identity information of the terminal device 1 may be, for example, one of a subscription concealed identifier (SUCI), a 5G-global unique temporary identifier (GUTI), a generic public subscription identifier (GPSI), and a permanent equipment identifier (PEI). If the terminal device 1 accesses the DDNMF1 network element by using a control plane procedure, the identity information such as the SUCI or the 5G-GUTI may be used as the 3GPP identity information of the terminal device 1. If the terminal device 1 accesses the DDNMF1 network element by using a user plane procedure, the identity information such as the GPSI or the PEI may be used as the 3GPP identity information of the terminal device 1. This is uniformly described herein, and details are not described below.

Optionally, the application identity in some embodiments indicates some applications. The application identity may be pre-configured on the terminal device 1. In a possible implementation, in some embodiments, the DDNMF1 network element may determine, based on the application identity, the corresponding identity information used for the ProSe service. For example, assuming that a discovery type corresponding to an application identity is fixed, that is, one application identity corresponds to one discovery type (for example, open discovery or restricted discovery), because the discovery type may correspond to a user identity used for a ProSe service (where for example, a ProSe application ID is used in an open discovery scenario, and a PDUID or an RPAUID is used in a restricted discovery scenario), corresponding identity information used for the ProSe service may be indirectly determined based on the application identity.

Optionally, the discovery request in some embodiments may further include a service type. The service type is a finer granularity of the application identity, in other words, one application identity may correspond to different service types. The service type is used to assist the application identity in determining the corresponding identity information used for the ProSe service. In other words, in some embodiments, the DDNMF1 network element may determine, based on the application identity and the service type, the corresponding identity information used for the ProSe service.

Optionally, the service type in some embodiments may be used to represent a specific service requirement of the application identified by the application identity. For example, the service type indicates a charged service or a free service of an application. In some embodiments, the service type is introduced to improve flexibility of using the application.

Optionally, content of the service type in some embodiments may be stored or transferred in different methods based on different indication information. For example, 0 or 1 indicates whether the service is charged or free of charge. This is not limited to some embodiments.

Optionally, the service type in some embodiments may be configured on the terminal device 1 when the application identified by the application identity is installed, or may be sent by a network side to the terminal device 1. This is not limited to some embodiments.

It should be noted that, in some embodiments, when the discovery request is transferred between the terminal device 1 and the DDNMF1 network element, the discovery request may be forwarded and processed by another network element. In other words, when the discovery request is transferred between the terminal device 1 and the DDNMF1 network element, content of the message may be properly modified. In some embodiments, the message is merely described from a function perspective. This is uniformly described herein, and details are not described below. For example, in a process in which the terminal device 1 sends the discovery request to the DDNMF1 network element through the control plane, the 3GPP identity information of the terminal device 1 needs to be converted into a subscription permanent identifier (SUPI) of the terminal device 1 through "translation" of an AMF network element or another network element. Alternatively, in a process in which the terminal device 1 sends the discovery request to the DDNMF1 network element through the user plane, the 3GPP identity information of the terminal device 1 may be converted into a SUPI of the terminal device 1 through "translation" of an NEF network element or another network element. Certainly, if the 3GPP identity information of the terminal device 1 obtained by the DDNMF1 network element does not include the SUPI, the DDNMF1 network element may further obtain the SUPI of the terminal device 1 by interacting with a UDM network element (or another network element). For example, the DDNMF1 network element sends a UE ID request message to the UDM network element, where the UE ID request message includes the 3GPP identity information (such as the GPSI or the PEI) of the terminal device 1. After receiving the UE ID request message from the DDNMF1 network element, and determining the SUPI of the terminal device 1 based on the 3GPP identity information of the terminal device 1, the UDM network element sends the SUPI of the terminal device 1 to the DDNMF1 network element.

S702: The DDNMF1 network element performs ProSe service discovery authorization verification on the terminal device 1 based on the identity information used for the ProSe service and the application identity.

Optionally, in some embodiments, the DDNMF1 network element may determine a corresponding ProSe app server based on the application identity, and the ProSe app server notifies the DDNMF1 network element after completing the authorization verification. In some embodiments, authorization verification performed by the ProSe app server is used to verify whether the terminal device 1 can legally use the ProSe service. This is uniformly described herein, and details are not described below.

Optionally, in some embodiments, if the terminal device 1 carries a plurality of pieces of identity information used for the ProSe service, according to the foregoing descriptions, the DDNMF1 network element needs to perform ProSe service discovery authorization verification on the terminal device 1 based on each piece of identity information used for the ProSe service. The foregoing plurality of authorizations may each be performed in an independent procedure, or may be performed in a unified procedure. This is uniformly described herein, and details are not described below.

S703: The DDNMF1 network element obtains a corresponding discovery parameter and corresponding security information for using the ProSe service by the terminal device 1.

In some embodiments, the DDNMF1 network element may obtain, based on the 3GPP identity information of the terminal device 1 and the identity information used for the ProSe service, the corresponding discovery parameter and the corresponding security information for using the ProSe service by the terminal device 1. A manner in which the DDNMF network element obtains the corresponding discovery parameter and the corresponding security information for using the ProSe service by the terminal device 1 includes: locally obtaining both the discovery parameter and the security information from the DDNMF1 network element; locally obtaining a part of content in the discovery parameter and the security information from the DDNMF1 network element, and obtaining a part of content from an authentication response replied by the ProSe app server in the ProSe service discovery authorization verification procedure; or obtaining both the discovery parameter and the security information from an authentication response replied by the ProSe app server in the ProSe service discovery authorization verification procedure. This is not limited to some embodiments.

In some embodiments, in the restricted discovery scenario, the discovery parameter of the terminal device 1 may be, for example, shown in Table 1.

TABLE 1

|  | Model A | Model B |
| --- | --- | --- |
| Code used for ProSe discovery | ProSe Code | ProSe Response Code |
| Discovery parameter container | Code-Send-SecParams | Code-Send-SecParams Code-Rcv-SecParams |
| Discovery time limit parameter | CURRENT_TIME and MAX_OFFSET | |

In the model A mode, Code-Send-SecParams includes a discovery parameter used to protect Prose Restricted Code in a discovery procedure on a PC5 interface. In the model B mode, Code-Send-SecParams includes a discovery parameter used to protect the ProSe Response Code in the discovery procedure on the PC5 interface. Code-Rcv-SecParams includes a discovery parameter used to obtain the code used for ProSe discovery sent by the peer end in the discovery procedure on the PC5 interface. For related descriptions of the discovery parameters in Table 1, refer to existing 3GPP TS 23.303, v15.1.0 and 3GPP TS 33.303, v15.0.0 standards. Details are not described herein.

In some embodiments, in the open discovery scenario, the discovery parameter of the terminal device 1 may be, for example, shown in Table 2.

TABLE 2

| Model A | |
|---|---|
| Code used for ProSe discovery | ProSe Application Code |
| Discovery parameter | Discovery Key |
| Discovery time limit parameter | CURRENT_TIME and MAX_OFFSET |

Discovery Key includes a discovery parameter used to protect ProSe Application Code in the discovery procedure, that is, the foregoing discovery parameter is used to protect the code used for ProSe discovery on the PC5 interface. For related descriptions of the discovery parameters in Table 2, refer to existing 3GPP TS 23.303, v15.1.0 and 3GPP TS 33.303, v15.0.0 standards. Details are not described herein.

Optionally, in some embodiments, the corresponding security information for using the ProSe service by the terminal device 1 includes a security protection method required for using the ProSe service by the terminal device 1, or a plurality of corresponding optional security protection methods for using the ProSe service by the terminal device 1.

In some embodiments, the security protection method required for using the ProSe service by the terminal device 1 is a fixed security protection method. Optionally, the security protection method may be used to perform security protection on the subsequent $1^{st}$ PC5 broadcast message; the security protection method may be used to perform security protection on one or more messages in the PC5 establishment procedure; and/or the security protection method may be used to determine a security protection method for a PC5 connection between the terminal device 1 and the terminal device 2. The security protection method for the PC5 connection is used to perform security protection on a part or all of parameters transferred in control plane signaling of the PC5 connection; and/or the security protection method for the PC5 connection is used to perform security protection on a part or all of user plane data of the PC5 connection. For example, for the example in which the security protection method is used to perform security protection on the one or more messages in the PC5 establishment procedure; and/or the security protection method is used to determine the security protection method for the PC5 connection between the terminal device 1 and the terminal device 2, refer to any one of embodiments shown in FIG. 4 to FIG. 6. Details are not described herein again. For related descriptions of the $1^{st}$ PC5 broadcast message, refer to the preamble of the implementation. Details are not described herein again.

Optionally, in some embodiments, there may be a plurality of security protection methods required for using the ProSe service by the terminal device 1. For example, one security protection method is a security protection method used for the $1^{st}$ PC5 broadcast message, one security protection method is a security protection method used on the control plane of the PC5 connection, and one security protection method is a security protection method used on the user plane of the PC5 connection. The security protection method used for the $1^{st}$ PC5 broadcast message, the security protection method used on the control plane of the PC5 connection, and the security protection method used on the user plane of the PC5 connection may be the same or may be different. This is not limited to some embodiments.

For example, in some embodiments, the security protection method required for using the ProSe service by the terminal device 1 may include, for example, any one of the following: enabling confidentiality protection+enabling integrity protection, enabling confidentiality protection+disabling integrity protection, disabling confidentiality protection+enabling integrity protection, or disabling confidentiality protection+disabling integrity protection. By default, the to-be-used security protection method may be used to perform security protection on at least the subsequent $1^{st}$ PC5 broadcast message.

Alternatively, for example, in some embodiments, the security protection method required for using the ProSe service by the terminal device 1 may include, for example, the following:

The security protection method used for the $1^{st}$ PC5 broadcast message is: disabling confidentiality protection+enabling integrity protection, the security protection method used on the control plane of the PC5 connection is: enabling confidentiality protection+enabling integrity protection, and the security protection method used on the user plane of the PC5 connection is: enabling confidentiality protection+enabling integrity protection. The security protection method used for the $1^{st}$ PC5 broadcast message, the security protection method used on the control plane of the PC5 connection, and the security protection method used on the user plane of the PC5 connection are all different.

Alternatively, for example, in some embodiments, the security protection method required for using the ProSe service by the terminal device 1 may include, for example, the following:

The security protection method used for the $1^{st}$ PC5 broadcast message and the security protection method used on the control plane of the PC5 connection are: disabling confidentiality protection+enabling integrity protection, and the security protection method used on the user plane of the PC5 connection is: enabling confidentiality protection+enabling integrity protection.

Alternatively, for example, in some embodiments, the security protection method required for using the ProSe service by the terminal device 1 may include, for example, the following:

The security protection method used for the $1^{st}$ PC5 broadcast message is: disabling confidentiality protection+enabling integrity protection, and the security protection method used on the control plane of the PC5 connection is: enabling confidentiality protection+enabling integrity protection.

Alternatively, for example, in some embodiments, the security protection method required for using the ProSe service by the terminal device 1 may include, for example, the following:

The security protection method used for the $1^{st}$ PC5 broadcast message is: disabling confidentiality protection+enabling integrity protection, and the security protection method used on the user plane of the PC5 connection is: enabling confidentiality protection+enabling integrity protection.

In some embodiments, the plurality of optional security protection methods may be, for example, security protection methods corresponding to security policies recommended by the ProSe app server. Further, the plurality of optional security protection methods may be sorted based on priorities.

For example, the plurality of optional security protection methods that are sorted based on priorities may include, for example, disabling confidentiality protection+enabling integrity protection>enabling confidentiality protection+enabling integrity protection>disabling confidentiality protection+disabling integrity protection. ">" herein may be understood as that "a security level is higher than". This is uniformly described herein, and details are not described below.

Optionally, in some embodiments, for different discovery modes, for example, the model A or the model B, different security information may be used, or same security information may be used. This is not limited to some embodiments.

Optionally, the security information in some embodiments may alternatively be associated with the code used for ProSe discovery in Table 1 or Table 2. In other words, different codes used for ProSe discovery may correspond to different security information, or same security information may be used. This is not limited to some embodiments.

It should be noted that, the security information in some embodiments may be included in the discovery parameter. This is not limited to some embodiments.

Further, when the corresponding security information for using the ProSe service by the terminal device 1 in some embodiments includes the plurality of corresponding optional security protection methods for using the ProSe service by the terminal device 1, step S705 needs to be performed after the following step S704 is performed. When the corresponding security information for using the ProSe service by the terminal device 1 in some embodiments includes the security protection method required for using the ProSe service by the terminal device 1, step S705 is directly performed, and step S704 does not need to be performed.

S704: The DDNMF1 network element determines, according to the plurality of optional security protection methods, the security protection method required for using the ProSe service by the terminal device 1.

Optionally, in some embodiments, the DDNMF1 network element may select, from the plurality of optional security protection methods based on parameters such as a status of the terminal device 1, a type of the terminal device 1, and a quality of service (QOS) requirement of the current service, the security protection method required for using the ProSe service by the terminal device 1.

For example, if the service is a low-latency service, the DDNMF1 network element may determine a security protection method with a lowest security level as the security protection method required for using the ProSe service by the terminal device 1. Alternatively, for example, if the service is a highly reliable service, the DDNMF1 network element may determine a security protection method with a highest security level as the security protection method required for using the ProSe service by the terminal device 1.

Certainly, in some embodiments, the DDNMF1 network element may directly determine a security protection method with a highest security level in the plurality of optional security protection methods as the security protection method required for using the ProSe service by the terminal device 1. This is not limited to some embodiments.

S705: The DDNMF1 network element sends a discovery response to the terminal device 1. Correspondingly, the terminal device 1 receives the discovery response from the DDNMF1 network element. The discovery response includes a corresponding discovery parameter and a required security protection method for using the ProSe service by the terminal device 1.

It should be noted that, in some embodiments, the security protection method required for using the ProSe service by the terminal device 1 may be included in the discovery parameter. This is not limited to some embodiments.

In conclusion, by using steps S701 to S705, the terminal device 1 may obtain the corresponding discovery parameter and the required security protection method for using the ProSe service by the terminal device 1.

S706: The terminal device 2 sends the discovery request to a DDNMF2 network element. Correspondingly, the DDNMF2 network element receives the discovery request from the terminal device 2.

S707: The DDNMF2 network element performs ProSe service discovery authorization verification on the terminal device 2 based on the identity information used for the ProSe service and the application identity.

S708: The DDNMF2 network element obtains a corresponding discovery parameter and corresponding security information for using the ProSe service by the terminal device 2.

Further, when the corresponding security information for using the ProSe service by the terminal device 2 in some embodiments includes a plurality of corresponding optional security protection methods for using the ProSe service by the terminal device 2, step S710 needs to be performed after the following step S709 is performed. When the corresponding security information for using the ProSe service by the terminal device 2 in some embodiments includes a security protection method required for using the ProSe service by the terminal device 2, step S710 is directly performed, and step S709 does not need to be performed.

S709: The DDNMF2 network element determines, according to the plurality of optional security protection methods, the security protection method required for using the ProSe service by the terminal device 2.

S710: The DDNMF2 network element sends a discovery response to the terminal device 2. Correspondingly, the terminal device 2 receives the discovery response from the DDNMF2 network element. The discovery response includes the corresponding discovery parameter and the required security protection method for using the ProSe service by the terminal device 2.

In some embodiments, in the restricted discovery scenario, the discovery parameter of the terminal device 2 may be, for example, shown in Table 3.

TABLE 3

|  | Model A | Model B |
| --- | --- | --- |
| Code used for ProSe discovery | Prose Restricted Code | ProSe Query Code |
| Discovery parameter container | Code-Rcv-SecParams | Code-Send-SecParams Code-Rcv-SecParams |
| Discovery time limit parameter | CURRENT_TIME and MAX_OFFSET | |

In the model A mode, Code-Rcv-SecParams includes a discovery parameter used to protect Prose Restricted Code in a discovery procedure on a PC5 interface. In the model B mode, Code-Send-SecParams includes a discovery parameter used to protect ProSe Query Code in the discovery procedure on the PC5 interface. Code-Rcv-SecParams includes a discovery parameter used to obtain the code used for ProSe discovery sent by the peer end in the discovery procedure on the PC5 interface. That is, the foregoing discovery parameter is used to protect the code used for ProSe discovery on the PC5 interface. For related descriptions of the discovery parameters in Table 3, refer to existing 3GPP TS 23.303, v15.1.0 and 3GPP TS 33.303, v15.0.0 standards. Details are not described herein.

In some embodiments, in the open discovery scenario, the discovery parameter of the terminal device 2 may be, for example, shown in Table 4.

TABLE 4

| | Model A |
|---|---|
| Code used for ProSe discovery | ProSe Application Code |
| Discovery time limit parameter | CURRENT_TIME and MAX_OFFSET |

It should be noted that in the open discovery scenario, the terminal device 2 does not require a corresponding discovery key, and decryption depends on a matching report procedure. In other words, in this case, the terminal device 2 does not have a corresponding discovery parameter. For related descriptions, refer to existing 3GPP TS 23.303, v15.1.0 and 3GPP TS 33.303, v15.0.0 standards. Details are not described herein.

For implementations of the foregoing steps S706 to S710, refer to the foregoing steps S701 to S705. For example, the difference lies in that the terminal device 1 in steps S701 to S705 is replaced with the terminal device 2 in steps S706 to S710, and the DDNMF1 network element in steps S701 to S705 is replaced with the DDNMF2 network element in steps S706 to S710. For other related descriptions, refer to the foregoing steps S701 to S705. Details are not described herein again.

In conclusion, by using steps S706 to S710, the terminal device 2 may obtain the corresponding discovery parameter and the required security protection method for using the ProSe service by the terminal device 2.

It should be noted that, steps S706 to S710 are described by using an example in which the DDNMF2 network element determines the security protection method required for using the ProSe service. Optionally, in some embodiments, the DDNMF2 network element may alternatively determine, through negotiation with the DDNMF1 network element, the security protection method required for using the ProSe service.

In a possible implementation, the DDNMF2 network element obtains, from the DDNMF1, the security protection method required for using the ProSe service by the terminal device 1. Further, the DDNMF2 network element determines, according to the plurality of corresponding optional security protection methods for using the ProSe service by the terminal device 2 and the security protection method required for using the ProSe service by the terminal device 1, the security protection method required for using the ProSe service by the terminal device 2. For example, the DDNMF2 network element determines whether the plurality of corresponding optional security protection methods for using the ProSe service by the terminal device 2 include the security protection method required for using the ProSe service by the terminal device 1. When the plurality of corresponding optional security protection methods for using the ProSe service by the terminal device 2 include the security protection method required for using the ProSe service by the terminal device 1, the DDNMF2 network element determines the security protection method required for using the ProSe service by the terminal device 1 as the security protection method required for using the ProSe service by the terminal device 2. For another example, when the plurality of corresponding optional security protection methods for using the ProSe service by the terminal device 2 do not include the security protection method required for using the ProSe service by the terminal device 1, the DDNMF2 network element determines, from the plurality of corresponding optional security protection methods for using the ProSe service by the terminal device 2, the security protection method required for using the ProSe service by the terminal device 2. For example, the plurality of corresponding optional security protection methods that is obtained by the DDNMF2 network element and that is for using the ProSe service by the terminal device 2 include enabling integrity protection+disabling confidentiality protection, or enabling integrity protection+enabling confidentiality protection. In other words provided that integrity protection is enabled, confidentiality protection may be enabled or disabled. It is assumed that the security protection method required for using the ProSe service by the terminal device 1 includes enabling integrity protection+disabling confidentiality protection, or the security protection method required for using the ProSe service by the terminal device 1 includes enabling integrity protection+enabling confidentiality protection. In this case, the DDNMF2 network element may determine that the security protection method required for using the ProSe service by the terminal device 1 is the security protection method required for using the ProSe service by the terminal device 2.

In another possible implementation, the DDNMF2 network element obtains, from the DDNMF1, the security protection method required for using the ProSe service by the terminal device 1. Further, after determining the security protection method required for using the ProSe service by the terminal device 2, the DDNMF2 network element may further determine whether the security protection method required for using the ProSe service by the terminal device 1 is the same as the security protection method required for using the ProSe service by the terminal device 2. If the methods are the same, the DDNMF network element may continue to perform step S710. If the methods are different, the DDNMF2 network element may determine the security protection method required for using the ProSe service by the terminal device 1 as the final security protection method required for using the ProSe service by the terminal device 2, and includes the security protection method required for using the ProSe service by the terminal device 2 in step S710. This is not limited to some embodiments.

It should be noted that, when the terminal device 1 or the terminal device 2 needs to obtain security protection methods corresponding to a plurality of codes used for ProSe discovery, after the DDNMF2 network element obtains, from the DDNMF1 network element, the security protection method required for using the ProSe service by the terminal device 1, if the security protection method required for using the ProSe service by the terminal device 1 includes the security protection methods corresponding to the plurality of codes used for ProSe discovery, the DDNMF2 network element determines, in the plurality of corresponding optional security protection methods for using the ProSe service by the terminal device 2, whether there is a security protection method corresponding to a code used for ProSe discovery being the same as a security protection method corresponding to a code used for same ProSe discovery in the security protection method required for using the ProSe service by the terminal device 1. If there is the security protection method, the DDNMF2 network element may further perform step S710, and include the security protection method corresponding to the code used for ProSe discovery in step S710. This is uniformly described herein, and details are not described below.

Optionally, in some embodiments, that the DDNMF2 network element obtains, from the DDNMF1 network element, the security protection method required for using the ProSe service by the terminal device 1 may include: the DDNMF2 network element sends a request message to the DDNMF1 network element, where the request message is used to request the security protection method required for using the ProSe service by the terminal device 1. The request message includes identity information that is used for the ProSe service and that is sent by the terminal device 2, or information that may be associated with identity information that is used for the ProSe service and that is sent by the terminal device 1, or information that may be associated with a target application. Further, the DDNMF2 network element receives, from the DDNMF1 network element, the security protection method required for using the ProSe service by the terminal device 1.

Optionally, in some embodiments, the DDNMF2 network element may determine, by using the conventional technology, whether to obtain, from the DDNMF1 network element, the security protection method required for using the ProSe service by the terminal device 1. This is not specifically limited to some embodiments.

It should be noted that, in some embodiments, an example in which the identity information that is used for the ProSe service and that is sent by the terminal device 1 is the same as the identity information that is used for the ProSe service and that is sent by the terminal device 2 is used for description. This is uniformly described herein, and details are not described below. Certainly, in some embodiments, the identity information that is used for the ProSe service and that is sent by the terminal device 1 may alternatively be different from the identity information that is used for the ProSe service and that is sent by the terminal device 2. In this case, the DDNMF1 network element/DDNMF2 network element may determine the to-be-used security protection method based on the identity information that is used for the ProSe service and that is sent by the terminal device 2 and the identity information that is used for the ProSe service and that is sent by the terminal device 1. For example, the DDNMF1 network element/DDNMF2 network element may associate the identity information that is used for the ProSe service and that is sent by the terminal device 2 with the identity information that is used for the ProSe service and that is sent by the terminal device 1. For example, the application ID may be used for association. This is not limited to some embodiments.

Optionally, the communication method provided in some embodiments further includes the following discovery broadcast procedure.

The model A discovery scenario is used as an example. In this case, the communication method provided in some embodiments may further include the following steps S711 and S712.

S711: The terminal device 1 sends a broadcast (announcing) message to the terminal device 2. Correspondingly, the terminal device 2 receives the broadcast message from the terminal device 1. Security protection is performed on the broadcast message by using the security protection method that is obtained in step S705 and that is required for using the ProSe service by the terminal device 1.

Optionally, in some embodiments, the broadcast message may include a security protection method for performing security protection on the broadcast message, so that the terminal device 2 using the security protection method can receive the broadcast message. The security protection method for performing security protection on the broadcast message may be implicitly carried in the broadcast message, or may be explicitly carried in the broadcast message. This is not limited to some embodiments.

For example, an implicit manner is that different codes used for ProSe discovery represent different security protection methods. In other words, the DDNMF1 network element may send, to an announcing UE, a plurality of codes used for ProSe discovery, and different codes used for ProSe discovery correspond to different security protection methods. Further, after receiving the broadcast message, the terminal device 2 may determine a corresponding security protection method based on the code used for ProSe discovery.

Alternatively, for example, an explicit manner is that security indication information is carried in the broadcast message, where the security indication information indicates a security protection method used for the broadcast message. For example, the security indication information is two bits. 0 indicates that security is disabled, and 1 indicates that security is enabled. For example, 00 indicates that confidentiality protection is disabled and integrity protection is disabled, 10 indicates that confidentiality protection is enabled but integrity protection is disabled, 01 indicates that confidentiality protection is disabled but integrity protection is disabled, and 11 indicates that confidentiality protection is enabled and integrity protection is enabled. Further, after receiving the broadcast message, the terminal device 2 may determine the corresponding security protection method based on the security indication information.

S712: The terminal device 2 verifies the broadcast message.

For step S712, refer to an existing implementation. Details are not described herein again.

For example, it is assumed that the security protection method that is received by the terminal device 2 and sent by the DDNMF2 network element and that is required for using the ProSe service by the terminal device 2 is: enabling confidentiality protection+disabling integrity protection. However, the security protection method that is used for the broadcast message and that is indicated by the broadcast message received by the terminal device 2 is: enabling confidentiality protection+enabling integrity protection. Therefore, even if the terminal device 2 and the terminal device 1 are interested in a same application, a subsequent PC5 connection cannot be established. In other words, the PC5 connection cannot be established between the terminal device 1 and the terminal device 2 only because security requirements do not match.

Alternatively, for example, it is assumed that the security protection method that is used for the broadcast message and that is indicated by the broadcast message received by the terminal device 2 is: enabling confidentiality protection+enabling integrity protection. The security protection method that is received by the terminal device 2 and sent by the DDNMF2 network element and that is required for using the ProSe service by the terminal device 2 includes: enabling confidentiality protection+enabling integrity protection. In this case, the terminal device 2 may determine to establish a PC5 connection to the application of the terminal device 1.

Optionally, the model B discovery scenario is used as an example. In this case, the communication method provided in some embodiments may further include the following steps S713 to S716.

S713: The terminal device 2 sends a query code message to the terminal device 1. Correspondingly, the terminal device 1 receives the sent query code message from the terminal device 2.

Security protection is performed on the query code message by using the security protection method that is obtained in step S710 and that is required for using the ProSe service by the terminal device 2.

Optionally, in some embodiments, the query code message may include a security protection method for performing security protection on the query code message, so that the terminal device 1 using the security protection method can receive the query code message. The security protection method for performing security protection on the query code message may be implicitly carried in the query code message, or may be explicitly carried in the query code message. This is not limited to some embodiments.

For example, an implicit manner is that different codes used for ProSe discovery represent different security protection methods. In other words, the DDNMF2 network element may send, to the discoverer UE, a plurality of codes used for ProSe discovery, and different codes used for ProSe discovery correspond to different security protection methods. Further, after receiving the query code message, the terminal device 1 may determine the corresponding security protection method based on the code used for ProSe discovery.

Alternatively, for example, an explicit manner is that security indication information is carried in the query code message, where the security indication information indicates a security protection method used for the query code message. For example, the security indication information is two bits. 0 indicates that security is disabled, and 1 indicates that security is enabled. For example, 00 indicates that confidentiality protection is disabled and integrity protection is disabled, 10 indicates that confidentiality protection is enabled but integrity protection is disabled, 01 indicates that confidentiality protection is disabled but integrity protection is disabled, and 11 indicates that confidentiality protection is enabled and integrity protection is enabled. Further, after receiving the query code message, the terminal device 1 may determine the corresponding security protection method based on the security indication information.

S714: The terminal device 1 verifies the sent query code message.

For step S714, refer to an existing implementation. Details are not described herein again.

For example, it is assumed that the security protection method that is received by the terminal device 1 and sent by the DDNMF1 network element and that is required for using the ProSe service by the terminal device 1 is: enabling confidentiality protection+disabling integrity protection. However, the security protection method that is used for the query code message and that is indicated by the query code message received by the terminal device 1 is: enabling confidentiality protection+enabling integrity protection. Therefore, even if the terminal device 2 and the terminal device 1 are interested in a same application, a subsequent PC5 connection cannot be established. In other words, the PC5 connection cannot be established between the terminal device 1 and the terminal device 2 only because security requirements do not match.

Optionally, in some embodiments, after verifying that the sent query code message is accurate, the terminal device 1 may further continue to perform the following step S715.

S715: The terminal device 1 sends a response code message to the terminal device 2. Correspondingly, the terminal device 2 receives the sent response code message from the terminal device 1.

S716: The terminal device 2 verifies the sent response code message.

Optionally, in some embodiments, after the foregoing model A or model B procedure ends, a discovery match report procedure may be further included. For details, refer to existing 3GPP TS 23.303, v15.1.0, and 3GPP TS 33.303, v15.0.0 standards. This is not described herein.

According to the communication method provided in some embodiments, the security protection method required for using the ProSe service by the terminal device may be obtained in the ProSe discovery procedure. Optionally, the security protection method used on the control plane of the PC5 connection and/or the security protection method used on the user plane of the PC5 connection may be further obtained by using the communication method.

The actions of the DDNMF1 network element, the DDNMF2 network element, the terminal device 1, or the terminal device 2 in steps S701 to S716 may be performed by the processor 301 in the communication device 300 shown in FIG. 3 by invoking the application program code stored in the memory 303, to instruct the DDNMF1 network element, the DDNMF2 network element, the terminal device 1, or the terminal device 2 to perform the actions. This is not limited in this embodiment.

It should be noted that, in the PC5 establishment procedure shown in FIG. 4 to FIG. 6 in embodiments of this application, the security protection method that is obtained in the embodiment shown in FIG. 7A and FIG. 7B and that is required for using the ProSe service by the terminal device may be used. That is, the first security protection method in the PC5 establishment procedure shown in FIG. 4 to FIG. 6 may be the security protection method that is obtained by the terminal device 1 or the terminal device 2 in the embodiment shown in FIG. 7A and FIG. 7B and that is required for using the ProSe service. Certainly, in the PC5 establishment procedure shown in FIG. 4 to FIG. 6 in embodiments of this application, the security protection method obtained in the ProSe discovery procedure in another manner may be used. This is not limited to some embodiments.

Optionally, in some embodiments, if the security protection method that is obtained by the terminal device 1 and the terminal device 2 shown in FIG. 7A and FIG. 7B and that is required for using the ProSe service includes enabling integrity protection, the $1^{st}$ PC5 broadcast message in the embodiment shown in FIG. 7A and FIG. 7B may carry the parameter transmitted in the direct communication request in the embodiment shown in FIG. 4, FIG. 5, or FIG. 6. In this case, the step (for example, step S402 in FIG. 4, step S501 in FIG. 5, or step S601 in FIG. 6) of sending the direct communication request by the UE 1 to the UE 2 may be not performed, so that signaling overheads can be further reduced. This is uniformly described herein, and details are not described below.

Figure 8:
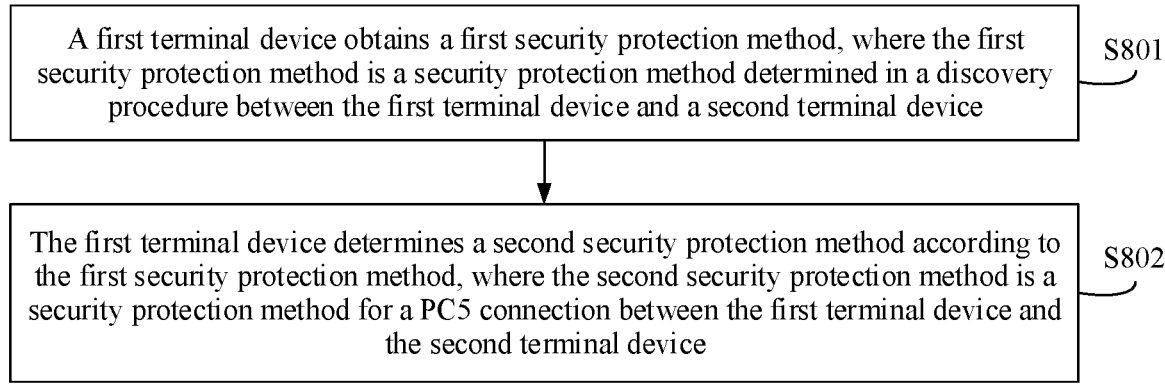
FIG. 8 is a schematic flowchart of a communication method according to an embodiment of this application.

FIG. 8 shows a communication method according to an embodiment of this application. The method includes the following steps.

S801: A first terminal device obtains a first security protection method, where the first security protection method is a security protection method determined in a discovery procedure between the first terminal device and a second terminal device.

For some implementations of step S801, refer to the embodiment shown in FIG. 7A and FIG. 7B. Details are not described herein again.

It should be noted that, the first terminal device in some embodiments may be the terminal device 1 in the embodiment shown in FIG. 7A and FIG. 7B, and the second terminal device may be the terminal device 2 in the embodiment shown in FIG. 7A and FIG. 7B. Alternatively, the first terminal device in some embodiments may be the terminal device 2 in the embodiment shown in FIG. 7A and FIG. 7B, and the second terminal device may be the terminal device 1 in the embodiment shown in FIG. 7A and FIG. 7B. This is uniformly described herein, and details are not described below.

S802: The first terminal device determines a second security protection method according to the first security protection method, where the second security protection method is a security protection method for a PC5 connection between the first terminal device and the second terminal device.

For some implementations of step S802, refer to step S502 and step S506 in the embodiment shown in FIG. 5. Alternatively, for some implementations of step S802, refer to step S602 in the embodiment shown in FIG. 6. Details are not described herein again.

It should be noted that, in some embodiments, the first terminal device may be the UE 2 in the embodiment shown in FIG. 5 or FIG. 6, and the second terminal device may be the UE 1 in the embodiment shown in FIG. 5 or FIG. 6. This is uniformly described herein, and details are not described below.

In some embodiments, when determining the second security protection method, reference may be made to the first security protection method determined in the discovery procedure. Therefore, a security level of the determined second security protection method may be not lower than a security level of the first security protection method. In other words, the security level of the first security protection method is the lowest security level of the PC5 connection in the PC5 establishment procedure, so that security is not degraded.

The actions of the first terminal device in steps S801 and S802 may be performed by the processor 301 in the communication device 300 shown in FIG. 3 by invoking the application program code stored in the memory 303, to instruct the first terminal device to perform the actions. This is not limited in this embodiment.

Figure 9:
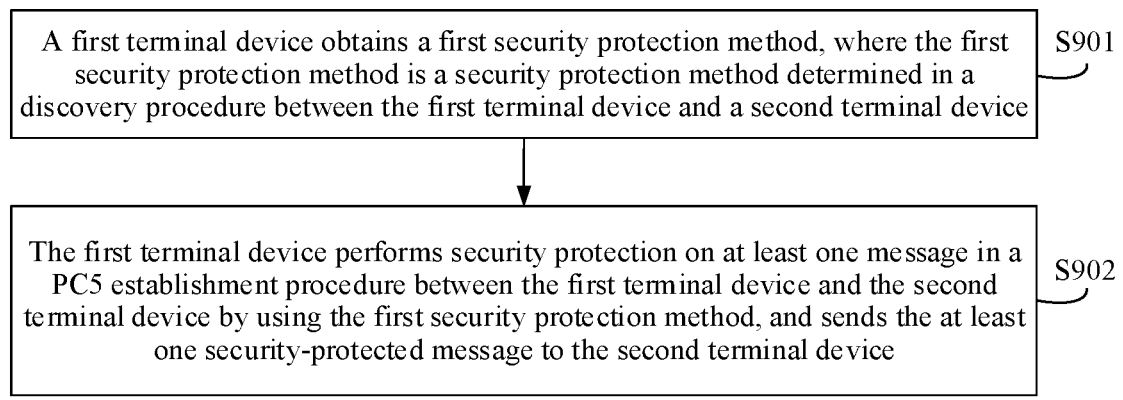
FIG. 9 is a schematic flowchart of another communication method according to an embodiment of this application.

FIG. 9 shows a communication method according to an embodiment of this application. The method includes the following steps.

S901: A first terminal device obtains a first security protection method, where the first security protection method is a security protection method determined in a discovery procedure between the first terminal device and a second terminal device.

For some implementations of step S901, refer to the embodiment shown in FIG. 7A and FIG. 7B. Details are not described herein again.

It should be noted that, the first terminal device in some embodiments may be the terminal device 1 in the embodiment shown in FIG. 7A and FIG. 7B, and the second terminal device may be the terminal device 2 in the embodiment shown in FIG. 7A and FIG. 7B. Alternatively, the first terminal device in some embodiments may be the terminal device 2 in the embodiment shown in FIG. 7A and FIG. 7B, and the second terminal device may be the terminal device 1 in the embodiment shown in FIG. 7A and FIG. 7B. This is uniformly described herein, and details are not described below.

S902: The first terminal device performs security protection on at least one message in a PC5 establishment procedure between the first terminal device and the second terminal device by using the first security protection method, and sends the at least one security-protected message to the second terminal device.

For some implementations of step S902, refer to step S402, step S405, step S407, and step S409 in the embodiment shown in FIG. 4. Alternatively, for some implementations of step S902, refer to step S501, step S503, step S505, and step S507 in the embodiment shown in FIG. 5. Alternatively, for some implementations of step S902, refer to step S601 and step S604 in the embodiment shown in FIG. 6. Details are not described herein again.

It should be noted that, in some embodiments, the first terminal device may be the UE 2 in the embodiment shown in FIG. 4, FIG. 5, or FIG. 6, and the second terminal device may be the UE 1 in the embodiment shown in FIG. 4, FIG. 5, or FIG. 6. Alternatively, in some embodiments, the first terminal device may be the UE 1 in the embodiment shown in FIG. 4, FIG. 5, or FIG. 6, and the second terminal device may be the UE 2 in the embodiment shown in FIG. 4, FIG. 5, or FIG. 6. This is uniformly described herein, and details are not described below.

According to the communication system provided in some embodiments, in one aspect, when the first security protection method includes enabling integrity protection, because the first terminal device may perform security protection on the at least one message in the PC5 establishment procedure between the first terminal device and the second terminal device by using the first security protection method, a problem that a security level is degraded because the message in the PC5 establishment procedure is attacked or tampered with by an attacker can be avoided, and a security level of the PC5 establishment procedure can be improved. In another aspect, when a security level of the first security protection method is higher than or equal to a security level of a security protection method used on a control plane of a PC5 connection between the first terminal device and the second terminal device, because the first terminal device may perform security protection on the at least one message in the PC5 establishment procedure between the first terminal device and the second terminal device by using the first security protection method, a problem that the security level is degraded because the security level of the security protection method used on the control plane of the PC5 connection is lower than the security level of the first security protection method can be avoided, and a security level of the PC5 establishment procedure can be improved.

The actions of the first terminal device in steps S901 and S902 may be performed by the processor 301 in the communication device 300 shown in FIG. 3 by invoking the application program code stored in the memory 303, to instruct the first terminal device to perform the actions. This is not limited in this embodiment.

Figure 10:
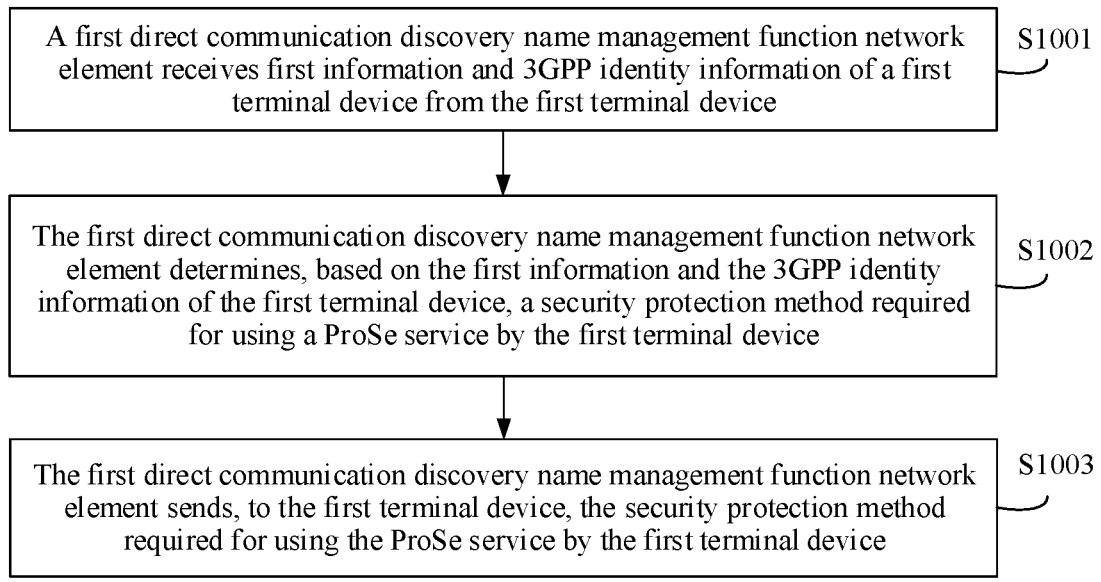
FIG. 10 is a schematic flowchart of still another communication method according to an embodiment of this application.

FIG. 10 shows a communication method according to an embodiment of this application. The method includes the following steps.

S1001: A first direct communication discovery name management function network element receives first information and 3GPP identity information of a first terminal device from the first terminal device, where the first information includes identity information used for a ProSe service or information used to determine the identity information used for the ProSe service.

S1002: The first direct communication discovery name management function network element determines, based on the first information and the 3GPP identity information of the first terminal device, a security protection method required for using the ProSe service by the first terminal device.

S1003: The first direct communication discovery name management function network element sends, to the first terminal device, the security protection method required for using the ProSe service by the first terminal device.

For some implementations of the embodiment shown in FIG. 10, refer to the embodiment shown in FIG. 7A and FIG. 7B. Details are not described herein again.

It should be noted that, in some embodiments, the first direct communication discovery name management function network element may be, for example, the DDNMF1 network element in FIG. 7A and FIG. 7B, and the first terminal device may be, for example, the terminal device 1 in FIG. 7A and FIG. 7B. A second direct communication discovery name management function network element may be, for example, the DDNMF2 network element in FIG. 7A and FIG. 7B, and a second terminal device may be, for example, the terminal device 2 in FIG. 4. Alternatively, in some embodiments, the first direct communication discovery name management function network element may be, for example, the DDNMF2 network element in FIG. 7A and FIG. 7B, and the first terminal device may be, for example, the terminal device 2 in FIG. 7A and FIG. 7B. A second direct communication discovery name management function network element may be, for example, the DDNMF1 network element in FIG. 7A and FIG. 7B, and a second terminal device may be, for example, the terminal device 1 in FIG. 7A and FIG. 7B. This is uniformly described herein, and details are not described below.

According to the communication method provided in some embodiments, the first terminal device may obtain, in a discovery procedure between the first terminal device and the second terminal device, the security protection method required for using the ProSe service by the first terminal device.

The actions of the first direct communication discovery name management function network element in the foregoing steps S1001 to S1003 may be performed by the processor 301 in the communication device 300 shown in FIG. 3 by invoking the application program code stored in the memory 303, to instruct the first direct communication discovery name management function network element to perform the actions. This is not limited to some embodiments.

It may be understood that, in embodiments shown in FIG. 4 to FIG. 10, the methods and/or steps implemented by the first terminal device (for example, the UE 1 or the UE 2 in embodiments shown in FIG. 4 to FIG. 6, the terminal device 1 or the terminal device 2 in the embodiment shown in FIG. 7A and FIG. 7B, or the first terminal device in the embodiment shown in FIG. 8 or FIG. 9) may also be implemented by a component (for example, a chip or a circuit) that can be used in the first terminal device. The methods and/or steps implemented by the first direct communication discovery name management function network element (for example, the DDNMF1 network element or the DDNMF2 network element in the embodiment shown in FIG. 7A and FIG. 7B, or the first direct communication discovery name management function network element in the embodiment shown in FIG. 10) may also be implemented by a component (for example, a chip or a circuit) that can be used in the first direct communication discovery name management function network element.

The foregoing mainly describes the solutions provided in embodiments of this application from a perspective of interaction between network elements. Correspondingly, an embodiment of this application further provides a communication apparatus. The communication apparatus may be the first terminal device in the foregoing method embodiment, an apparatus including the foregoing first terminal device, or a component that can be used in the first terminal device. Alternatively, the communication apparatus may be the first direct communication discovery name management function network element in the foregoing method embodiment, an apparatus including the foregoing first direct communication discovery name management function network element, or a component that can be used in the first direct communication discovery name management function network element. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
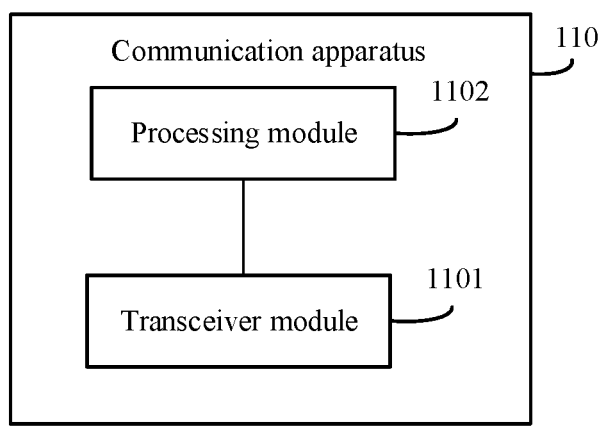
FIG. 11 is a schematic diagram of a structure of a communication apparatus according to an embodiment of this application.

FIG. 11 is a schematic diagram of a structure of a communication apparatus 110. The communication apparatus 110 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver machine, a transceiver, or a communication interface.

That the communication apparatus 110 is the first terminal device in the foregoing method embodiment, or a chip or another component disposed in the first terminal device is used as an example. In a possible implementation, the processing module 1102 is configured to obtain a first security protection method, where the first security protection method is a security protection method determined in a discovery procedure between the first terminal device and a second terminal device. The processing module 1102 is further configured to determine a second security protection method according to the first security protection method, where the second security protection method is a security protection method for a PC5 connection between the first terminal device and the second terminal device.

Optionally, a security level of the second security protection method is not lower than (e.g., higher than) a security level of the first security protection method.

Optionally, that the processing module 1102 is configured to determine a second security protection method according to the first security protection method includes: determining the first security protection method as the second security protection method.

Optionally, that the processing module 1102 is configured to determine a second security protection method according to the first security protection method includes: receiving a second security policy from the second terminal device by using the transceiver module 1101, where the second security policy is a security policy of the second terminal device in the PC5 connection; and determining the second security protection method according to the second security policy and the first security protection method.

Optionally, that the processing module 1102 is configured to determine the second security protection method according to the second security policy and the first security protection method includes: when the first security protection method meets the second security policy, determining the first security protection method as the second security protection method; when the first security protection method meets the second security policy, selecting, according to the second security policy, a security protection method whose security level is not lower than that of the first security protection method as the first security protection method; or when the first security protection method does not meet the second security policy, selecting, according to the second security policy, a security protection method that meets the second security policy as the second security protection method.

Optionally, the second security policy includes a second control plane security policy and/or a second user plane security policy, the second control plane security policy is a control plane security policy of the second terminal device in the PC5 connection, and the second user plane security policy is a user plane security policy of the second terminal device in the PC5 connection.

Optionally, the second security protection method is used to perform security protection on a part or all of parameters transferred in control plane signaling of the PC5 connection; and/or the second security protection method is used to perform security protection on a part or all of user plane data of the PC5 connection.

Optionally, the transceiver module 1101 is further configured to receive a first message from the second terminal device, where the first message is the $1^{st}$ message in a PC5 establishment procedure between the first terminal device and the second terminal device. The processing module 1102 is further configured to perform security deprotection on the first message by using the first security protection method.

Optionally, that the processing module 1102 is configured to obtain a first security protection method includes: sending first information and 3GPP identity information of the first terminal device to a first direct communication discovery name management function network element by using the transceiver module 1101, where the first information includes identity information used for a ProSe service or information used to determine the identity information used for the ProSe service; and receiving the first security protection method from the first direct communication discovery name management function network element by using the transceiver module 1101.

Alternatively, that the communication apparatus 110 is the first terminal device in the foregoing method embodiment, or a chip or another component disposed in the first terminal device is used as an example. In another possible implementation, the processing module 1102 is configured to obtain a first security protection method, where the first security protection method is a security protection method determined in a discovery procedure between the first terminal device and a second terminal device. The processing module 1102 is further configured to perform security protection on at least one message in a PC5 establishment procedure between the first terminal device and second terminal device by using the first security protection method. The transceiver module 1101 is configured to send the at least one security-protected message to the second terminal device.

Optionally, the at least one message includes a first message, and the first message is the $1^{st}$ message in the PC5 establishment procedure.

Optionally, the at least one message further includes a third message, the third message is a message that is sent by the first terminal device in the PC5 establishment procedure and that is used to negotiate a security protection method used on a user plane of a PC5 connection between the first terminal device and the second terminal device. That the processing module 1102 is configured to perform security protection on at least one message in a PC5 establishment procedure by using the first security protection method includes: performing security protection on the first message by using the first security protection method; and when a security level of a security protection method used on a control plane of the PC5 connection is lower than a security level of the first security protection method, performing security protection on the third message by using the first security protection method.

Optionally, before the processing module 1102 performs security protection on the third message by using the first security protection method, the transceiver module 1101 is further configured to receive a second message from the second terminal device, where the second message includes a security algorithm that is selected by the second terminal device and that is on the control plane of the PC5 connection. The processing module 1102 is further configured to determine, based on the security algorithm on the control plane of the PC5 connection, that the security level of the security protection method used on the control plane of the PC5 connection is lower than the security level of the first security protection method.

Optionally, the at least one message includes a fourth message, the fourth message is a message that is sent by the first terminal device in the PC5 establishment procedure and that is used to negotiate a security protection method used on a user plane of a PC5 connection between the first terminal device and the second terminal device. That the processing module 1102 is configured to perform security protection on at least one message in a PC5 establishment procedure by using the first security protection method includes: after determining that a security level of a security protection method used on a control plane of the PC5 connection is lower than a security level of the first security protection method, performing security protection on the fourth message by using the first security protection method.

Optionally, the processing module 1102 is further configured to determine a second security protection method according to the first security protection method, where the second security protection method is a security protection method for a PC5 connection between the first terminal device and the second terminal device.

Optionally, a security level of the second security protection method is not lower than a security level of the first security protection method.

Optionally, that the processing module 1102 is configured to determine a second security protection method according to the first security protection method includes: receiving a second security policy from the second terminal device by using the transceiver module 1101, where the second security policy is a security policy of the second terminal device in the PC5 connection; and determining the second security protection method according to the second security policy and the first security protection method.

Optionally, that the processing module 1102 is configured to determine the second security protection method according to the second security policy and the first security protection method includes: when the first security protection method meets the second security policy, determining the first security protection method as the second security protection method; when the first security protection method meets the second security policy, selecting, according to the second security policy, a security protection method whose security level is not lower than that of the first security protection method as the first security protection method; or when the first security protection method does not meet the second security policy, selecting, according to the second security policy, a security protection method that meets the second security policy as the second security protection method.

Optionally, that the processing module 1102 is configured to obtain a first security protection method includes: sending first information and 3GPP identity information of the first terminal device to a first direct communication discovery name management function network element by using the transceiver module 1101, where the first information includes identity information used for a ProSe service or information used to determine the identity information used for the ProSe service; and receiving, by using the transceiver module 1101, the first security protection method from the first direct communication discovery name management function network element.

Alternatively, that the communication apparatus 110 is the first direct communication discovery name management function network element in the foregoing method embodiment, or a chip or another component disposed in the first direct communication discovery name management function network element is used as an example. In a possible implementation, the transceiver module 1101 is configured to receive first information and 3GPP identity information of a first terminal device from the first terminal device, where the first information includes identity information used for a ProSe service or information used to determine the identity information used for the ProSe service. The processing module 1102 is configured to determine, based on the first information and the 3GPP identity information of the first terminal device, a security protection method required for using the ProSe service by the first terminal device. The transceiver module 1101 is further configured to send, to the first terminal device, a security protection method required for using the ProSe service by the first terminal device.

Optionally, that the processing module 1102 is configured to determine, based on the first information and the 3GPP identity information of the first terminal device, a security protection method required for using the ProSe service by the first terminal device includes: determining, based on the first information and the 3GPP identity information of the first terminal device, a plurality of corresponding optional security protection methods for using the ProSe service by the first terminal device; and determining, according to the plurality of optional security protection methods, the security protection method required for using the ProSe service by the first terminal device.

Optionally, the processing module 1102 is further configured to obtain, from a second direct communication discovery name management function network element, a security protection method required for using the ProSe service by the second terminal device. That the processing module 1102 is configured to determine, according to a plurality of optional security protection methods, a security protection method required for using the ProSe service by the first terminal device includes: determining whether the plurality of optional security protection methods include a security protection method required for using the ProSe service by the second terminal device; and when the plurality of optional security protection methods include the security protection method required for using the ProSe service by the second terminal device, determining the security protection method required for using the ProSe service by the second terminal device as the security protection method required for using the ProSe service by the first terminal device; or when the plurality of optional security protection methods do not include the security protection method required for using the ProSe service by the second terminal device, determining, from the plurality of optional security protection methods, the security protection method required for using the ProSe service by the first terminal device.

Optionally, the security protection method required for using the ProSe service is used to perform security protection on a fifth message, and the fifth message is the $1^{st}$ PC5 broadcast message in a discovery procedure between the first terminal device and the second terminal device.

Optionally, the security protection method required for using the ProSe service is used to determine a security protection method for a PC5 connection between the first terminal device and the second terminal device.

Optionally, the security protection method for the PC5 connection is used to perform security protection on a part or all of parameters transferred in control plane signaling of the PC5 connection; and/or the security protection method for the PC5 connection is used to perform security protection on a part or all of user plane data of the PC5 connection.

Optionally, the security protection method required for using the ProSe service is used to perform security protection on at least one message in a PC5 establishment procedure between the first terminal device and the second terminal device.

Optionally, the at least one message includes a first message, and the first message is the $1^{st}$ message in the PC5 establishment procedure.

All related content of the steps in the foregoing method embodiments may be cited in function descriptions of corresponding function modules. Details are not described herein again.

In this embodiment, the communication apparatus 110 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the communication apparatus 110 may be in a form of the communication device 300 shown in FIG. 3.

For example, the processor 301 in the communication device 300 shown in FIG. 3 may invoke the computer-executable instructions stored in the memory 303, so that the communication device 300 performs the communication method in the foregoing method embodiment.

Specifically, functions/implementation processes of the transceiver module 1101 and the processing module 1102 in FIG. 11 may be implemented by the processor 301 in the communication device 300 shown in FIG. 3 by invoking the computer-executable instructions stored in the memory 303. Alternatively, a function/an implementation process of the processing module 1102 in FIG. 11 may be implemented by the processor 301 in the communication device 300 shown in FIG. 3 by invoking the computer-executable instructions stored in the memory 303, and a function/an implementation process of the transceiver module 1101 in FIG. 11 may be implemented by using the communication interface 304 in the communication device 300 shown in FIG. 3.

The communication apparatus 110 provided in this embodiment can perform the foregoing communication method. Therefore, for a technical effect that can be achieved by the communication apparatus 110, refer to the foregoing method embodiment. Details are not described herein again.

It should be noted that one or more of the foregoing modules or units may be implemented by using software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a SoC (system-on-a-chip) or an ASIC, or may be an independent semiconductor chip. In addition to a core for executing software instructions to perform operations or processing, the processor may further include a necessary hardware accelerator, for example, a field programmable gate array (FPGA), a PLD (programmable logic device), or a logic circuit that implements a dedicated logic operation.

When the foregoing modules or units are implemented by hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedure.

Optionally, an embodiment of this application further provides a communication apparatus (for example, the communication apparatus may be a chip or a chip system). The communication apparatus includes a processor, configured to implement the method in any one of the foregoing method embodiments. In a possible implementation, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication apparatus may include a chip, or may include a chip and another discrete component. This is not specifically limited in some embodiments.

All or some of the foregoing embodiments may be implemented through software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape) an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communication method, wherein the method comprises:
   determining, by a first terminal device, a first security protection method in a discovery procedure between the first terminal device and a second terminal device;
   performing, by the first terminal device, security protection on at least one message in a PC5 establishment procedure between the first terminal device and the second terminal device using the first security protection method; and
   sending, by the first terminal device, the at least one security-protected message to the second terminal device.

2. The method according to claim 1, wherein the at least one message comprises a first message in the PC5 establishment procedure.

3. The method according to claim 1, wherein the method further comprises:
   determining, by the first terminal device, a second security protection method for a PC5 connection between the first terminal device and the second terminal device according to the first security protection method.

4. The method according to claim 3, wherein the determining, by the first terminal device, the second security protection method according to the first security protection method comprises:
  receiving, by the first terminal device, a second security policy from the second terminal device, wherein the second security policy is a security policy of the second terminal device in the PC5 connection; and
  determining, by the first terminal device, the second security protection method according to the second security policy and the first security protection method.

5. The method according to claim 1, wherein the obtaining, by the first terminal device, the first security protection method comprises:
  sending, by the first terminal device, first information and $3^{rd}$ generation partnership project (3GPP) identity information of the first terminal device to a first direct communication discovery name management function network element, wherein the first information comprises identity information used for a proximity-based service (ProSe) or information used to determine the identity information used for the ProSe; and
  receiving, by the first terminal device, the first security protection method from the first direct communication discovery name management function network element.

6. A communication method, wherein the method comprises:
  receiving, by a first direct communication discovery name management function network element, first information and $3^{rd}$ generation partnership project (3GPP) identity information of a first terminal device from the first terminal device, wherein the first information comprises identity information used for a proximity-based service (ProSe) or information used to determine the identity information used for the ProSe;
  determining, by the first direct communication discovery name management function network element based on the first information and the 3GPP identity information of the first terminal device, a security protection method required for using the ProSe by the first terminal device; and
  sending, by the first direct communication discovery name management function network element to the first terminal device, the security protection method required for using the ProSe by the first terminal device.

7. The method according to claim 6, wherein the security protection method required for using the ProSe is used to determine a security protection method for a PC5 connection between the first terminal device and the second terminal device.

8. The method according to claim 7, wherein at least one of:
  the security protection method for the PC5 connection is used to perform security protection on a part or all of parameters transferred in control plane signaling of the PC5 connection; or
  the security protection method for the PC5 connection is used to perform security protection on a part or all of user plane data of the PC5 connection.

9. The method according to claim 6, wherein the security protection method required for using the ProSe is used to perform security protection on at least one message in a PC5 establishment procedure between the first terminal device and the second terminal device.

10. The method according to claim 9, wherein the at least one message comprises a first message in the PC5 establishment procedure.

11. A communication apparatus, comprising:
  a processor coupled to a memory storing instructions and configured to execute the instructions to cause the communication apparatus to:
  determine a first security protection method in a discovery procedure between the communication apparatus and a second terminal device;
  perform security protection on at least one message in a PC5 establishment procedure between the communication apparatus and the second terminal device by using the first security protection method; and
  send the at least one security-protected message to the second terminal device.

12. The communication apparatus according to claim 11, wherein the at least one message comprises a first message in the PC5 establishment procedure.

13. The communication apparatus according to claim 11, wherein the instructions further cause the communication apparatus to determine a second security protection method according to the first security protection method, wherein the second security protection method is a security protection method for a PC5 connection between the communication apparatus and the second terminal device.

14. The communication apparatus according to claim 13, wherein the instructions cause the communication apparatus to determine the second security protection method by:
  receiving a second security policy from the second terminal device, wherein the second security policy is a security policy of the second terminal device in the PC5 connection; and
  determining the second security protection method according to the second security policy and the first security protection method.

15. The communication apparatus according to claim 11, wherein the instructions cause the communication apparatus to obtaini the first security protection method by:
  sending first information and $3^{rd}$ generation partnership project (3GPP) identity information of the communication apparatus to a first direct communication discovery name management function network element, wherein the first information comprises identity information used for a proximity-based service (ProSe) or information used to determine the identity information used for the ProSe; and
  receiving the first security protection method from the first direct communication discovery name management function network element.

16. A first direct communication discovery name management function network element, comprising:
  a processor coupled to a memory storing instructions and configured to execute the instructions to cause the first direct communication discovery name management function network element to:
  receive first information and $3^{rd}$ generation partnership project (3GPP) identity information of a first terminal device from the first terminal device, wherein the first information comprises identity information used for a proximity-based service (ProSe) or information used to determine the identity information used for the ProSe;
  determine, based on the first information and the 3GPP identity information of the first terminal device, a security protection method required for using the ProSe by the first terminal device; and send, to the first terminal device, the security protection method required for using the ProSe by the first terminal device.

17. The first direct communication discovery name management function network element according to claim 16, wherein the security protection method required for using the ProSe is used to determine a security protection method for a PC5 connection between the first terminal device and the second terminal device.

18. The first direct communication discovery name management function network element according to claim 17, wherein at least one of:
   the security protection method for the PC5 connection is used to perform security protection on a part or all of parameters transferred in control plane signaling of the PC5 connection; or
   the security protection method for the PC5 connection is used to perform security protection on a part or all of user plane data of the PC5 connection.

19. The first direct communication discovery name management function network element according to claim 16, wherein the security protection method required for using the ProSe is used to perform security protection on at least one message in a PC5 establishment procedure between the first terminal device and the second terminal device.

20. The first direct communication discovery name management function network element according to claim 19, wherein the at least one message comprises a first message, and the first message is a first message in the PC5 establishment procedure.

* * * * *

UNITED STATES PATENT AND TRADEMARK OFFICE
CERTIFICATE OF CORRECTION

| | | |
|---|---|---|
| PATENT NO. | : 12,406,059 B2 | Page 1 of 1 |
| APPLICATION NO. | : 18/168228 | |
| DATED | : September 2, 2025 | |
| INVENTOR(S) | : He Li et al. | |

It is certified that error appears in the above-identified patent and that said Letters Patent is hereby corrected as shown below:

In the Claims

In Column 74, Claim 15, Line 40, delete "obtaini" and insert -- obtain --, therefor.

Signed and Sealed this
Twenty-third Day of December, 2025

John A. Squires
*Director of the United States Patent and Trademark Office*